United States Patent [19]
Takata et al.

[11] Patent Number: 5,981,941
[45] Date of Patent: Nov. 9, 1999

[54] OPTICAL ENCORDER FOR DETECTION HAVING A MOVING REFERENCE POINT

[75] Inventors: Kazumasa Takata, Moriguchi; Kanji Nishii, Osaka; Kenji Takamoto, Suita; Masami Ito, Moriguchi; Atsushi Fukui, Osaka; Tomohisa Kishi, Moriguchi, all of Japan

[73] Assignee: Matsushita Electric Industrial Co., Ltd., Japan

[21] Appl. No.: 08/859,321

[22] Filed: May 20, 1997

[30] Foreign Application Priority Data

May 20, 1996 [JP] Japan ..................................... 8-123848
Dec. 3, 1996 [JP] Japan ..................................... 8-323127

[51] Int. Cl.⁶ ........................................................ G01D 5/34
[52] U.S. Cl. ................. 250/231.16; 356/356; 250/237 G
[58] Field of Search .......................... 250/231.13–231.18, 250/237 G; 356/356; 341/13, 31

[56] References Cited

U.S. PATENT DOCUMENTS

| | | | |
|---|---|---|---|
| 5,073,710 | 12/1991 | Takagi et al. ....................... | 250/231.16 |
| 5,661,296 | 8/1997 | Ishizuka et al. ......................... | 356/356 |
| 5,663,497 | 9/1997 | Ishizuka ................................... | 356/356 |
| 5,694,218 | 12/1997 | Fukui et al. ......................... | 250/237 G |

*Primary Examiner*—Stephone Allen
*Attorney, Agent, or Firm*—Parkhurst & Wendel, L.L.P.

[57] ABSTRACT

The present invention provides an optical encoder capable of using the recesses and convexes of a movable plate and a fixed plate to accurately generate a Z phase signal in synchronism with an A/B phase signal. Phase type diffraction gratings on the moving and fixed plates including a plurality of tracks with different grating pitches cause parallel coherent beams to interfere with one another, and a light receiving part detects the intensity of light to obtain a plurality of synchronous signals with different periods. On the other hand, the light receiving part detects light spots formed by condensing elements on the movable plate to generates a single pulse per rotation as a reference position. One of the plurality of synchronous signals that has the shortest period is selected as an A/B phase signal that depends on the movement of the movable plate. The conjunction of the reference position signal and the plurality of synchronous signals is determined as a Z phase signal indicating the origin of the movable plate, thereby obtaining a Z phase signal in synchronism with one pulse of the A/B phase signal.

58 Claims, 55 Drawing Sheets

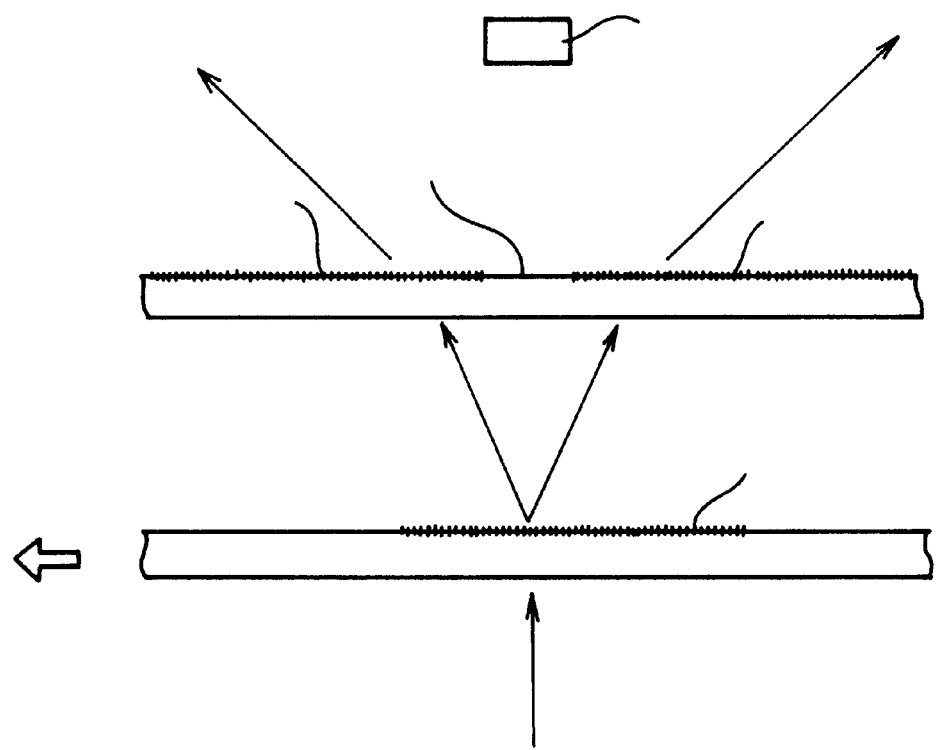
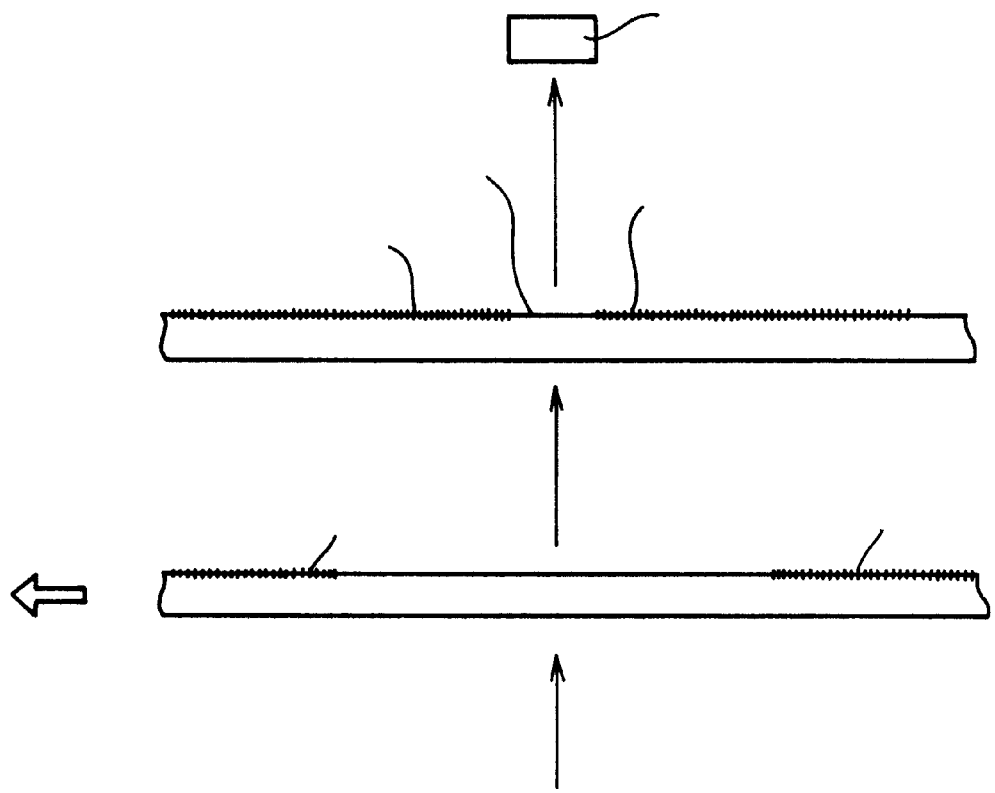

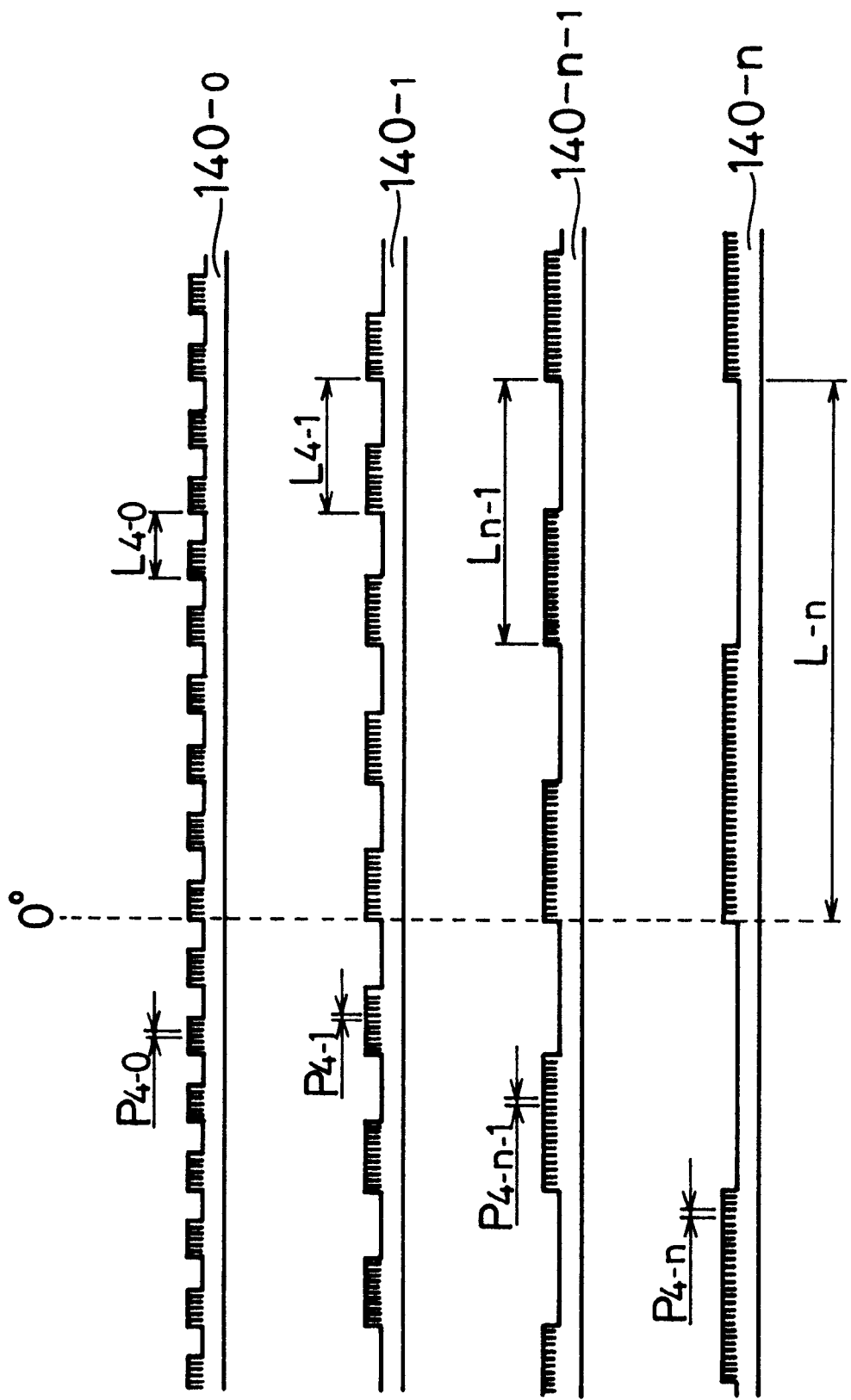

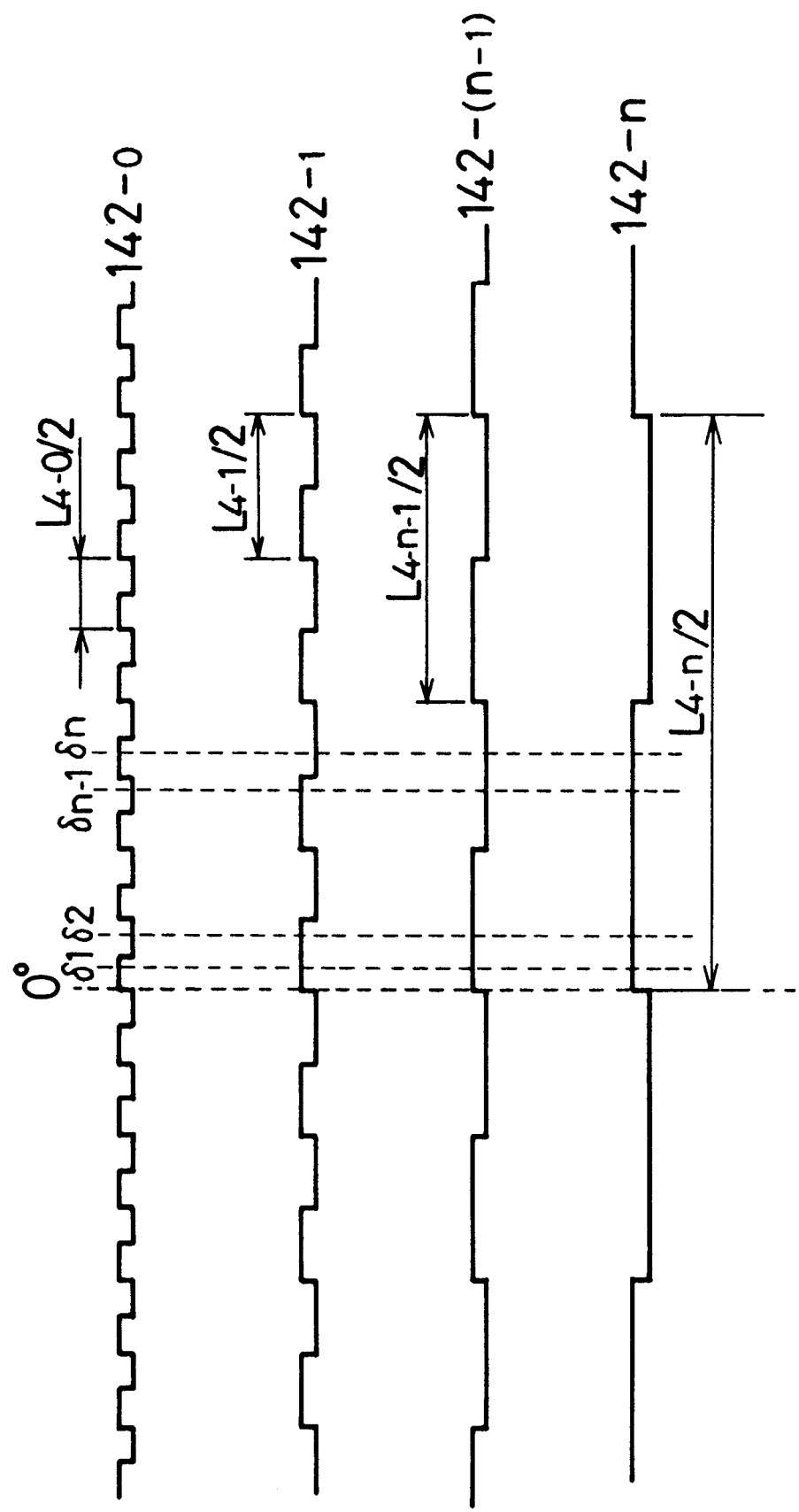

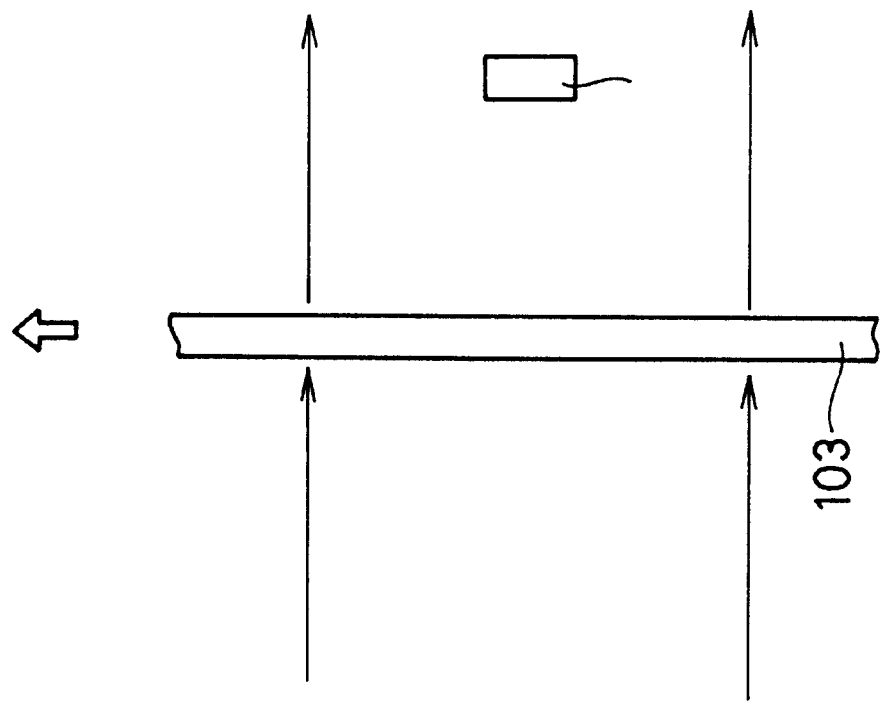
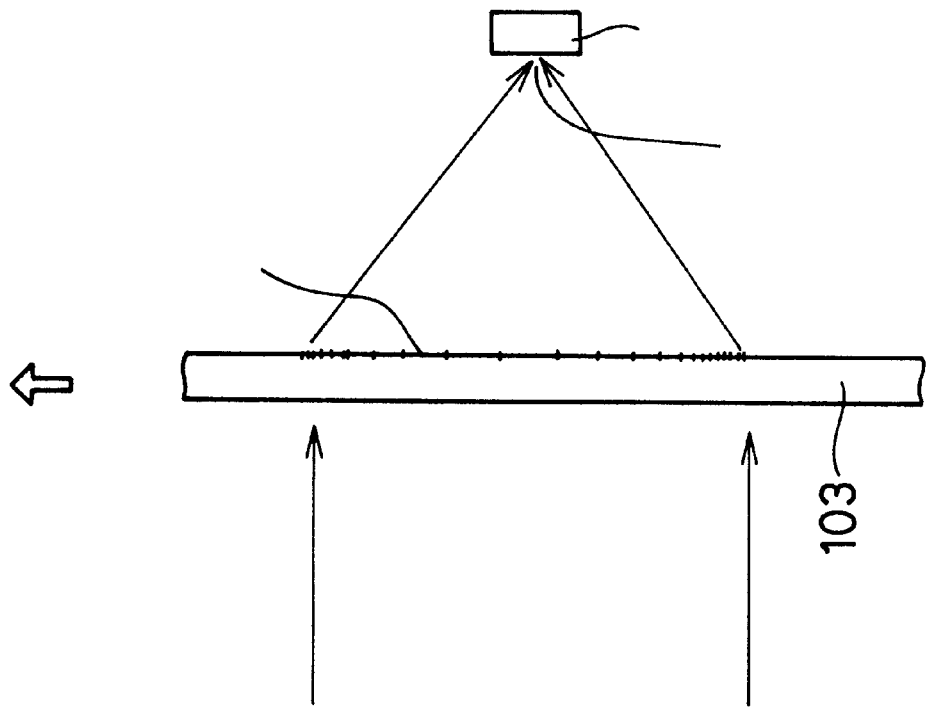

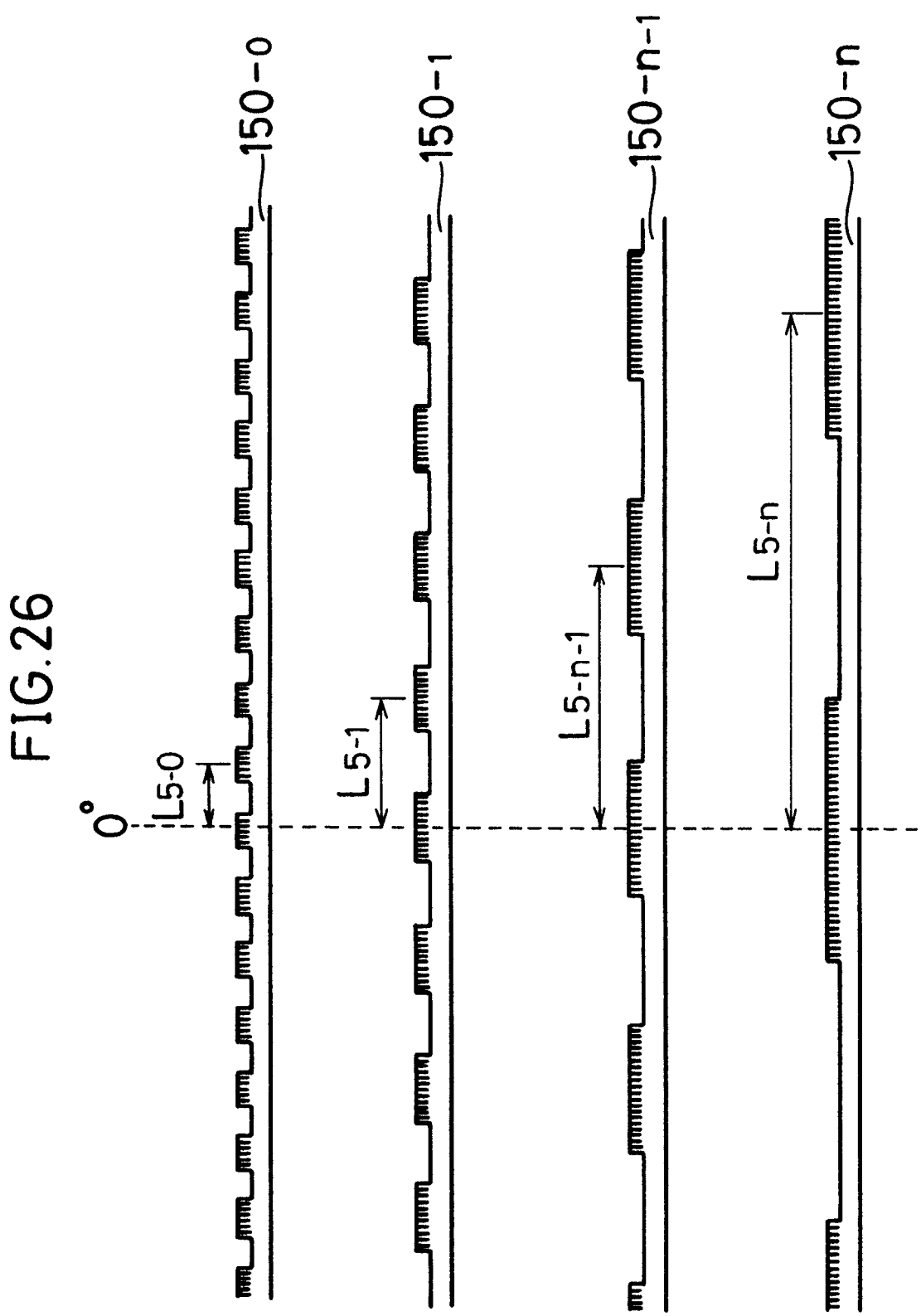

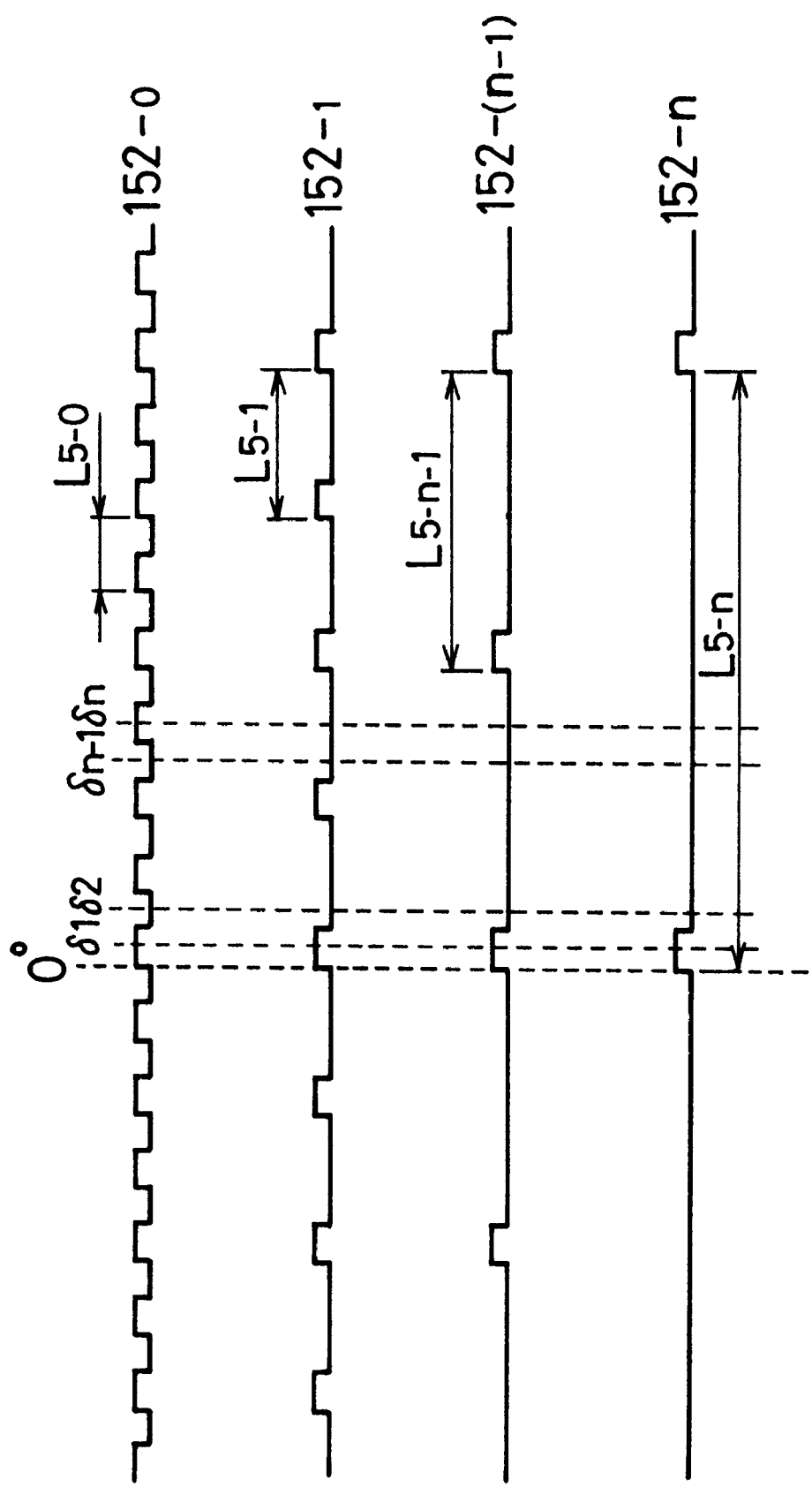

OPTICAL ENCORDER FOR DETECTION HAVING A MOVING REFERENCE POINT

FIELD OF THE INVENTION

The present invention relates to an optical encoder used to position a mechanical apparatus and a method for detecting the position of the encoder.

BACKGROUND OF THE INVENTION (First Conventional Example)

Optical encoders are roughly classified into two types based on the difference in their position detection methods: an incremental type and an absolute type (an absolute position detecting type). The configuration and operation of a conventional incremental type encoder are described below. As shown in FIG. 49, a conventional incremental type encoder comprises a light source 501; a collimator lens 502 for making beams from the light source 501 parallel; a movable plate 503 that rotates around a shaft 512; a fixed plate 506 disposed opposite to the movable plate 503; and a light receiving device 509 with two light receiving parts 510 and 511.

The movable plate 503 has an A/B phase signal region in which slits or diffraction grating 504 is equal pitch on its circumference; and a Z phase signal region in which only one slit 505 is disposed on its circumference. Similarly, the fixed plate 506 has an A/B phase signal region in which slits or diffraction grating 507 is disposed at the same pitch as in the movable plate; and a Z phase signal region in which only one slit 508 is disposed on its circumference. The light receiving part 510 of the light receiving device 509 detects light that has been transmitted through the diffraction grating 504 of the movable plate 503 and the diffraction grating 507 of the fixed plate 506. The light receiving part 511 of the light receiving device 509 detects light that has been transmitted through the slit 505 of the movable plate 503 and the slit 508 of the fixed plate 506.

By detecting light that has been transmitted through the A/B phase signal regions of the moving and fixed plates 503 and 506 (the diffraction gratings 504 and 507), a signal depending on the rotating angle of the movable plate 503 (an A/B phase signal) is detected, and by detecting light that has been transmitted through the Z phase signal regions (the slits 505 and 508), a signal representing the origin of the movable plate 503 (a Z phase signal) is detected. Generally, an output signal from the light receiving part 509 is binarized into a pulse signal, which is then processed to detect the position. To process the signal easily, the Z phase signal is desirably synchronized with the A/B signal. Thus, the pulse of the Z phase signal must be synchronized with only one pulse of the A/B phase signal.

Next, a method for creating a light shielding pattern such as slits is described with reference to FIG. 50. As shown in FIG. 50A, a photo resist 522 is applied to the surface of a transparent substrate 521. Then, a mask 523 with a specified pattern which has been produced by electron beam exposure is adhered to the surface of the photo resist 522 or allowed to approach the photo resist 522 as in FIG. 50B. The substrate is then irradiated with light of a wavelength region that can be responded by the resist in order to make only the exposed resist soluble or insoluble, and the mask is then removed. When the substrate 521 is then immersed in a resist solvent, a mask pattern 522' from the resist is transferred to the surface of the substrate 521 as in FIG. 50C. The substrate 521 with the mask pattern 522' transferred thereto is installed in a deposition apparatus (not shown) to deposit a metal 524 such as chrome thereon as in FIG. 50D. The substrate 521 is subsequently removed from the deposition apparatus, and an organic solvent such as acetone is used to remove the photo resist 522' remaining on the substrate 521 as in FIG. 50E. As a result of this series of operations, a light shielding pattern 525 such as slits is formed on the substrate 521.

As described above, a large number of operations are required to produce the light shielding pattern 525 such as slits on the substrate 521. In addition, the mask 523 and the substrate 521 cannot be aligned with each other easily. Thus, as is well known, high costs are required to form a pattern such as slits on the moving and the fixed plates 503 and 506. Consequently, incremental type optical encoder uses phase type optical elements in the A/B phase signal regions (the diffraction gratings 504 and 507) of the moving and the fixed plates 503 and 506 to reduce costs.

Phase type optical elements can be produced by forming recesses and convexes on the surface of the substrate. A phase type optical element manufacturing process is shown in FIG. 51. A transparent resin 532 such as acryl or polycarbonate which is made flowable by heating is poured into a mold 531 of a specified shape and solidified therein. The phase type optical element has the shape of the mold transferred thereto. Compared to the method for producing a light shielding pattern such as slits on the surface of the substrate, this method does not require the substrate and the pattern to be aligned with each other or require operations such as application of a photo resist, ultraviolet radiation, development, deposition of a metallic film, and washing thereof.

As one example in which the A/B phase signal region comprises a phase type diffraction grating, which is one of the phase optical elements, a conventional incremental type encoder shown in, for example, JPA6-042981 is known. The configuration of this encoder is shown in FIG. 52. In this figure, the light source 501 comprises a semiconductor laser or a relatively coherent light emitting diode. Beams from the light source 501 are made parallel by the collimator lens 502 and are incident on the movable plate 503. The movable plate 503 has a phase type diffraction grating 534 that mainly generates ±1 order diffracted light, and is disposed approximately perpendicularly to the optical axis of the parallel beams so that it can be rotated around a rotation center 512 parallel to the optical axis. The fixed plate 506 has a phase type diffraction grating 537 with a grating pitch P equal to that of the phase type diffraction grating 534 on the movable plate 503, and is disposed approximately perpendicularly to the optical axis. The light receiving part 510 receives light formed based on the relative locational relationship between the phase type diffraction gratings 534 and 537. Beams from the light source 501 are made parallel by the collimator lens 502 and are then approximately perpendicularly incident on the movable plate 503. The light incident on the movable plate 503 is diffracted into a +1 order diffracted beam and a −1 order diffracted beam by the phase type diffraction grating 534 on the movable plate 503. The light is incident on the phase type diffraction grating 537 of the fixed plate 506 and diffracted into a +1 order diffracted beam and a −1 order diffracted beam, respectively. Since the phase type diffraction gratings 534 and 537 have an equal grating pitch P, the diffraction angles of the phase type diffraction gratings 534 and 537 are equal. Consequently, the optical path of the light diffracted into a −1 order beam by the phase type diffraction grating 534 and then into a +1 order beam by the phase type diffraction grating 537 ((−1, +1) order diffracted light) becomes equal to the optical path of the light diffracted into a +1 order beam by the phase type diffraction grating 534 and then into a −1 order beam by the phase type diffraction grating 537 ((+1, −1) order diffracted light), so these optical paths interfere with each other, varying the intensity of the light. Since the interference condition depends on the movement δ of the movable plate 503, the intensity of the light varies depending on the movement δ of the movable plate 503. That is, since the movement δ of the movable plate 503 varies the amount of light received by the light receiving part 510, the movement of the movable plate 503 can be detected.

On the other hand, methods for providing recesses and convexes on the surface instead of slits have been examined for the Z phase signal region, as in the A/B phase signal region. As shown in FIG. 53, a condensing lens 541 is provided on the movable plate 503 so that a condensed spot can be received by the light receiving part 511 to detect the movement reference point of the movable plate 503. In this case, the accuracy in detecting the Z phase is substantially determined by the sizes of the condensed spot and the light receiving part 511, and increases as the sizes decrease.
(Second Conventional Example)

An incremental type optical encoder shown in FIG. 49 detects the position of the movable plate 503 based on the movement of the A/B phase signal relative to the Z phase signal as a reference. Thus, position detection cannot be carried out while power is being supplied, and it is essential to detect the position of the reference. On the contrary, absolute type optical encoders that can detect a current position at any time from any position depending on the different slit patterns are known.

The configuration and operation of absolute type optical encoders are described. As shown in FIG. 55, a conventional absolute type optical encoder comprises a light source 601; a collimator lens 602 for making beams from the light source 601 parallel; a movable plate 603 rotating around a shaft 612 and having a plurality of slit tracks with slits 604 disposed at approximately equal pitch on its circumference; a fixed plate 606 disposed opposite to the movable plate 603 and having a plurality of slits 607 corresponding to the plurality of slit tracks 604 on the rotating plate 603; and a light receiving device 609 having a plurality of light receiving parts 610 corresponding to the plurality of slits 607. The slits 604 are installed at a different pitch in each slit track on the rotating plate 603. Each light receiving part 610 detects light transmitted through a slit 604 of the movable plate 603 and a slit 607 of the fixed plate 606. Based on the pattern of a detection signal from the light receiving part 610, the absolute position of the rotating plate 603 can be detected.
(Third Conventional Example)

The position of an object has been commonly detected in a non-contact manner by irradiating the object with light, projecting its image onto a television camera, and binarizing an output signal from a linear array sensor to detect the position, or forming a slit in a moving object, transmitting light from the light source through the slit in such a way that the light is incident on a light receiving part, and binarizing the output signal from the light receiving part to detect the moving reference point of the moving object. A conventional position detection method shown in, for example, JPA2-44202 is described with reference to FIG. 56.

FIG. 56 shows a plan view of a position detection apparatus that is a third conventional example. In this figure, 701 is a light source; and 702 is a moving object on which a slit 703 is formed. Reference numeral 705 designates a light beam that has passed through the slit 703, and 704 is a light receiving part. The moving object 702 is disposed between the light source 701 and the light receiving part 704, and moves perpendicularly to the shaft which couples the light source 701 and the light receiving part 704. In response to the movement of the moving object 702, the light beam 705 also moves. AA is the distance between the light source 701 and the moving object 702, and B is the distance between the moving object 702 and the light receiving part 704. In addition, Δ is the movement of the moving object 702, and δδ is the movement of the light beam 705. In this case, the movement δδ of the light beam 705 can be expressed as the following Equation (1):

$$\delta\delta = \frac{B}{AA} \cdot \Delta \qquad (1)$$

The incremental type encoder that is the first conventional example is disadvantageous in that if the Z phase signal region has recesses and convexes on the surface instead of slits, the Z phase detection accuracy cannot be improved easily. The diameter of the condensed spot is determined by the size of the light source 501 and the focusing distance of the collimator lens 502 in geometrical optics. As shown in FIG. 54, if the size of the light source 501 is referred to as φs1, the focusing distance of the collimator lens 502 is referred to as fs1, and the focusing distance of the condensing lens 541 installed on the Z phase signal region is referred to as fs2, then the diameter φs2 of the condensed spot 551 can be expressed as the following Expression (2) based on the Gauss's formula in geometrical optics.

$$\phi s2 = \frac{fs2}{fs1} \cdot \phi s1 \qquad (2)$$

Thus, to reduce the diameter φs2 of the condensed spot 551, firstly the size φs1 of the light source 501 may be reduced, secondly the focusing distance fs1 of the collimator lens 502 may be increased, or thirdly the focusing distance fs2 of the condensing lens 541 on the Z phase signal region may be reduced. To reduce the size of the first light source 501, however, a light shielding part such as a pin hole may be formed near the light source 501, but this disadvantageously reduces the amount of available light. In addition, since the sizes of the A/B and Z phase signal regions determine the diameter of required parallel beams, that is, the diameter of the collimator lens 502, increasing the focusing distance fs1 of the second collimator lens 502 reduces the use efficiency of light from the light source 501. In some methods for generating signals in the A/B phase signal region, the distance between the fixed plate 506 and the light receiving part 511 must be increased to separate unwanted diffracted light from, for example, the fixed plate 506. This prevents the focusing distance fs2 of the condensing lens 541 on the Z phase signal region from being significantly reduced. Alternatively, the light receiving part 510 for the A/B phase signal may be separated from the light receiving part 511 for the Z phase signal so that the light receiving part 510 for the A/B phase signal can be installed at a desired distance from the fixed plate 506, while the light receiving part 511 for the Z phase signal can be installed closer to the fixed plate 506. This embodiment, however, involves a complicated structure and requires accurate assembly, thereby increasing costs.

The light source 501 of the optical encoder normally comprises a light emitting diode, and the light emitting diameter φs1 of the light emitting diode is not smaller than 100 μm. In addition, the focusing distance of the collimator lens 502 must be about 5 mm or larger depending on the size of the product or the specification, and the distance between the movable plate 503 and the light receiving part 511 must be about 20 mm or larger. As a result, the diameter of the light spot of the condensing lens 541 installed on the movable plate 503 can be calculated as about 400 μm, using Equation (2). Compared to the A/B phase signal with a pitch (or a period) of 10 μm, the Z phase signal is wide. To increase the accuracy of Z phase detection, the size of the light receiving part 511 may be reduced compared to the light spot diameter to set a higher threshold used in binarizing a detected signal. This encoder, however, is likely to be subjected to electric noise or the variation of the light intensity of the light source 501, so it cannot detect the Z phase stably.

Furthermore, this method cannot easily synchronize the Z phase signal with the A/B phase signal used to detect the movement of the movable plate 503. In the method shown in FIG. 53, the A/B phase signal has a wave form determined by the relative locational relationship between the movable plate 503 and the fixed plate 506, whereas the Z phase signal can be generated without the use of the fixed plate 506 and has a wave form determined by the relative locational relationship between the movable plate 503 and the light receiving part 511. Thus, to synchronize the A/B phase signal with the Z phase signal, the elements in the movable plate 503, fixed plate 506, and light receiving part 511 must be positioned very accurately. Furthermore, a slight offset among these elements may prevent the A/B phase signal and the Z phase signal from being synchronized.

In addition, in the absolute type encoder that is the second conventional example, a plurality of slit tracks are formed on the moving and the fixed plates 603 and 606, and the slits 604 are disposed at a different pitch in each slit track. This prevents the use of phase type optical elements with recesses and convexes at an equal pitch on the surface of the substrate, as in the incremental type encoder of the first conventional example, and requires the deposition of a thin film of metal on a transparent substrate to form a slit as shown in FIG. 50. Consequently, costs cannot be reduced easily.

In the position detection method that is the third conventional example, to improve the accuracy in detecting the moving reference point of the moving object 702, the movement δδ of the light beam 705 may be increased using the movement Δ of the moving object 702. Specifically, the distance B may be increased to reduce the distance AA. When, however, the distance B is increased while the distance AA is simultaneously reduced, the diameter of the light beam 705 is increased on the light receiving part 704. This reduces the accuracy in detecting the moving reference point of the moving object 702. On the other hand, if the size of the slit 703 is excessively reduced to reduce the diameter of the light beam 705, the light may be diffracted, thereby increasing the diameter of the light beam 705 on the light receiving part 704. In addition, if the size of the slit 703 is reduced, the amount of light received by the light receiving part 704 may be reduced, thereby enhancing the effects of noise and reducing the accuracy in detecting the moving reference point. Furthermore, to prevent the effects of diffraction, the distance B between the slit 703 and the light receiving part 704 may be reduced. When this distance is reduced, however, the moving object 702 may contact with the light receiving part 704 and both may be damaged.

DISCLOSURE OF THE INVENTION

In view of the above problems of the conventional examples, it is an object of this invention to provide an optical encoder that can accurately detect a moving reference point, that is, a Z phase signal while synchronizing the Z phase signal with an A/B phase signal. It is another object of this invention to provide an optical encoder and a method for detecting its position (angle) which can maintain a sufficient distance between a moving object and a light receiving part and which can use recesses and convexes on a moving and a fixed plates to generate signals. It is yet another object of this invention to provide an optical encoder and a method for detecting its position which detect the absolute position of the movable plate using signals generated by the recesses and convexes on the moving and the fixed plates.

To achieve the above objects, a first optical encoder according to this invention is characterized in that it comprises a light source; a lens for making beams from the light source approximately parallel; a movable plate with a first optical element acting like a lens and a fixed plate with a second optical element acting like a lens, the plates being disposed approximately perpendicularly to the optical axis of the beams from the light source and in parallel to each other; and a photodetector that receives a spot of light generated by the first and second optical elements, wherein a detection signal from the photodetector is used to detect the moving reference point of the movable plate, that is, a Z phase signal.

This invention provides an optical encoder that can detect the moving reference point accurately.

An optical encoder according to the invention is characterized in that it comprises a light source; a lens for making beams from the light source approximately parallel; a movable plate with a first optical element acting like a lens and a fixed plate with a second optical element acting like a lens, the plates being disposed approximately perpendicularly to the optical axis of the beams from the light source and in parallel to each other; and a photodetector that receives a spot of light generated by the first and second optical elements, wherein a detection signal from the photodetector is used to detect the moving reference point of the movable plate, wherein the lens makes beams from the light source approximately parallel, wherein the first optical element acting like a lens on the movable plate and the second optical element acting like a lens on the fixed plate generate a light spot, the plates being disposed approximately perpendicularly to the optical axis of the beams from the light source and in parallel to each other, wherein the photodetector then receives the light spot and provides a detection signal to enable the moving reference point of the movable plate to be detected.

In addition, an optical encoder according to another embodiment is characterized in that the second optical element on the fixed plate is formed of a reflecting optical element and in that the encoder passes light through the first optical element on the movable plate, modulates it using the second optical element on the fixed plate, and reflects it so as to pass it through the first optical element on the movable plate again, wherein the lens makes beams from the light source approximately parallel and passes the light through the first optical element on the movable plate, wherein the second optical element on the fixed plate then modulates, reflects, and passes the light through the first optical element on the movable plate again to generate a light spot, wherein the photodetector then receives the light spot and provides a detection signal to enable the moving reference point of the movable plate to be detected.

A position detection method as set forth in another embodiment comprises making beams from a light source approximately parallel, generating a light spot using a first optical element disposed on a moving object and acting like a lens and a second optical element disposed on a fixed object and acting like a lens, the objects being disposed approximately perpendicularly to the optical axis of light from the light source and in parallel to each other, and receiving the light spot to position the moving object.

In addition, a position detection method as set forth in another embodiment is a position detection method wherein a rotating shaft is attached to the moving object to detect the rotating angle of the moving object.

An optical encoder according to one embodiment of the invention is characterized in that it comprises a light source; a lens for making beams from the light source approximately parallel; a moving plate with a light scattering source and a fixed plate with an optical element acting like a lens, the plates being disposed approximately perpendicularly to the optical axis of the beams from the light source and in parallel to each other; and a photodetector that receives a spot of light generated by the optical element on the fixed plate by collecting light scattered from the light scattering source and that provides a detection signal to enable the moving reference point of the movable plate to be detected, wherein the lens makes beams from the light source approximately parallel and the light is incident on the light scattering source of the movable plate, wherein the light scattering source then scatters and emits the light, which is then collected by the optical element installed on the fixed plate to generate a light spot, wherein the photodetector then receives the light spot and provides a detection signal to enable the moving reference point of the movable plate to be detected.

An optical encoder as set forth in another embodiment of this invention is characterized in that it comprises a light source; a lens for making beams from the light source approximately parallel; a movable plate with a reflecting surface and a fixed plate with an optical element acting like a lens, the plates being disposed approximately perpendicularly to the optical axis of the beams from the light source and in parallel to each other; and a photodetector that receives a spot of light generated by the optical element on the fixed plate by collecting light reflected from the reflecting surface of the movable plate and that provides a detection signal to enable the moving reference point of the movable plate to be detected, wherein the lens makes beams from the light source approximately parallel and the light is incident on the reflecting surface of the movable plate, wherein the light reflected from the reflecting surface is then collected by the optical element installed on the fixed plate to generate a light spot, wherein the photodetector then receives the light spot and provides a detection signal to enable the moving reference point of the movable plate to be detected.

In addition, a second position detection method according to this invention comprises moving a moving object and a fixed object relative to each other to generate a plurality of periodic signals with different periods and a reference position signal indicating that the moving object is near a moving reference point, and determining a conjunction of the reference position signal and the plurality of periodic signals to detect the moving reference point of the moving object.

Specifically, pulse signals A, $Z_1$ to $Z_n$ shown in FIG. 15 correspond to the plurality of periodic signals and $Z_d$ corresponds to the reference position signal. In addition, a pulse signal Z corresponds to the conjunction of the reference position signal and the plurality of periodic signals. Since the conjunction of the reference position signal and the plurality of periodic signals is determined, only one pulse signal Z occurs during one period (rotation) of the moving object and synchronization with the pulse signal A with the shortest period is possible.

In this second method, the plurality of periodic signals are preferably generated based on light modulated by a first phase type diffraction grating installed on the moving object and a second phase type diffraction grating installed on the fixed object, respectively.

The use of the phase type diffraction gratings as a means for generating the plurality of periodic signals equalizes the optical paths of, for example, the light diffracted by the first phase type diffraction grating into a +1 order beam and then diffracted by the second phase type diffraction grating into a −1 order beam and the light diffracted by the first phase type diffraction grating into a −1 order beam and then diffracted by the second phase type diffraction grating into a +1 order beam to cause them to interfere with each other, varying the intensity of the light. The interference condition depends on the movement of the moving object, so the movement of the moving object can be detected by detecting the variation of the intensity of the light.

In addition, in the second method, the plurality of periodic signals and the reference position signal are preferably binarized pulse signals.

By binarizing the periodic and reference position signals into pulse signals, the rising and falling edges of the signals are clearly defined to enable the periods to be measured easily.

In the second method, if the plurality of periodic signals are referred to as $S_0$ and $S_i$ (i=1 to n, n is an integer equal to or larger than 2), it is preferable that periods $VS_0$ and $VS_i$ meet the following equation and that the pulse of $S_i$ includes only one pulse of $S_{i-1}$ near the moving reference point.

$$VS_0 \leq \ldots \leq VS_{i-1} \leq VS_i \qquad (3)$$

According to this configuration, only one pulse of $S_{i-1}$ is included in the period of the pulse of $S_i$. Thus, when each signal is binarized and represented as "H" and "L", the occurrence of those conjunctions of the plurality of periodic signals in which all the signals are "H" depends on the period of $S_n$. The conjunction signal and the reference position signal enable the moving reference point of the moving object to be identified easily.

In addition, in the second method, when the moving object is near the moving reference point, only one pulse of $S_n$ is preferably generated.

According to this configuration, when each signal is binarized and represented as "H" and "L", the occurrence of the conjunction of the reference position signal and the plurality of periodic signals in which all the signals are "H" is just once, thereby enabling the moving reference point of the moving object to be identified without using a reference position signal.

In addition, a third position detection method according to this invention comprises providing on a moving object first phase type diffraction gratings comprising a plurality of annular tracks different grating pitches on the different tracks, providing on a fixed object second phase type diffraction gratings corresponding to each track of the phase type diffraction gratings on the moving object and having a grating pitch equal to that of each track, moving the moving object and the fixed object relative to each other to cause the first and second phase type diffraction gratings to modulate light in order to generate a plurality of periodic signals with different periods, and detecting the absolute position of the moving object based on the patterns of the plurality of periodic signals.

Since the first and second phase type diffraction gratings have a plurality of tracks with different grating pitches, a periodic signal generated from each track has a different pattern. A pattern obtained at each moment can be compared to stored patterns to determine the absolute position of the moving object relative to the current moving reference position.

In this third method, the first and second phase type diffraction gratings preferably mainly provide ±1 order diffracted light.

Since the first and second diffraction gratings provide ±1 order diffracted light, a bright and dark pattern can be produced by the interference of light as described above. The pattern of each periodic signal can be detected easily by allowing the light receiving element to detect this interference fringe.

In addition, in the third method, the plurality of periodic signals are preferably binarized pulse signals.

Pulsing the periodic signals facilitates the comparison of patterns and improves detection accuracy.

In addition, in the third method, if the plurality of periodic signals are referred to as $S_0$ and $S_i$ (i=1 to n, n is an integer equal to or larger than 2), it is preferable that periods $VS_0$ and $VS_i$ meet the following equation.

$$VS_0 \times 2 = VS_1$$

.

.

$$VS_{n-1} \times 2 = VS_n \qquad (4)$$

Since the period of each signal is double that of the preceding signal, and the pattern of each periodic signal varies at an integral multiple of the pattern of the signal with the shortest period. Thus, the error in the absolute position of the moving object can be reduced down to less than the pulse width of the signal with the shortest period.

In addition, a fourth position detection method according to this invention comprises repeatedly forming a part in which a phase type diffraction grating is formed and a part in which no phase type diffraction grating is formed, in each of a plurality of annular tracks on a moving object at a different period for each track, providing on a fixed object a light transmissible part and a light shielding part corresponding to each track on the moving object, generating a plurality of periodic signals of different periods from the different tracks when the part of the moving object in which no phase type diffraction grating is formed passes over the light transmissible part of the fixed object, and detecting the absolute position of the moving object based on the patterns of the plurality of periodic signals.

For example, when the part of the moving object in which no phase type diffraction grating is formed passes over the light transmissible part of the fixed object, light substantially perpendicularly incident on the moving object is directly transmitted through the moving and the fixed objects. Thus, detecting this transmitted light enables periodic signals to be obtained. The period of each track in repeating the part in which a phase type diffraction grating is formed and the part in which no phase type diffraction grating is formed is different, so the periodic signal generated from each track has a different pattern. A pattern obtained at each moment can be compared to stored patterns to determine the absolute position of the moving object relative to the current moving reference position.

As in the third method, in this fourth method, the phase type diffraction grating preferably mainly provides ±1 order diffracted light.

In addition, the plurality of periodic signals are preferably binarized pulse signals.

In addition, if the plurality of periodic signals are referred to as $S_0$ and $S_i$ (i=1 to n, n is an integer equal to or larger than 2), it is preferable that periods $VS_0$ and $VS_i$ meet Equation (4).

In addition, a fifth position detection method according to this invention comprises providing a plurality of condensing elements on a plurality of annular tracks on a moving object at different specified intervals, detecting a light spot generated by each of the condensing elements, and detecting the position of the moving object based on the signal pattern of the light spot.

Since the plurality of condensing elements are disposed on the moving object, a plurality light spots are formed and each of the light spots moves in response to the movement of the moving object. When each light spot passes over the light receiving element disposed at a specified position, the amount of light incident on the light receiving element increases, thereby providing a plurality of periodic signals of different periods for the different tracks. Since a periodic signal generated from each track has a different pattern, a pattern obtained at each moment can be compared to stored patterns to determine the absolute position of the moving object relative to the current moving reference position.

As in the third and fourth methods, in this fifth method, the plurality of periodic signals are preferably binarized pulse signals.

In addition, if the plurality of periodic signals are referred to as $S_0$ and $S_i$ (i=1 to n, n is an integer equal to or larger than 2), it is preferable that periods $VS_0$ and $VS_i$ meet Equation (4).

A second optical encoder according to this invention comprises a light source; a lens for making beams from the light source approximately parallel; a movable plate comprising a plurality of tracks and having condensing elements and first phase type diffraction gratings with a different grating pitch on each track; a fixed plate comprising a plurality of tracks corresponding to the first phase type diffraction grating and having second phase type diffraction gratings with a grating pitch equal to that of the corresponding first phase type diffraction grating on each track; and a photodetector for detecting a light pattern generated by the first phase type diffraction grating of the movable plate and the second phase type diffraction grating of the fixed plate and a light pattern generated by the condensing elements of the movable plate, wherein a detection signal from the photodetector is used to detect the moving reference point of the movable plate.

That is, the second optical encoder according to this invention is suitable for the implementation of the second position detection method according to this invention, wherein the first phase type diffraction grating of the movable plate and the second phase type diffraction grating of the fixed plate serve to generate a plurality of periodic signals for each track and wherein the conjunction of the plurality of periodic signals and a signal from the condensing element is determined to identify the reference position of the movable plate.

In the second optical encoder, the first and second phase type diffraction gratings preferably mainly provide +1 order diffracted light.

In addition, the detection signal from the photodetector is preferably a binarized pulse signal.

In addition, if the plurality of periodic signals on each track of the first and third phase type diffraction gratings are referred to as $S_0$ and $S_i$ (i=1 to n, n is an integer equal to or larger than 2), it is preferable that periods $VS_0$ and $VS_i$ meet Equation (3) and that the pulse of $S_i$ includes only one pulse of $S_{i-1}$ near the moving reference point.

In addition, the pulse of a signal generated by receiving condensed light spots formed by the condensing elements on the movable plate preferably includes only one pulse of $S_n$ near the moving reference point.

In addition, a third optical encoder according to this invention comprises a light source; a lens for making beams from the light source approximately parallel; a movable plate comprising a plurality of tracks and having a first phase type diffraction grating with a different grating pitch on each track; a fixed plate comprising a plurality of tracks corresponding to the first phase type diffraction gratings of the movable plate and having on each track second phase type diffraction gratings with a grating pitch equal to that of the corresponding first phase type diffraction gratings; and a photodetector for detecting light patterns generated by the first phase type diffraction gratings of the movable plate and the second phase type diffraction grating of the fixed plate, wherein a detection signal from the photodetector is used to detect the absolute position of the movable plate.

That is, the third optical encoder according to this invention is suitable for the implementation of the third position detection method according to this invention. Since the first and second phase type diffraction gratings include the plurality of tracks with different grating pitches, a periodic signal generated from each track has a different pattern. A pattern obtained at each moment can be compared to stored patterns to determine the absolute position of the moving object relative to the current moving reference position.

In this third optical encoder, the first and second phase type diffraction gratings preferably mainly provide ±1 order diffracted light.

In addition, the detection signal from the photodetector is preferably a binarized pulse signal.

In addition, if the plurality of periodic signals from the photodetector are referred to as $S_0$ and $S_i$ (i=1 to n, n is an integer equal to or larger than 2), it is preferable that periods $VS_0$ and $VS_i$ meet Equation (4).

In addition, a fourth optical encoder according to this invention comprises a light source; a lens for making beams from the light source approximately parallel; a movable plate comprising a plurality of tracks and having on each track phase type diffraction gratings with different periods consisting of regions in which a grating pattern is formed and regions in which no grating pattern is formed; a fixed plate having a light transmissible part corresponding to each track on the movable plate; and a photodetector for detecting the pattern of light transmitted through the moving and fixed plates, wherein a detection signal from the photodetector is used to detect the absolute position of the movable plate.

That is, the fourth optical encoder according to this invention is suitable for the implementation of the fourth position detection method according to this invention. For example, when the part of the movable plate in which no phase type diffraction gratings are formed passes over the light transmissible part of the fixed plate, light substantially perpendicularly incident on the movable plate is directly transmitted through the moving and fixed plates. Thus, detecting this transmitted light enables periodic signals to be obtained. The period in each track of repeating the part in which phase type diffraction gratings are formed and the part in which no phase type diffraction gratings are formed is different, so the periodic signal generated from each track has a different pattern. A pattern obtained at each moment can be compared to stored patterns to determine the absolute position of the moving object relative to the current moving reference position.

In this fourth optical encoder, the phase type diffraction gratings preferably mainly provide ±1 order diffracted light.

In addition, the detection signal from the photodetector is preferably a binarized pulse signal.

In addition, if the plurality of periodic signals from the photodetector are referred to as $S_0$ and $S_i$ (i=1 to n, n is an integer equal to or larger than 2), it is preferable that periods $VS_0$ and $VS_i$ meet Equation (4).

In addition, a fifth optical encoder according to this invention comprises a light source; a lens for making beams from the light source approximately parallel; a movable plate disposed approximately perpendicularly to the optical axis of light from the light source and having condensing elements disposed on a plurality of tracks at different fixed intervals; and a photodetector for detecting a pattern of light generated by the condensing elements of the movable plate, wherein a detection signal from the photodetector is used to detect the absolute position of the movable plate.

That is, the fifth optical encoder according to this invention is suitable for the implementation of the fifth position detection method according to this invention. Since the plurality of condensing elements are disposed on the movable plate, a plurality light spots are formed and each of the light spots moves in response to the movement of the movable plate. When each light spot passes over the light receiving element disposed at a specified position of the photodetector, the amount of light incident on the light receiving element increases, thereby providing a plurality of periodic signals of different periods for the different tracks. Since a periodic signal generated from each track has a different pattern, a pattern obtained at each moment can be compared to stored patterns to determine the absolute position of the movable plate relative to the current moving reference position.

In this fifth optical encoder, the detection signal from the photodetector is preferably a binarized pulse signal.

In addition, if the plurality of periodic signals from the photodetector are referred to as $S_0$ and $S_i$ (i=1 to n, n is an integer equal to or larger than 2), it is preferable that periods $VS_0$ and $VS_i$ meet Equation (4).

To achieve the above objects, a sixth position detection method according to this invention comprises moving a moving object and a fixed object relative to each other; using the position of a light transmissible part installed on the moving object in order to control the intensity of a spot light generated by at least two condensing elements located adjacent to each other along the direction in which the moving object moves, wherein at least two sets of condensing elements are installed on the fixed object; and detecting the moving reference point of the moving object.

In this sixth method, the following relationship is desirably established between the distance $r_{A1}$, $r_{B1}$ between the ends of two adjacent condensing elements of each of two of the plurality of sets of condensing elements on the fixed object and the width $d_1$ of the light transmissible part on the moving object.

$$d_1 \leq r_{A1}$$
$$d_1 \leq r_{B1} \tag{5}$$

Since the relationship represented by Equation (5) is established between the inter-end distance of the two condensing elements and the width of the light transmissible part, the spot light intensity signal more significantly varies as the moving object moves, thereby enabling the moving reference point of the moving object to be detected accurately.

In addition, in the sixth method, it is desirable to obtain differential outputs of the intensities of spot lights formed by the two adjacent condensing elements of each of the two sets of condensing elements on the fixed object and to generate two pulse signals each having a point where the threshold level of each differential output crosses the zero line respectively as a starting point and an end point.

By pulsing the differential output using the threshold, a rising and a falling edges are clearly defined, thereby enabling the moving reference point to be detected easily.

In addition, in the sixth method, it is desirable to determine the conjunction of a pulsed periodic signal generated based on the relative positions of the moving and the fixed objects and a pulse signal based on the two differential signals from the condensing elements on the fixed object.

Determining the conjunction of the pulsed periodic signal and the reference position signal enables the moving reference point of the moving object to be identified easily and improves detection accuracy.

In addition, in the sixth method, the periodic signal is desirably generated based on light modulated by the first phase type diffraction gratings installed on the moving object and the second phase type diffraction grating installed on the fixed object.

The use of the phase type diffraction gratings as a means for generating the periodic signal equalizes the optical paths of, for example, the light diffracted by the first phase type diffraction grating into a +1 order beam and then diffracted by the second phase type diffraction grating into a −1 order beam and the light diffracted by the first phase type diffraction grating into a −1 order beam and then diffracted by the second phase type diffraction grating into a +1 order beam to cause them to interfere with each other, varying the intensity of the light. The interference condition depends on the movement of the moving object, so the movement of the moving object can be detected by detecting the variation of the intensity of the light.

In addition, in the sixth method, the first and second phase type diffraction gratings desirably mainly provide ±1 order diffracted light.

Since the first and second phase type diffraction gratings provide ±1 order diffracted light, a bright and dark pattern can be produced by the interference of light as described above. The pattern of each periodic signal can be detected easily by allowing the light receiving element to detect this interference fringe.

A seventh position detection method according to this invention comprises moving a moving object and a fixed object relative to each other; using the position of a light transmissible part installed on each track of the moving object in order to control the intensity of a spot light generated by at least two condensing elements located adjacent to each other along the direction in which the moving object moves, wherein at least two sets of condensing elements are provided for each of a plurality of tracks on the fixed object; and detecting the absolute position of the moving object from the intensity pattern of a light spot generated based on the location of the light transmissible part on each track of the moving object.

In this seventh method, the following relationship is desirably established between the distance $r_{A1}, r_{B1}, \ldots, r_{An}, r_{Bn}$ (n is an integer equal to or larger than 2) between the ends of two adjacent condensing elements of each of the plurality of sets of condensing elements on each of the plurality of tracks of the fixed object and the width $d_1, \ldots, d_n$ (n is an integer equal to or larger than 2) of the corresponding light transmissible parts on the moving object:

$$d_1 \leq r_{A1}$$

$$d_1 \leq r_{B1}$$

.

.

.

$$d_n \leq r_{An}$$

$$d_n \leq r_{Bn} \tag{6}$$

Since the relationship represented by Equation (6) is established between the inter-end distance of the two condensing elements and the width of the light transmissible part, the spot light intensity signal more significantly varies as the moving object moves, thereby enabling the moving reference point of the moving object to be detected accurately.

In the seventh method, based on two differential signals indicating the intensities of spot lights formed by the two adjacent condensing elements of each of the two sets of condensing elements on each track of the fixed object, it is desirable to generate a pulse signal having the threshold level cross point of each differential output as a starting or an end point.

By pulsing the differential output using the threshold, a rising and a falling edges are clearly defined, thereby enabling the position of the moving object to be detected easily.

In addition, in the seventh method, the binarized signal pattern obtained from each track when the movable plate is in one position is desirably different from the binarized signal patterns obtained when the movable plate is in any other positions.

A pattern obtained at each moment can be compared to stored patterns to determine the absolute position of the moving object relative to the current moving reference position.

In addition, a sixth optical encoder according to this invention comprises a light source; a lens for making beams from the light source approximately parallel; a movable plate with a light transmissible part; a fixed plate with at least two condensing elements located adjacent to each other along the direction in which the movable plate moves, wherein at least two sets of condensing elements are installed on the fixed plate; and a photodetector for detecting an optical pattern generated by the light transmissible part of the movable plate and the condensing elements of the fixed plate, wherein a detection signal from the photodetector is used to detect the moving reference point of the movable plate.

That is, the sixth optical encoder according to this invention is suitable for the implementation of the sixth position detection method according to this invention, and detects the moving reference point of the moving object by using the position of the light transmissible part installed on the movable plate in order to control the intensity of spot lights generated by the condensing elements installed on the fixed plate.

In addition, in the sixth optical encoder, the relationship represented by Equation (5) is desirably established between the distance $r_{A1}$, $r_{B1}$ between the ends of two adjacent condensing elements of each of two sets of condensing elements on the fixed plate and the width $d_1$ of the light transmissible part on the movable plate.

In the sixth optical encoder, based on two differential signals indicating the intensities of spot lights formed by the two adjacent condensing elements of each of the two sets of condensing elements on the fixed plate, it is desirable to generate two pulse signals each having a point where the threshold level of each differential output crosses the zero line respectively as a starting point and an end point.

In addition, in the sixth optical encoder, it is desirable to determine the conjunction of a pulsed periodic signal generated based on the relative positions of the movable and the fixed plates and a pulse signal based on the two differential signals from the condensing elements on the fixed plate.

In addition, in the sixth optical encoder, the periodic signal is desirably generated based on light modulated by the first phase type diffraction grating installed on the movable plate and the second phase type diffraction grating installed on the fixed plate.

In addition, in the sixth optical encoder, the first and second phase type diffraction gratings desirably mainly provide ±1 order diffracted light.

In addition, a seventh optical encoder according to this invention comprises a light source; a lens for making beams from the light source approximately parallel; a movable plate with light transmissible parts disposed on a plurality of tracks; a fixed plate with at least two condensing elements located adjacent to each other along the direction in which the moving object moves, wherein at least two sets of condensing elements are provided for each of the plurality of tracks of the movable plate; and a photodetector for detecting an optical pattern formed by the light transmissible part on the movable plate and the condensing elements on the fixed plate, wherein a detection signal from the photodetector is used to detect the absolute position of the movable plate.

That is, the seventh optical encoder according to this invention is suitable for the implementation of the seventh position detection method according to this invention, and detects the absolute position of the moving object from an intensity pattern of light spots by using the position of the light transmissible part on the movable plate in order to control the intensity pattern of spot lights generated by the condensing elements on the fixed plate.

In addition, in the seventh optical encoder, the relationship represented by Equation (6) is desirably established between the distance $r_{A1}$, $r_{B1}$, $r_{A2}$, $r_{B2}$, ..., $r_{An}$, $r_{Bn}$ (n is an integer equal to or larger than 2) between the ends of two adjacent condensing elements of each of two sets of condensing elements for each of the plurality of tracks on the fixed plate and the width $d_1$, $d_2$, ..., $d_n$ of the corresponding light transmissible parts on the movable plate.

In the seventh optical encoder, based on two differential signals indicating the intensities of spot lights formed by the two adjacent condensing elements of each of the two sets of condensing elements for each track on the fixed plate, it is desirable to generate two pulse signals each having a point where the threshold level of each differential output crosses the zero point as a starting point and an end point respectively.

In addition, in the seventh optical encoder, the binarized signal pattern obtained from each track when the movable plate is in one position during a single rotation is desirably different from the binarized signal patterns obtained when the movable plate is in any other positions.

BRIEF DESCRIPTION OF THE DRAWINGS

FIGS. 21A and 21B show optical paths in the optical encoder in Embodiment 8;

FIG. 22 shows a cross section of a phase optical element in Embodiment 8;

FIG. 23 shows output signals from a light receiving part in Embodiment 8;

FIGS. 25A and 25B show optical paths in the optical encoder in Embodiment 9;

FIG. 26 shows a cross section of a phase optical element in Embodiment 9;

FIG. 27 shows output signals from a light receiving part in Embodiment 9;

DESCRIPTION OF THE EMBODIMENTS

Embodiments of this invention are described below with reference to the drawings.

(Embodiment 1)

Figure 1:
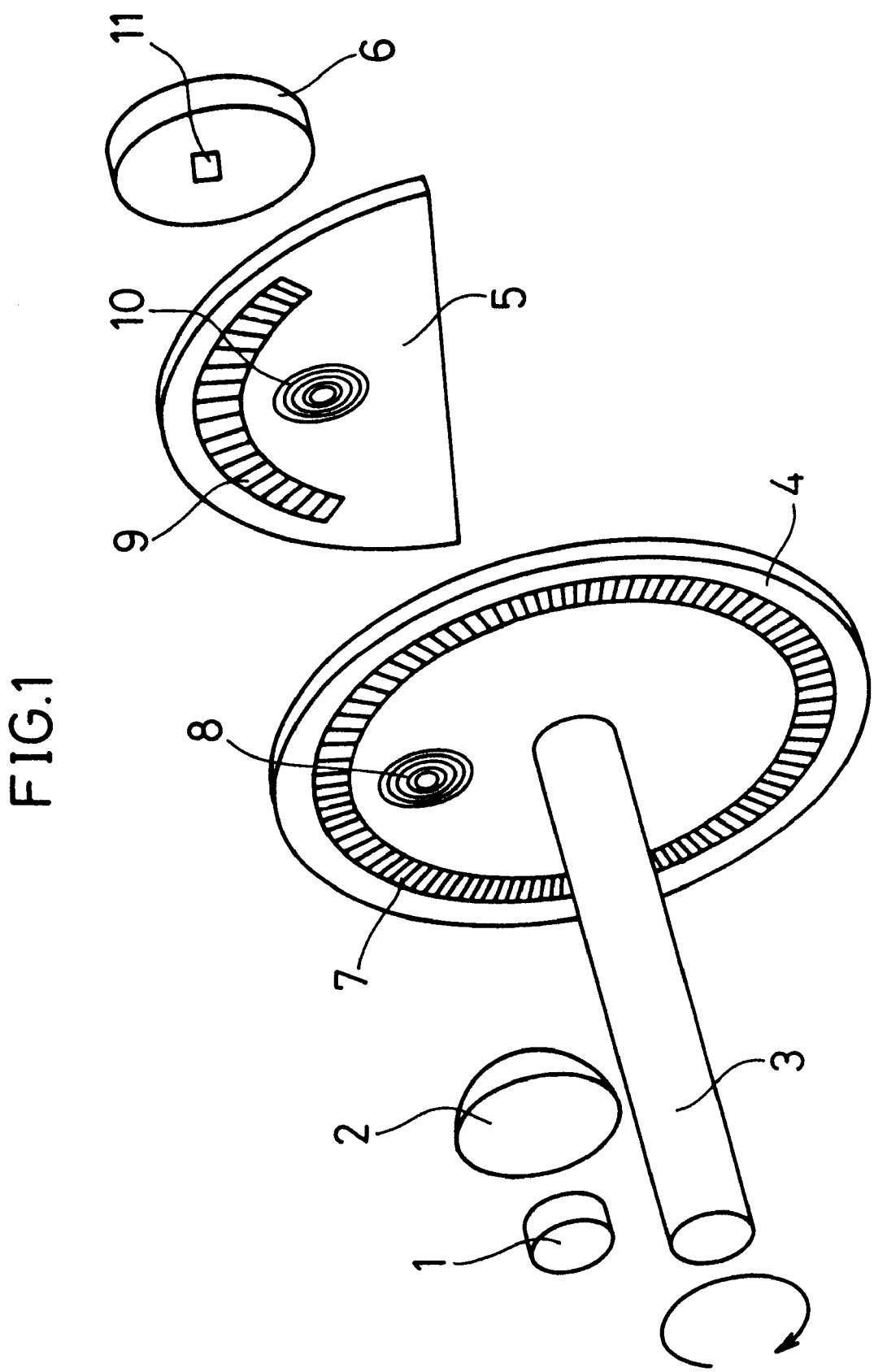
FIG. 1 is a schematic representation showing a configuration of an optical encoder according to Embodiment 1 of this invention.

FIG. 1 shows a basic configuration of an optical encoder showing Embodiment 1 of this invention.

In FIG. 1, 1 is a light source comprising a semiconductor laser or a relatively coherent light emitting diode, and beams emitted from this light source are made parallel by a collimator lens 2 and are then incident on a movable plate 4.

The movable plate 4 has a phase type diffraction grating 7 and a Fresnel zone plate 8, is disposed approximately perpendicularly to the optical axis of the parallel beams formed by the collimator lens 2, and is directly coupled to a rotating shaft 3 with a rotation center parallel to the optical axis so as to rotate around the rotating shaft 3. Transmitted light passing through the diffraction grating 7 and Fresnel zone plate 8 of the movable plate 4 is incident on a fixed plate 5.

The fixed plate 5 has a phase type diffraction grating 9 with a pitch equal to that of the phase type diffraction grating 7 of the movable plate 4 and a Fresnel zone plate 10, and is disposed approximately perpendicularly to the optical axis. A light spot formed by the Fresnel zone plates 8, 10 is received by a light receiving part 11 of a light receiving device 6.

Figure 2:
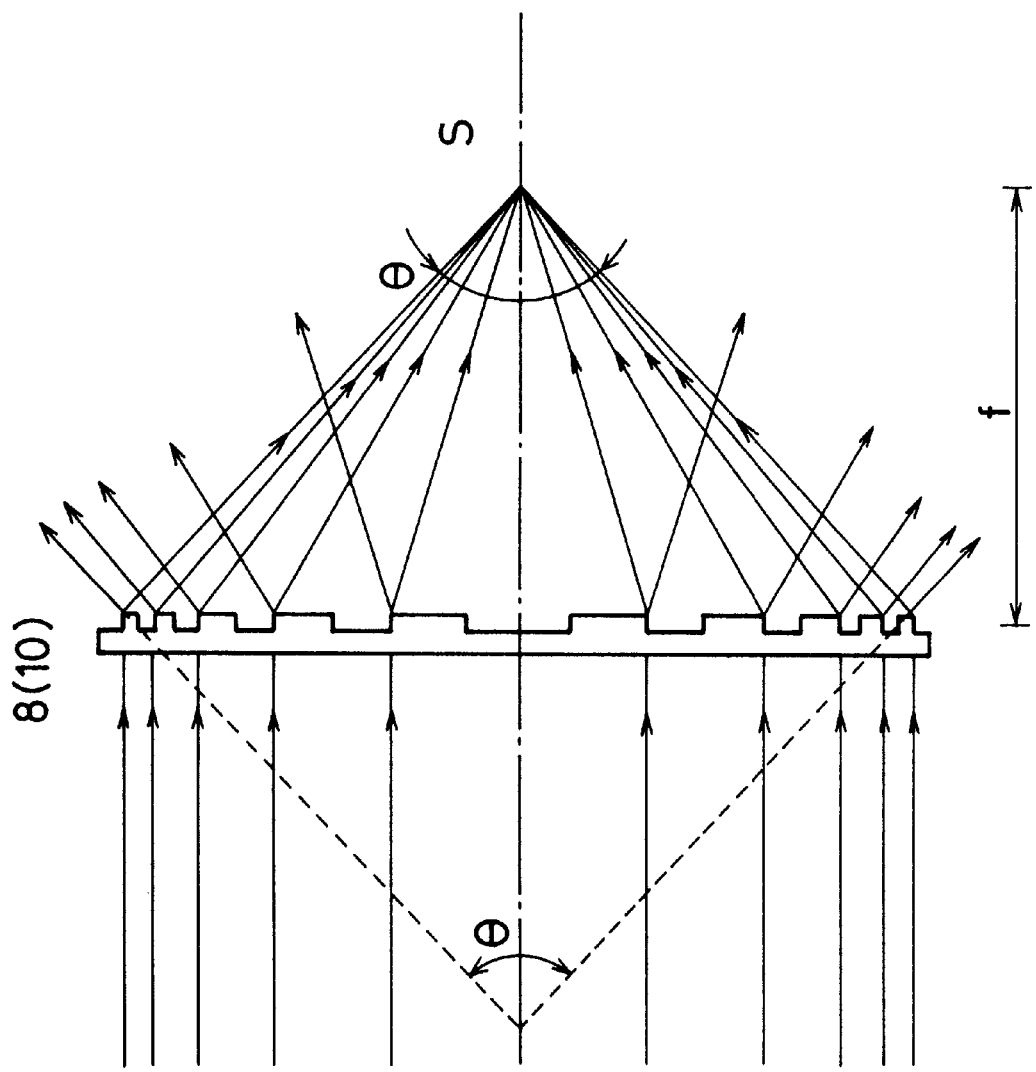
FIG. 2 shows optical paths and also shows the effects of a Fresnel zone plate to describe the effects of Embodiment 1.

The effects of the Fresnel zone plate 8 (10) are described with reference to FIG. 2. FIG. 2 shows a cross section of the Fresnel zone plate as well as the modulation of light effected by the Fresnel zone plate.

The Fresnel zone plate 8 is a collection of phase type diffraction gratings with different pitches with the pitches decreasing with increasing proximity to the outer circumference. The parallel beams incident on the Fresnel zone plate 8 form a spot S on the optical axis at distance (f) from the plate. An angle θ is the condensing angle of the beams forming the spot S. As is well known, the diffraction angle increases with decreasing pitch of the diffraction grating.

The Fresnel zone plate 8 concentrates diffracted beams at one point on the optical axis by reducing the pitch with increasing proximity to the outer circumference. As is well known, the diffraction grating provides not only +1 order diffracted light but also −1 order diffracted light. If the light diffracted from each diffraction grating to form the spot S is referred to as the +1 order diffracted light, the corresponding −1 order diffracted light is also emitted. Thus, the Fresnel zone plate 8 not only forms the condensed spot S at the angle θ but also emits light diffused at the angle θ.

Figure 3:
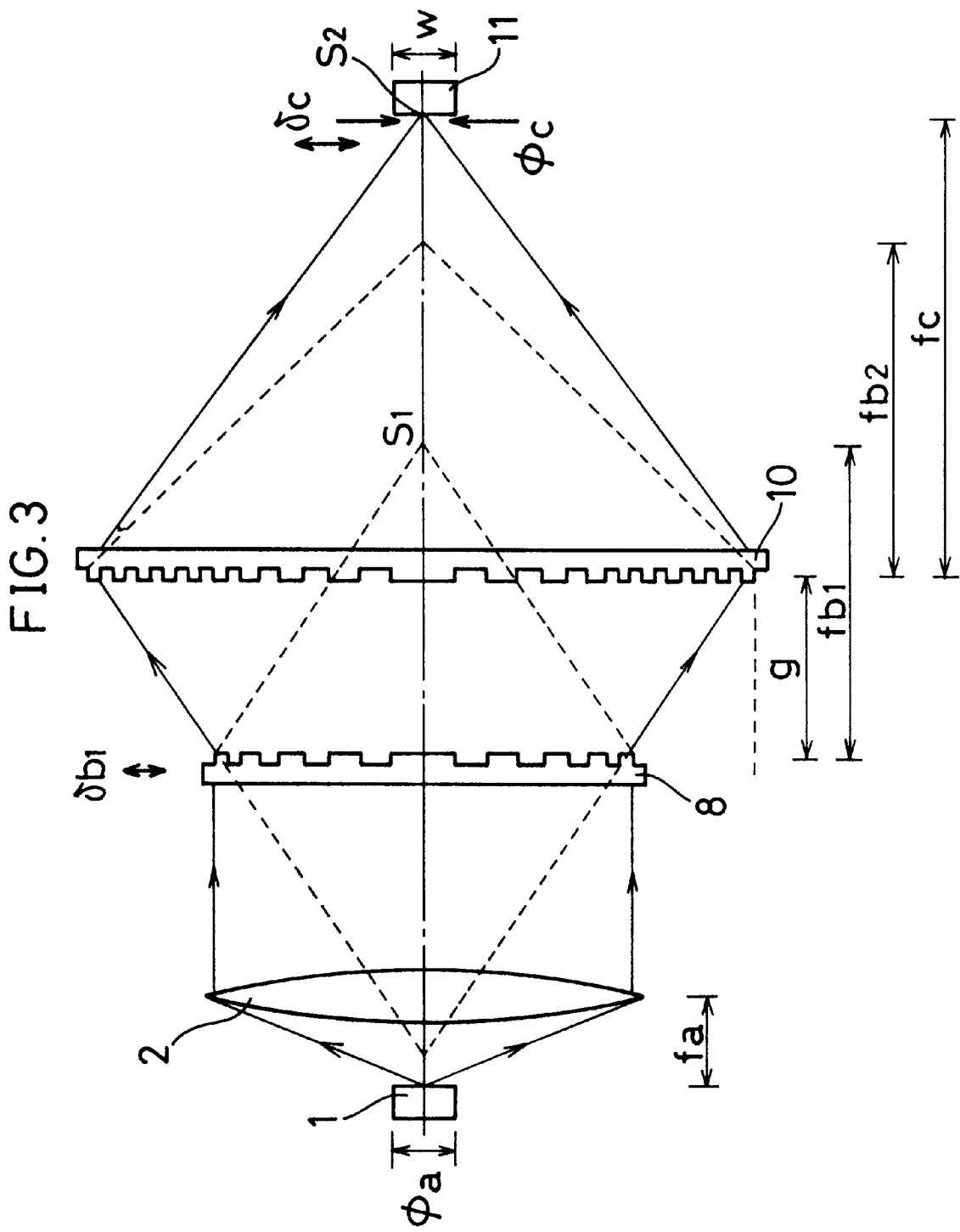
FIG. 3 shows optical paths to describe the effects of Embodiment 1.

The effects of this configuration are described with reference to FIG. 3. FIG. 3 shows the optical paths of beams transmitted through the Fresnel zone plates 8, 10 in FIG. 1.

Beams emitted from the light source 1 are first made parallel by the collimator lens 2 and then approximately perpendicularly incident on the movable plate 4. The parallel beams, incident on the Fresnel zone plate 8, form a condensed spot S1 at a distance fb1 from the Fresnel zone plate 8 and emit beams that are diffused at an angle equal to the condensing angle. The beams diffused from the Fresnel zone plate 8 are incident on the Fresnel zone plate 10 on the fixed plate 5 and form a condensed spot S2 on the light receiving part 11. The condensed spot S2 is formed on the line extending between the centers of the Fresnel zone plates 8, 10, as is well known in geometrical optics. If the focusing distances of the Fresnel zone plates 8, 10 are referred to as fb1 and fb2 and the distance between the movable plate 4 and the fixed plate 5 is referred to as g, the distance fc between the fixed plate 5 and the light spot S2 is given by Equation (7) based on simple geometry and the Gauss's Formula in optics.

$$fc = \frac{(fb+g)fb}{fb+g-fb} \qquad (7)$$

The light receiving part 11 is installed at this position. In addition, if the movement of the movable plate 4 is referred to as δb1, the movement δc of the condensed spot S2 is given by Equation (8) based on simple geometrical optic calculations.

$$\delta c = \frac{fc}{fb} \cdot \delta b \qquad (8)$$

Furthermore, if the size of the light source 1 is referred to as φa and the focusing distance of the collimator lens 2 is referred to as fa, the diameter φc of the condensed spot S2 is given by Equation (9).

$$\phi c = \frac{fc}{fa} \cdot \phi a \qquad (9)$$
$$= \frac{(fb+g)fb}{fb+g-fb} \times \frac{1}{fa} \times \phi a$$

These equations indicate that the size of the condensed spot S2 (the diameter φc) is A times as large as the size φa of the light source 1 and that the movement δc of the condensed spot S2 is B times as large as the movement δb1 of the movable plate 4, as shown in Equation (10).

$$A = \frac{\phi c}{\phi a} = \frac{fc}{fa} = \frac{(fb+g)fb}{fb+g-fb} \times \frac{1}{fa} \qquad (10)$$
$$B = \frac{\delta c}{\delta b} = \frac{fc}{fb} = \frac{(fb+g)fb}{fb+g-fb} \times \frac{1}{fb}$$

Thus, the size (the diameter φc) of the condensed spot S2 and the movement δc of the condensed spot S2 can be adjusted by adjusting the focusing distance fb1 of the Fresnel zone plate 8, the focusing distance fb2 of the Fresnel zone plate 10, the focusing distance fa of the collimator lens 2, and the distance g between the movable plate 4 and the fixed plate 5. The accuracy in detecting the moving reference point of the movable plate 4 can be increased by reducing the size (the diameter φc) of the condensed spot S2 and increasing the movement δc of the condensed spot S2.

Furthermore, according to Embodiment 1, a Z phase signal has a wave form determined by the relative locational relationship between the movable plate 4 and the fixed plate 5 and can be synchronized easily with an A/B phase signal that is also determined by the relative locational relationship between the movable plate 4 and the fixed plate 5.

For example, if a collimator lens 2 with fa of 4.5 mm is used and if fb1=0.6 mm, fb2=0.7 mm, and g=0.3 mm, then fc=3.15 mm, indicating that the size of the condensed spot S2 is 0.7 times as large as the size of the light source 1 and that the movement of the condensed spot S2 is 5.25 times as large as the movement of the movable plate. In this manner, the accuracy in detecting the Z phase can be improved by adjusting the values of fb1, fb2, fa, and g.

In addition, the tolerance near the origin of the movable plate 4 can be adjusted by adjusting the relationship between the width w of the light receiving part 11 and the size of the condensed spot S2. Furthermore, since the Fresnel zone plates 8, 10 can be realized using the recesses and convexes of the surfaces, they can be produced by a stamping process using transparent resin such as polycarbonate or acryl as a material of the substrate.

Although Embodiment 1 uses the Fresnel zone plate 8 in the Z phase signal region on the movable plate 4 as a diffusing element and the Fresnel zone plate 10 in the Z phase signal region on the fixed plate 5 as a condensing element, the same effects can be obtained by using the Fresnel zone plate 8 in the Z phase signal region on the movable plate 4 as the condensing element and the Fresnel zone plate 10 in the Z phase signal region on the fixed plate 5 as the diffusing element.

More efficient effects can be obtained by using as the light source 1 a source with a relatively large light emitting part such as a light emitting diode in which the diameter of its light emitting part is several times as large as that of the wave length.

Although Embodiment 1 uses fa=4.5 mm, fb1=0.6 mm, fb2=0.7 mm, and g=0.3 mm, efficient effects can also be obtained with other values.

(Embodiment 2)

Figure 4:
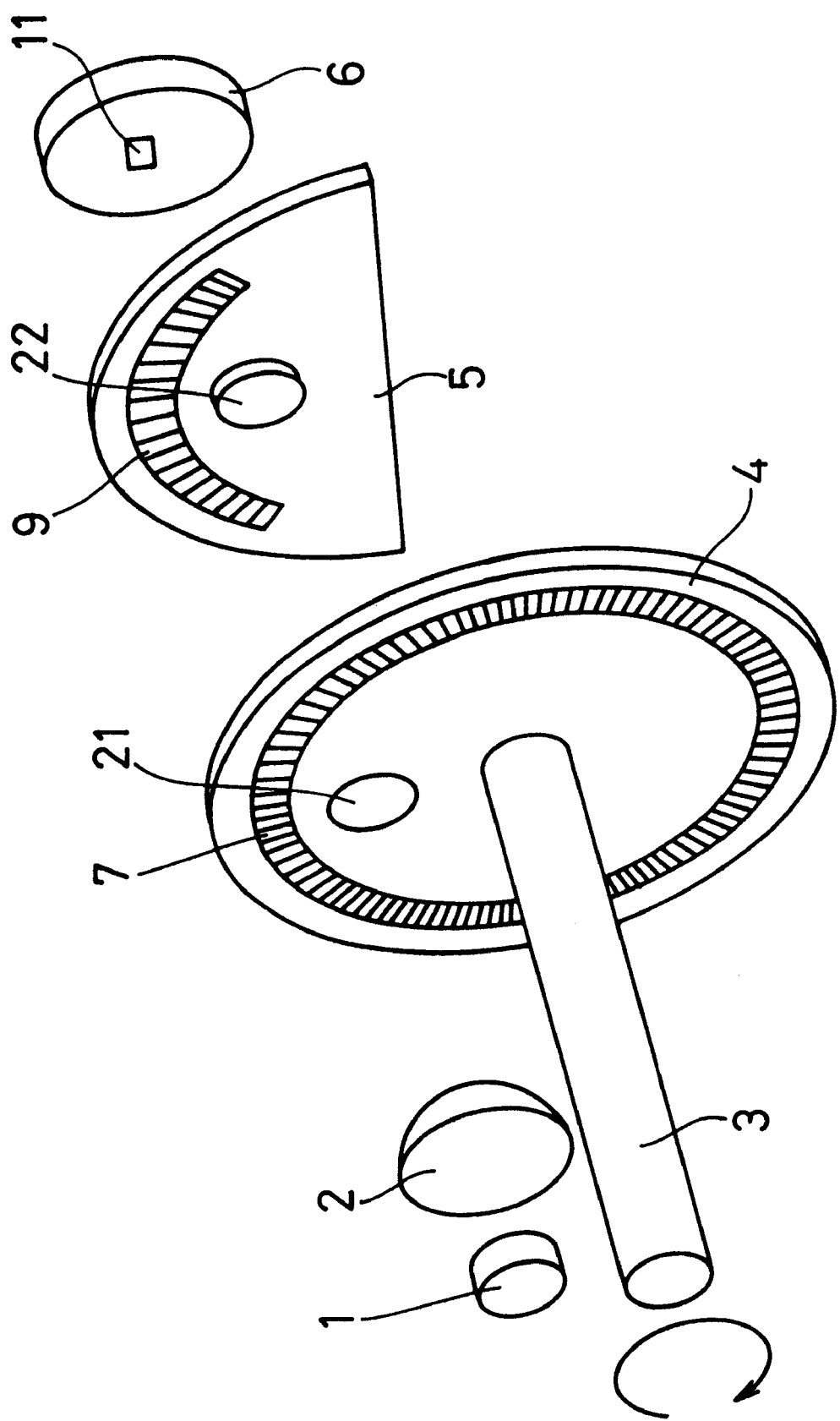
FIG. 4 is a schematic representation showing a configuration of an optical encoder according to Embodiment 2 of this invention.

FIG. 4 shows a basic configuration of an optical encoder showing Embodiment 2 of this invention. The same components as in FIG. 1 showing Embodiment 1 have the same reference numerals and therefore their description is omitted.

In FIG. 4, 21 is a concave lens installed on the movable plate 4 instead of the Fresnel zone plate 8 and 22 is a convex lens installed on the fixed plate 5 instead of the Fresnel zone plate 10. The light receiving part 11 receives a spot of light formed by these lenses 21, 22.

Figure 5:
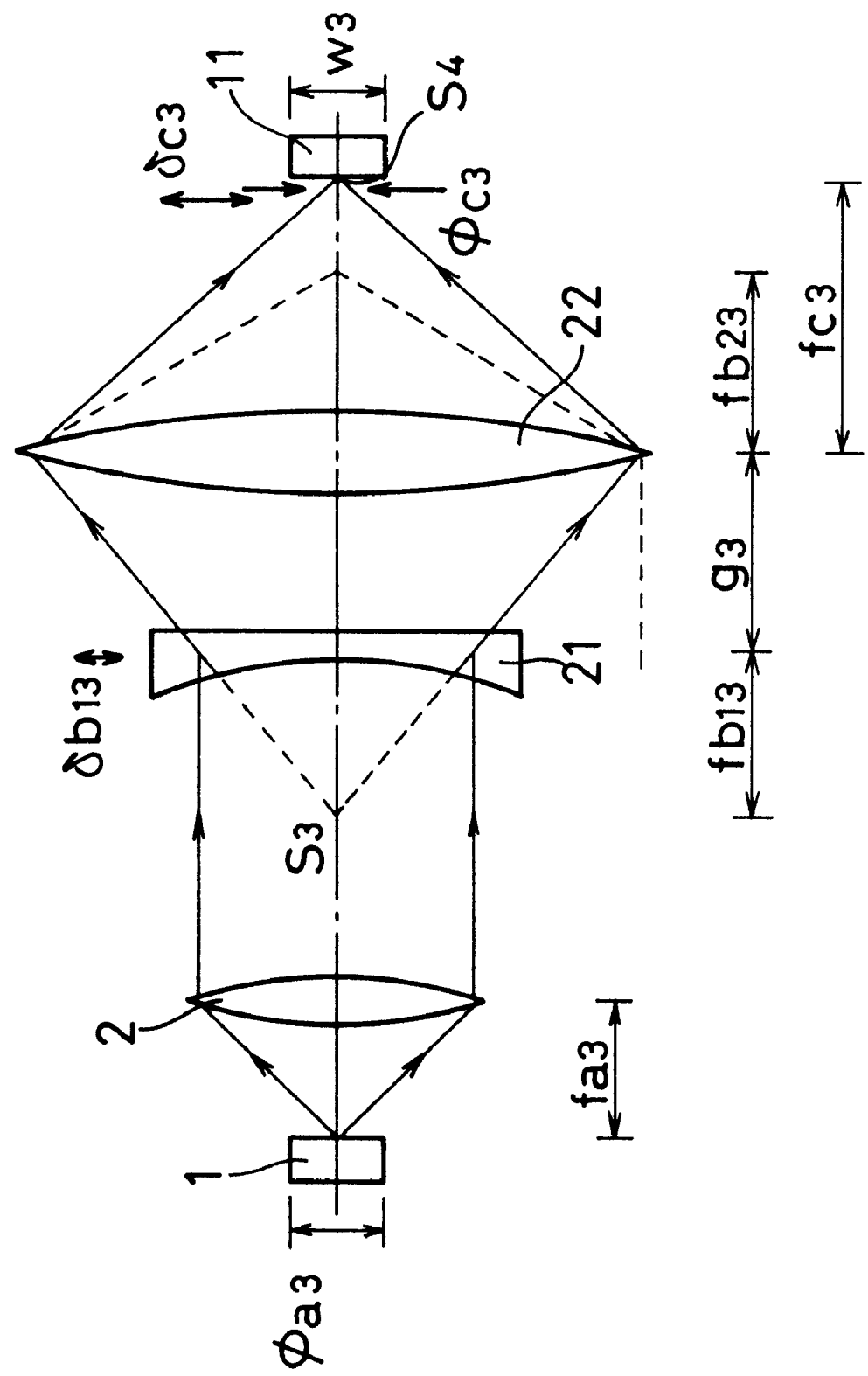
FIG. 5 shows optical paths to describe the effects of Embodiment 2.

The effects of this constitution are described with reference to FIG. 5.

Beams emitted from the light source 1 are first made parallel by the collimator lens 2 and are then approximately perpendicularly incident on the movable plate 4. The parallel beams, incident on the concave lens 21 of the movable plate 4, are diffused at a condensing angle at which a condensed spot S3 is formed at a distance fb13 from the concave lens 21. The beams diffused and emitted from the concave lens 21 are incident on the convex lens 22 on the fixed plate 5 to form a light spot S4 on the light receiving part 11. The light spot S4 is formed on the line extending between the centers of the lenses 21, 22, as is well known in geometrical optics.

If the focusing distances of the lenses 21, 22 are referred to as fb13 and fb23 and the distance between the movable plate 4 and the fixed plate 5 is referred to as g3, the distance fc3 between the fixed plate 5 and the light spot S4 is given by Equation (11) based on simple geometry and the Gauss's Formula in optics.

$$fc = \frac{(fb+g)fb}{fb+g-fb} \qquad (11)$$

The light receiving part 11 is installed at this position. In addition, if the movement of the movable plate 4 is referred to as δb13, the movement δc3 of the condensed spot S4 is given by Equation (12) based on simple geometrical optic calculations.

$$\delta c = \frac{fc}{fb} \cdot \delta b \tag{12}$$

Furthermore, if the size of the light source 1 is referred to as φa3 and the focusing distance of the collimator lens 2 is referred to as fa3, the diameter φc3 of the condensed spot S4 is given by Equation (13).

$$\phi c = \frac{fc}{fa} \cdot \phi a \tag{13}$$
$$= \frac{(fb+g)fb}{fb+g-fb} \times \frac{1}{fa} \times \phi a$$

These equations indicate that the size (the diameter φc3) of the condensed spot S4 is C times as large as the size φa3 of the light source 1 and that the movement φc3 of the condensed spot S4 is D times as large as the movement δb13 of the movable plate 4, as shown in Equation (14).

$$C = \frac{(fb+g)fb}{fb+g-fb} \times \frac{1}{fa} \tag{14}$$
$$D = \frac{(fb+g)fb}{fb+g-fb} \times \frac{1}{fb}$$

Thus, the size (the diameter) φc3 of the condensed spot S4 and the movement δc3 of the condensed spot S4 can be adjusted by adjusting the focusing distance fb13 of the lens 21, the focusing distance fb23 of the lens 22, the focusing distance fa3 of the collimator lens 2, and the distance (g3) between the movable plate 4 and the fixed plate 5. The accuracy in detecting the moving reference point of the movable plate 4 can be improved by reducing the size (the diameter) φc3 of the condensed spot S4 and increasing the movement δc3 of the condensed spot S4.

Furthermore, according to Embodiment 2, the Z phase signal has a wave form determined by the relative locational relationship between the movable plate 4 and the fixed plate 5 and can be synchronized easily with the A/B phase signal that is also determined by the relative locational relationship between the movable plate 4 and the fixed plate 5.

For example, if a collimator lens 2 with fa3 of 4.5 mm is used and if fb13=0.6 mm, fb23=0.7 mm, and g3=0.3 mm, then fc3=3.15 mm, indicating that the size of the condensed spot S4 is 0.7 times as large as the size of the light source 1 and that the movement of the condensed spot S4 is 5.25 times as large as the movement of the movable plate 4. In this manner, the accuracy in detecting the Z phase can be improved by adjusting the values of fb13, fb23, fa3, and g3.

In addition, the tolerance near the origin of the movable plate 4 can be adjusted by adjusting the relationship between the width w 3 of the light receiving part 11 and the size of the condensed spot S4. Furthermore, since the lenses 21, 22 can be realized using the recesses and convexes of the surfaces, they can be produced by a stamping process using transparent resin such as polycarbonate or acryl as a material of the substrate.

Although Embodiment 2 uses the concave lens 21 as an optical element in the Z phase signal region on the movable plate 4 and the convex lens 22 as an optical element in the Z phase signal region on the fixed plate 5, the same effects can be obtained by using the convex lens as the optical element in the Z phase signal region on the movable plate 4 and the concave lens as the optical element in the Z phase signal region on the fixed plate 5.

More efficient effects can be obtained by using as the light source a source with a relatively large light emitting part such as a light emitting diode in which the diameter of its light emitting part is several times as large as that of the wave length.

Although Embodiment 2 uses fa3=4.5 mm, fb13=0.6 mm, fb23=0.7 mm, and g3=0.3 mm, efficient effects can also be obtained with other values.

(Embodiment 3)

Figure 6:
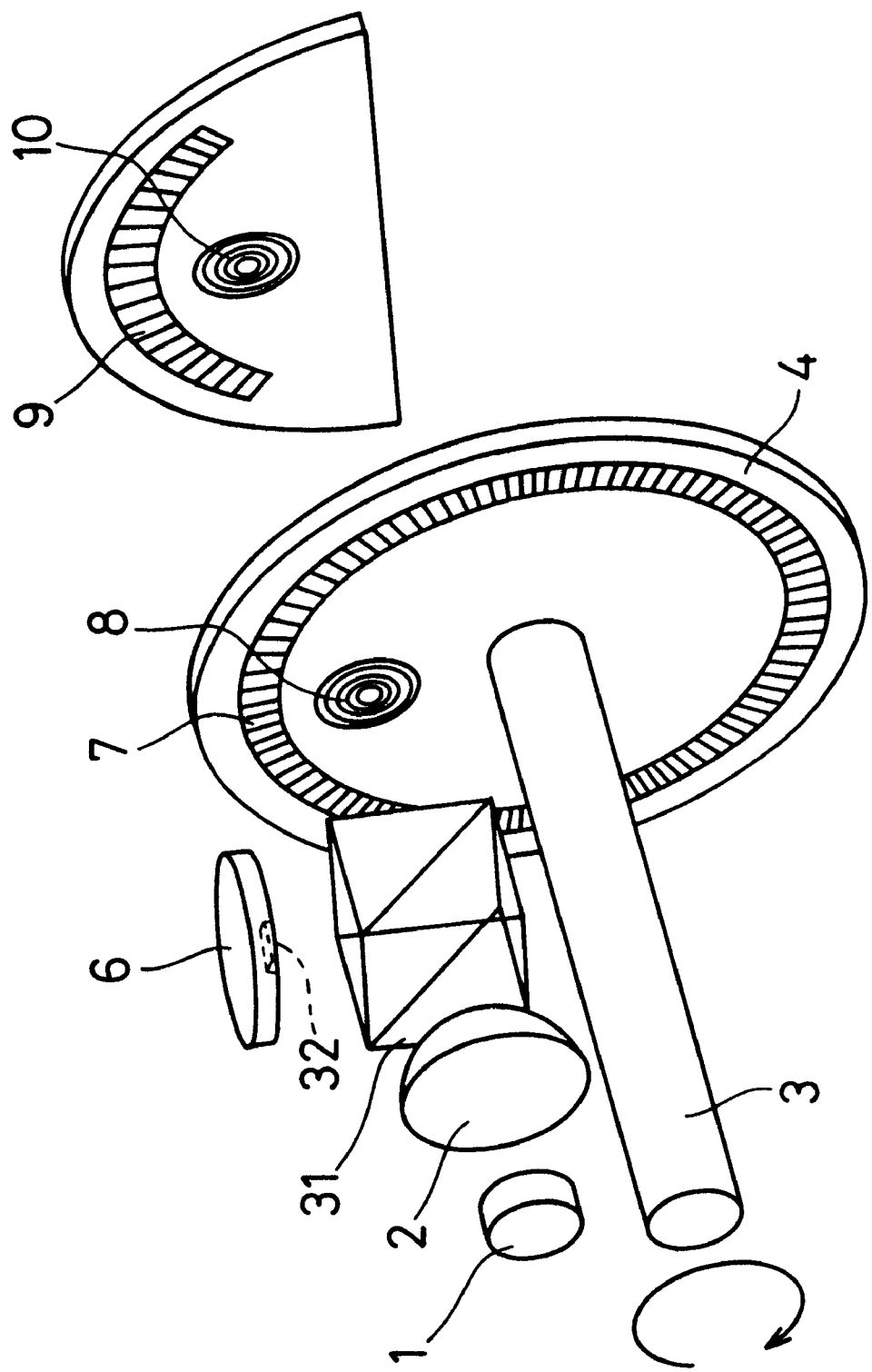
FIG. 6 is a schematic representation showing a configuration of an optical encoder according to Embodiment 3 of this invention.

FIG. 6 shows a basic configuration of an optical encoder showing Embodiment 3 of this invention. The same components as in FIG. 1 showing Embodiment 1 have the same reference numerals and their description is omitted.

In FIG. 6, 31 is a half mirror that is disposed between the collimator lens 2 and the movable plate 4 along the optical axis of beams made parallel by the collimator lens 2 and that guides a spot of light formed by the Fresnel zone plates 8, 10 and comprising the beams emitted by the light source 1, to a light receiving part 32 of the light receiving device 6 disposed above. The light receiving part 32 receives the spot of light. The Fresnel zone plate 10 is of a reflecting type.

Figure 7:
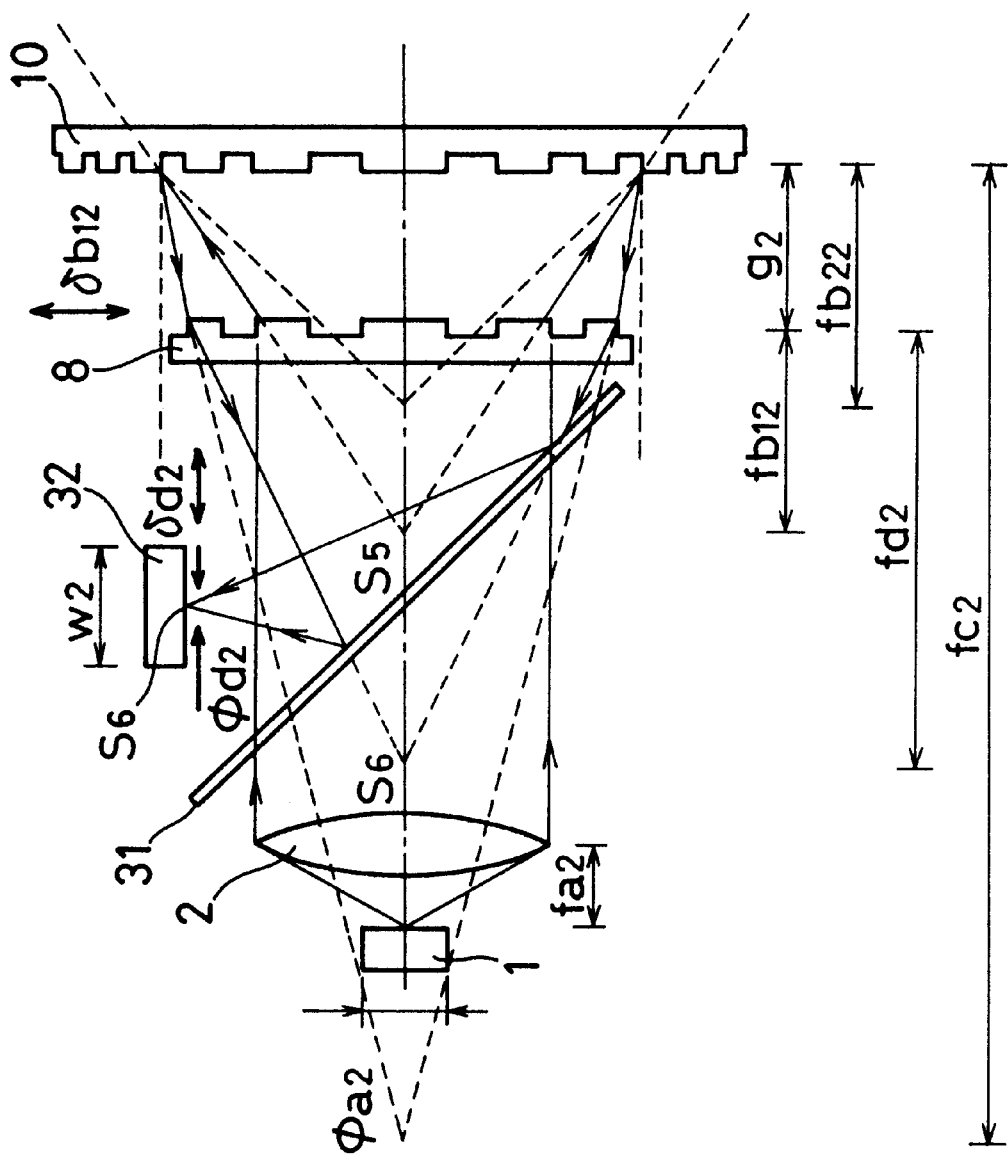
FIG. 7 shows optical paths to describe the effects of Embodiment 3.

The effects of this constitution are described with reference to FIG. 7.

Beams emitted from the light source 1 are first made parallel by the collimator lens 2 and are then approximately perpendicularly incident on the movable plate 4. The parallel beams, incident on the Fresnel zone plate 8 of the movable plate 4, form a condensed spot S5 at a focusing distance fb12 from the Fresnel zone plate 8 and are simultaneously diffused at an angle equal to this condensing angle. The beams diffused and emitted from the Fresnel zone plate 8 are incident on the reflecting Fresnel zone plate 10 on the fixed plate 5 and are reflected while being condensed. These beams are again incident on the Fresnel zone plate 8 on the movable plate 4 to create a spot of light S6. The spot of light S6 is bent by the half mirror 31 off the optical axis of light from the light source 1 and is incident on the light receiving part 32.

If the focusing distances of the Fresnel zone plates 8, 10 are referred to as fb12 and fb22 and the distance between the movable plate 4 and the fixed plate 5 is referred to as g2, the distance fc2 between the Fresnel zone plate 10 and the condensed light spot when light is diffused by the Fresnel zone plate 8 and reflected and condensed by the Fresnel zone plate 10 is given by Equation (15) based on the Gauss's Formula in geometrical optics.

$$fc = \frac{fb(fb+g)}{fb+g-fb} \tag{15}$$

In addition, if the distance between the movable plate 4 and a condensed spot S6 occurring if the half mirror 31 is absent is referred to as fd2, when light, reflected and condensed by the Fresnel zone plate 10, is incident on the Fresnel zone plate 8 and forms the light spot S6 through the half mirror 31, fd2 is given by Equation (16) based on the Gauss's Formula in geometrical optics.

$$fd = \frac{fb(fc+g)}{fc+g-fb} \tag{16}$$

The movement δd2 of the condensed spot S6 is given by Equation (17) using the movement δb12 of the movable plate 4.

$$\delta d = \frac{fd}{fb} \cdot \delta b \quad (17)$$

In addition, the size (the diameter) φd2 of the condensed spot S6 is given by Equation (18) using the size φa2 of the light source and the focusing distance fa2 of the collimator lens 2.

$$\phi d = \frac{fd}{fa} \cdot \phi a \quad (18)$$

Thus, the size (the diameter) φd2 of the condensed spot S6 and the movement δd2 of the light spot S6 can be adjusted by adjusting the focusing distance fb12 of the Fresnel zone plate 8, the focusing distance fb22 of the Fresnel zone plate 10, the focusing distance fa2 of the collimator lens 2, and the distance g2 between the movable plate 4 and the fixed plate 5. The accuracy in detecting the moving reference point of the movable plate 4 can be improved by reducing the size φd2 of the condensed spot S6 and increasing the movement δd2 of the light spot S6.

Furthermore, according to Embodiment 3, the Z phase signal has a wave form determined by the relative locational relationship between the movable plate 4 and the fixed plate 5 and can be synchronized easily with the A/B phase signal that is also determined by the relative locational relationship between the movable plate 4 and the fixed plate 5. Furthermore, since the Fresnel zone plates 8, 10 can be realized using the recesses and convexes of the surfaces, they can be produced by a stamping process using transparent resin such as polycarbonate or acryl as a material of the substrate.

For example, if a collimator lens 2 with fa2 of 4.5 mm is used and if fb12=1 mm, fb22=5 mm, and g2=0.3 mm, then fd2=2.23 mm, indicating that the size of the condensed spot S6 is 0.5 times as large as the size of the light source 1 and that the movement of the condensed spot S6 is 2.23 times as large as the movement of the movable plate 4. In this manner, the accuracy in detecting the Z phase can be improved by adjusting the values of fb12, fb22, fa2, and g2.

In addition, the tolerance near the origin of the movable plate 4 can be adjusted by adjusting the relationship between the width w 2 of the light receiving part 32 and the size of the light spot S6.

Although Embodiment 3 uses the Fresnel zone plate 8 in the Z phase signal region on the movable plate 4 as a diffusing element operative when light from the light source 1 is incident thereon and as a condensing element operative when light from the fixed plate 5 is re-incident thereon and uses the Fresnel zone plate 10 in the Z phase signal region on the fixed plate 5 as a condensing element, the same effects can be obtained by using other combinations of the use of the Fresnel zone plate 8 in the Z phase signal region on the movable plate 4 and the Fresnel zone plate 10 in the Z phase signal region on the fixed plate 5 as a diffusing or condensing element or using concave or convex lenses instead of the Fresnel zone plates 8, 10.

More efficient effects can be obtained by using as the light source 1 a source with a relatively large light emitting part such as a light emitting diode in which the diameter of its light emitting part is several times as large as that of the wave length.

Although Embodiment 3 uses fa2=4.5 mm, fb12=1 mm, fb22 =5 mm, and g2=0.3 mm, efficient effects can also be obtained with other values.

(Embodiment 4)

Figure 8:
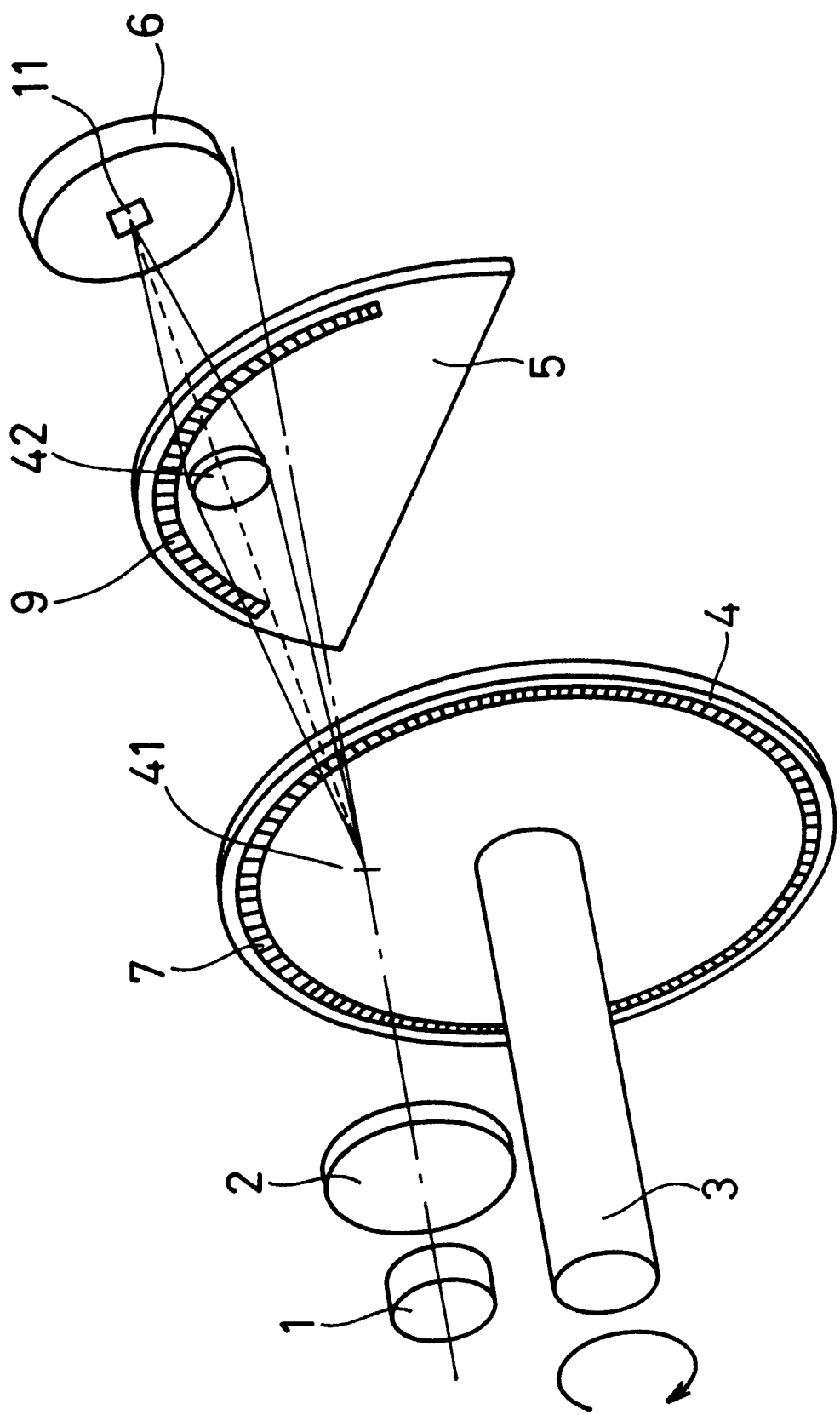
FIG. 8 is a schematic representation showing a configuration of an optical encoder according to Embodiment 4 of this invention.

FIG. 8 shows a basic configuration of an optical encoder showing Embodiment 4 of this invention. The same components as in FIG. 1 showing Embodiment 1 have the same reference numerals and their description is omitted.

In FIG. 8, 41 is a light scattering source installed on the movable plate 4 instead of the Fresnel zone plate 8 and comprising fine recesses and convexes on the surface, and 42 is a convex lens installed on the fixed plate 5 instead of the Fresnel zone plate 10. The light receiving part 11 receives a spot of light formed by the convex lens 42 by condensing scattering light generated when light emitted from the light source 1 is incident on the light scattering source 41.

Figure 9:
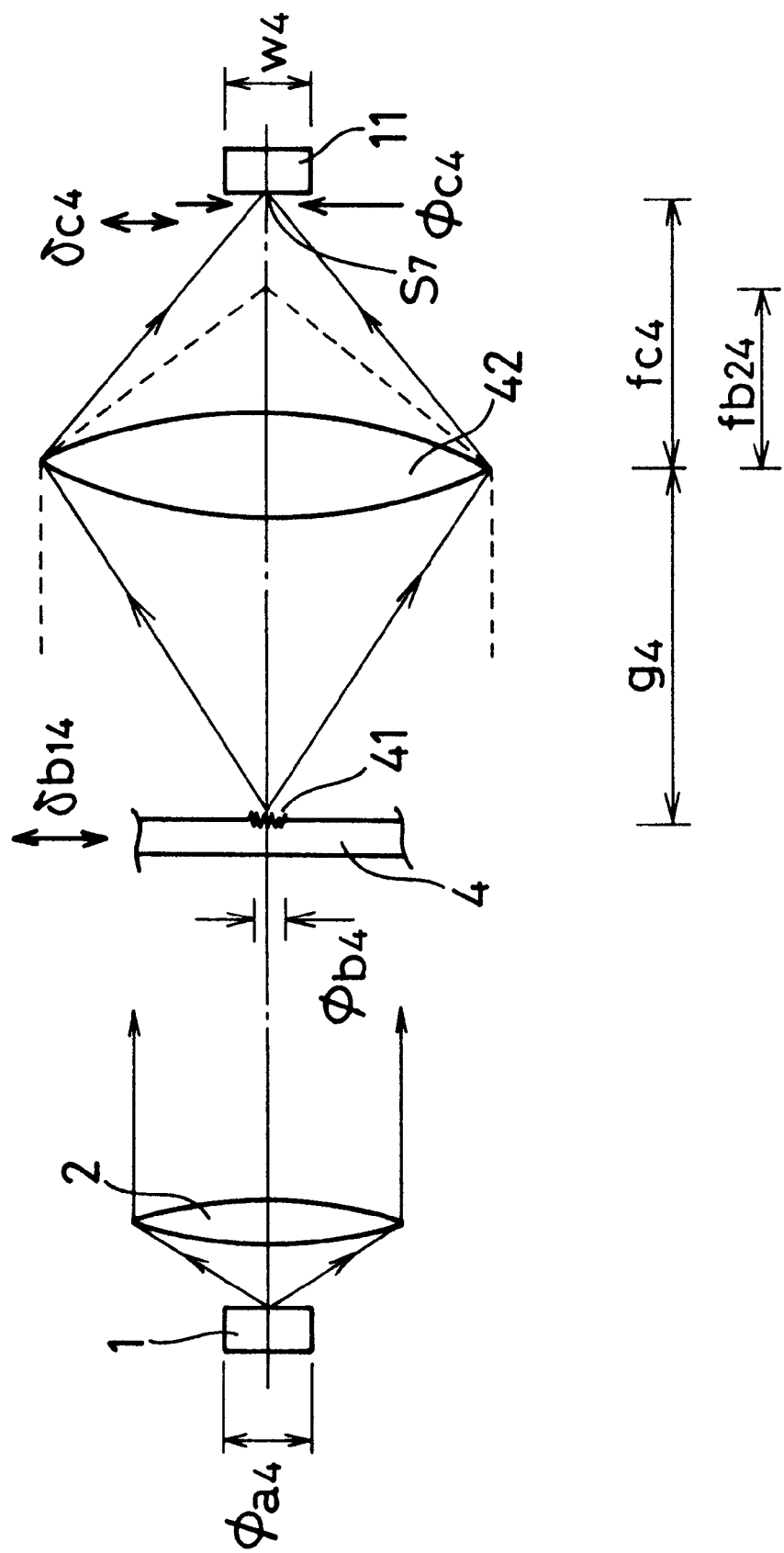
FIG. 9 shows optical paths to describe the effects of Embodiment 4.

The effects of this constitution are described with reference to FIG. 9.

Beams emitted from the light source 1 are first made parallel by the collimator lens 2 and are then approximately perpendicularly incident on the movable plate 4. The parallel beams, incident on the light scattering source 41 of the movable plate 4, are diffused therefrom. The beams diffused and emitted from the light scattering source 41 are incident on the convex lens 42 on the fixed plate 5 to form a light spot S7 on the light receiving part 11. The light spot S7 is formed on the line extending between the centers of the light scattering source 41 and the convex lens 42, as is well known in geometrical optics.

If the focusing distance of the convex lens 42 is referred to as fb24 and the distance between the movable plate 4 and the fixed plate 5 is referred to as g4, the distance fc4 between the fixed plate 5 and the light spot S7 is given by Equation (19) based on simple geometrical optics and the Gauss's Formula in optics.

$$fc = \frac{g \cdot fb}{g - fb} \quad (19)$$

The light receiving part 11 is installed at this position. In addition, if the movement of the movable plate 4 is referred to as δb14, the movement δc4 of the light spot S7 is given by Equation (20) based on simple geometrical optic calculations.

$$\delta c = \frac{fc}{g} \cdot \delta b \quad (20)$$

In addition, if the size of the light scattering source 41 is referred to as φb4, the diameter φc4 of the light spot S7 is given by Equation (21).

$$\phi c = \frac{fc}{g} \cdot \phi b \quad (21)$$

These equations indicate that the size (the diameter) φc4 of the light spot S7 is E times as large as the size φa4 of the light source 1 and that the movement δc4 of the light spot S7 is F times as large as the movement δb14 of the movable plate 4, as shown in Equation (22).

$$E = \frac{fc}{g} \cdot \phi b \cdot \frac{1}{\phi a} \quad (22)$$

$$F = \frac{fc}{g}$$

Thus, the size (the diameter) $\phi c4$ of the light spot S7 and the movement $\delta c4$ of the light spot S7 can be adjusted by adjusting the size $\phi b4$ of the light scattering source 41, the focusing distance fb24 of the convex lens 42, and the distance g4 between the movable plate 4 and the fixed plate 5. The accuracy in detecting the moving reference point of the movable plate 4 can be improved by reducing the size (the diameter) $\phi c4$ of the light spot S7 and increasing the movement $\delta c4$ of the light spot S7.

Furthermore, according to Embodiment 4, the Z phase signal has a wave form determined by the relative locational relationship between the movable plate 4 and the fixed plate 5 and can be synchronized easily with the A/B phase signal that is also determined by the relative locational relationship between the movable plate 4 and the fixed plate 5. In addition, the sensitivity in detecting the Z phase can be improved by disposing the light scattering source 41, the convex lens 42, and the light receiving part 11 off the optical axis of the parallel beams formed by the collimator lens 2 in order to prevent the light from the light source 1 from being incident on the light receiving part 11 when the light from the light scattering source 41 does not form the light spot S7 on the light receiving part 11.

For example, if a light source 1 with $\phi a4$ of 200 $\mu$m is used and if fb24=0.2 mm, g4=0.3 mm, and $\phi b4$=50 $\mu$m, then E=0.5 and F=2, indicating that the size of the light spot S7 is 0.5 times as large as the size of the light source 1 and that the movement of the light spot S7 is twice as large as the movement of the movable plate 4. In this manner, the accuracy in detecting the Z phase can be improved by adjusting the size $\phi b4$ of the light scattering source 41, the focusing distance fb24 of the convex lens 42, and the distance g4 between the movable plate 4 and the fixed plate 5.

In addition, since the convex lens 42 can be realized using the recesses and convexes of the surface and the light scattering source 41 can be realized using the fine recesses and convexes of the surface, they can be produced by a stamping process using transparent resin such as polycarbonate or acryl as a material of the substrate.

Although Embodiment 4 uses the convex lens 42 as a condensing element on the fixed plate 5, a Fresnel zone plate or a reflecting condensing element may be used.

Although Embodiment 4 uses fb24=0.2 mm, g4=0.3 mm, and $\phi b4$=50 $\mu$m, efficient effects can also be obtained with other values.

(Embodiment 5)

Figure 10:
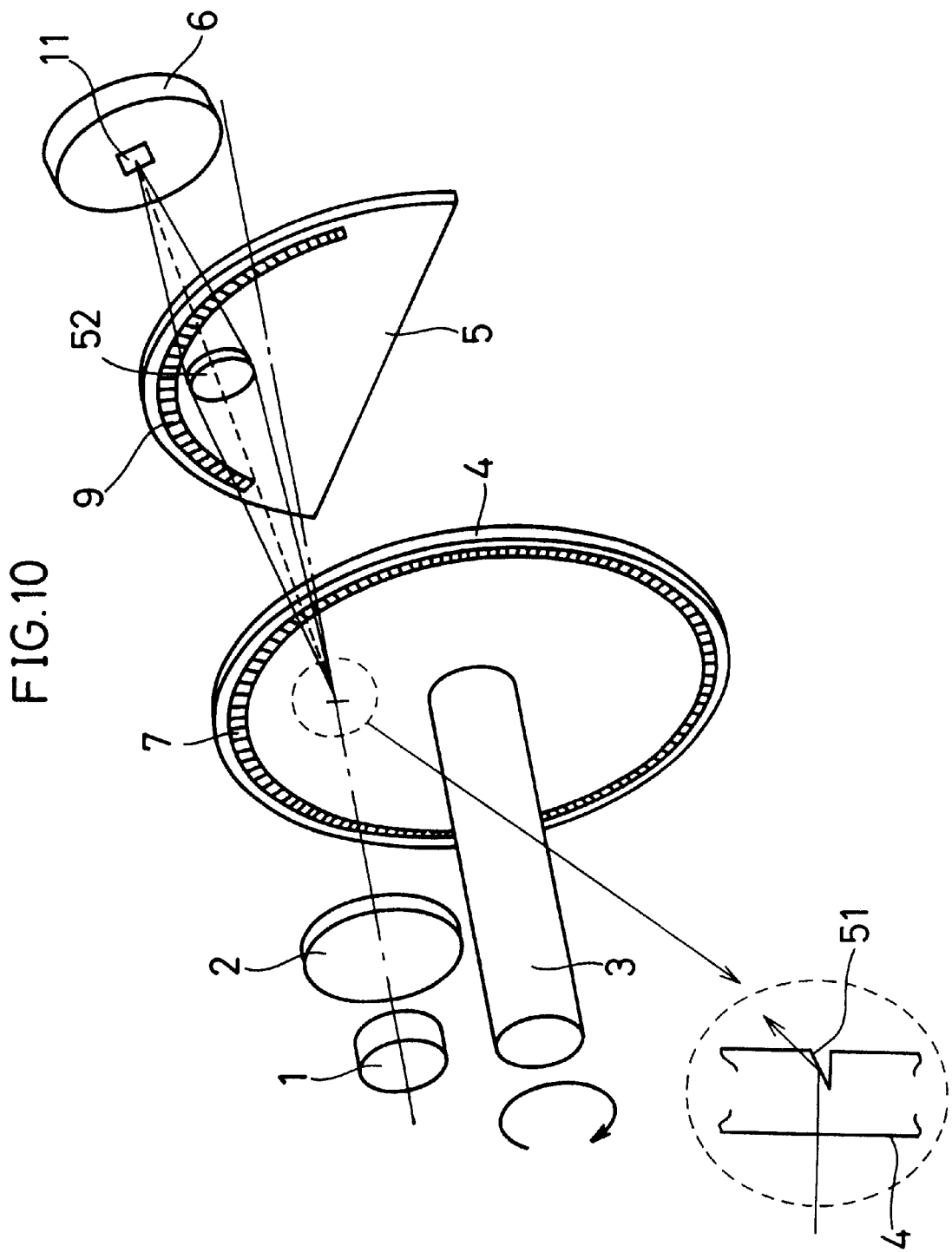
FIG. 10 is a schematic representation showing a configuration of an optical encoder according to Embodiment 4 of this invention.

FIG. 10 shows a basic configuration of an optical encoder showing Embodiment 5 of this invention. The same components as in FIG. 1 showing Embodiment 1 have the same reference numerals and their description is omitted.

In FIG. 10, 51 is a reflecting surface of a surface notch shape formed on the movable plate 4 instead of the Fresnel zone plate E, and 52 is a convex lens installed on the fixed plate 5 instead of the Fresnel zone plate 10. The light receiving part 11 receives a spot of light S8 formed by the convex lens 52 by condensing light generated when the beams from the light source 1 are incident on the reflecting surface 51 and advancing off the optical axis of the beams from the collimator lens 2.

Figure 11:
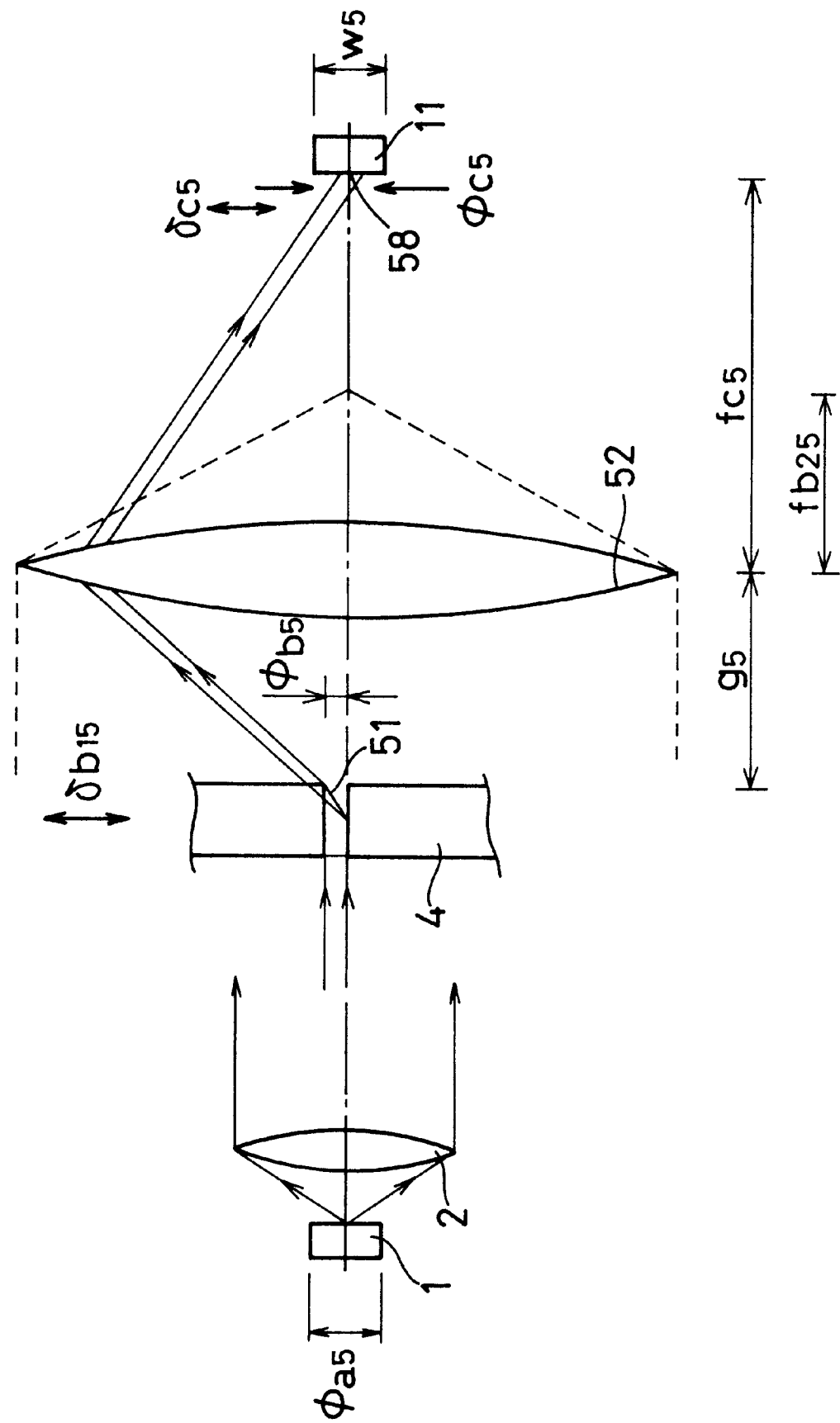
FIG. 11 shows optical paths to describe the effects of Embodiment 5.

The effects of this constitution are described with reference to FIG. 11.

Beams emitted from the light source 1 are first made parallel by the collimator lens 2 and are then approximately perpendicularly incident on the movable plate 4. The light, incident on the movable plate 4, is reflected off the optical axis of the parallel beams by the reflecting surface 51. The reflected light is incident on the convex lens 52 installed on the fixed plate 5 to form a light spot S8 on the light receiving part 11. The light spot S8 is formed on the line extending between the centers of the reflecting surface 51 and the convex lens 52, as is well known in geometrical optics.

If the focusing distance of the convex lens 52 is referred to as fb25 and the distance between the movable plate 4 and the fixed plate 5 is referred to as g5, the distance fc5 between the fixed plate 5 and the light spot S8 is given by Equation (23) based on simple geometrical optics and the Gauss's Formula in optics.

$$fc = \frac{g \cdot fb}{g - fb} \quad (23)$$

The light receiving part 11 is installed at this position. In addition, if the movement of the movable plate 4 is referred to as $\delta b15$, the movement $\delta c5$ of the light spot S8 is given by Equation (24) based on simple geometrical optic calculations.

$$\delta c = \frac{fc}{g} \cdot \delta b \quad (24)$$

In addition, if the size of the reflecting surface 51 is referred to as $\phi b5$, the diameter $\phi c5$ of the light spot S8 is given by Equation (25).

$$\phi c = \frac{fc}{g} \cdot \phi b \quad (25)$$

These equations indicate that the size (the diameter) $\phi c5$ of the light spot S8 is G times as large as the size $\phi a5$ of the light source 1 and that the movement $\delta c5$ of the light spot S8 is H times as large as the movement $\delta b15$ of the movable plate 4, as shown in Equation (26).

$$G = \frac{fc}{g} \cdot \phi b \cdot \frac{1}{\phi a} \quad (26)$$

$$H = \frac{fc}{g}$$

Thus, the size (the diameter) $\phi c5$ of the light spot S8 and the movement $\delta c5$ of the light spot S8 can be adjusted by adjusting the size $\phi b5$ of the reflecting surface 51, the focusing distance fb25 of the convex lens 52, and the distance g5 between the movable plate 4 and the fixed plate 5. The accuracy in detecting the moving reference point of the movable plate 4 can be improved by reducing the size (the diameter) $\phi c5$ of the light spot S8 and increasing the movement $\delta c5$ of the light spot S8.

Furthermore, the accuracy in detecting the Z phase can be improved by reducing the sizes of the reflecting surface 51 and the light receiving part 11. The use efficiency of light can be enhanced by setting the angle of the reflecting surface 51 such that parallel incident beams are totally reflected. Furthermore, if the substrate comprises a material with a refractive index of 1.5, the total reflection angle will be 44.4° if the atmosphere around the fixed plate 5 is air. In such a case, the parallel beams may be allowed to enter the reflecting surface at a larger angle and the totally reflected light may be condensed by the convex lens 52 and received by the light receiving part 11.

Furthermore, according to Embodiment 5, the Z phase signal has a wave form determined by the relative locational relationship between the movable plate 4 and the fixed plate 5 and can be synchronized easily with the A/B phase signal that is also determined by the relative locational relationship between the movable plate 4 and the fixed plate 5.

For example, if a light source 1 with φa5 of 200 μm is used and if fb25=0.2 mm, g5=0.3 mm, and φb5=50 μm, then G=0.5 and H=2, indicating that the size of the light spot S8 is 0.5 times as large as the size of the light source 1 and that the movement of the light spot S8 is twice as large as the movement of the movable plate 4. In this manner, the accuracy in detecting the Z phase can be improved by adjusting the size φb5 of the reflecting surface 51, the focusing distance fb25 of the convex lens 52, and the distance g5 between the movable plate 4 and the fixed plate 5.

In addition, since the convex lens 52 and the reflecting surface 51 can be realized using the recesses and convexes of the surfaces, they can be produced by a stamping process using transparent resin such as polycarbonate or acryl as a material of the substrate.

Although Embodiment 5 uses the convex lens 52 as a condensing element, similar effects can be obtained by using a Fresnel zone plate or a reflecting condensing element.

Although Embodiment 5 uses fb25=0.2 mm, g5=0.3 mm, and φb5=50 μm, efficient effects can also be obtained with other values.

(Embodiment 6)

Figure 12:
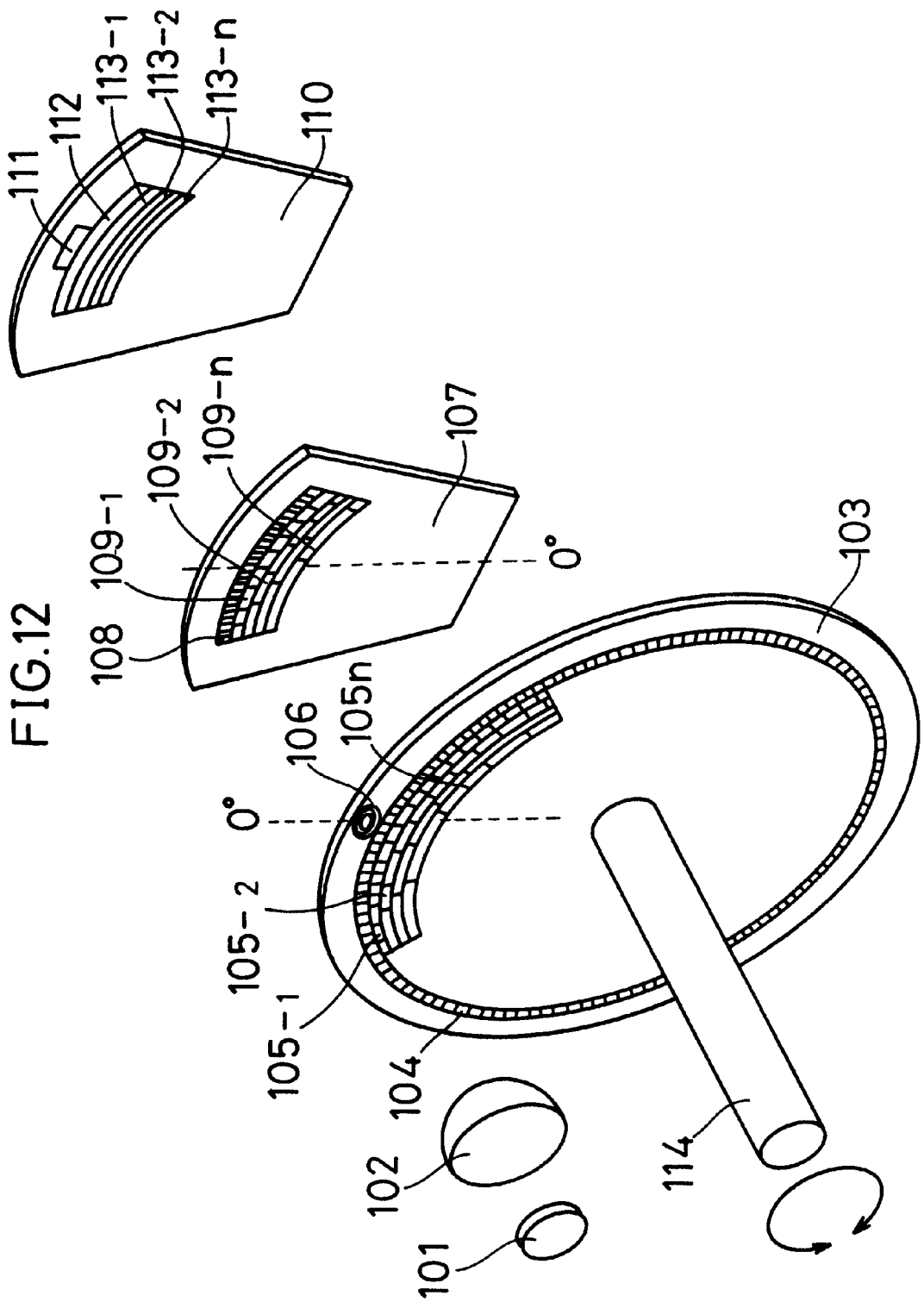
FIG. 12 is a perspective view showing a configuration of an optical encoder according to Embodiment 6 of this invention.

Embodiment 6 directed to an optical encoder and position detection method according to this invention is described with reference to FIGS. 12 to 16. FIG. 12 is a perspective view showing a basic configuration of an optical encoder according to Embodiment 6. The optical encoder shown in FIG. 12 comprises a light source 101 such as a semiconductor laser or a relatively coherent light emitting diode; a collimator lens 102 for making beams from the light source 101 parallel; a movable plate 103 disposed approximately perpendicularly to the optical axis of the parallel beams and that can be rotated around a rotating shaft 114 parallel to the optical axis; a fixed plate 107 disposed approximately perpendicularly to the optical axis; and a light receiving device 110 with a plurality of light receiving parts.

The disc-like movable plate 103 has a phase type diffraction grating 104 disposed annularly along the entire circumference; a plurality of circular phase type diffraction gratings disposed concentrically 105-1, 105-2, . . . , 105-n (n is an integer equal to or larger than 2) (hereafter generalized as 105-i (i=1 to n), which is applicable to the other cases); and a Fresnel zone plate 106. The fan-like fixed plate 107 has phase type diffraction gratings 108 and 109-i (i=1 to n) corresponding to the phase type diffraction gratings 104, 105-i (i=1 to n) of the movable plate 103 and formed as approximately circular arcs with an equal pitch. A light receiving part 111 of the light receiving device 110 receives a light spot formed by the Fresnel zone plate 106 of the movable plate 103. In addition, a light receiving part 112 receives light formed by the phase type diffraction grating 104 of the movable plate 103 and the phase type diffraction grating 108 of the fixed plate 107. A light receiving part 113-i (i=1 to n) receives light formed by the phase type diffraction gratings 105-i of the movable plate 103 and the phase type diffraction gratings 109-i of the fixed plate 107.

Figure 13:
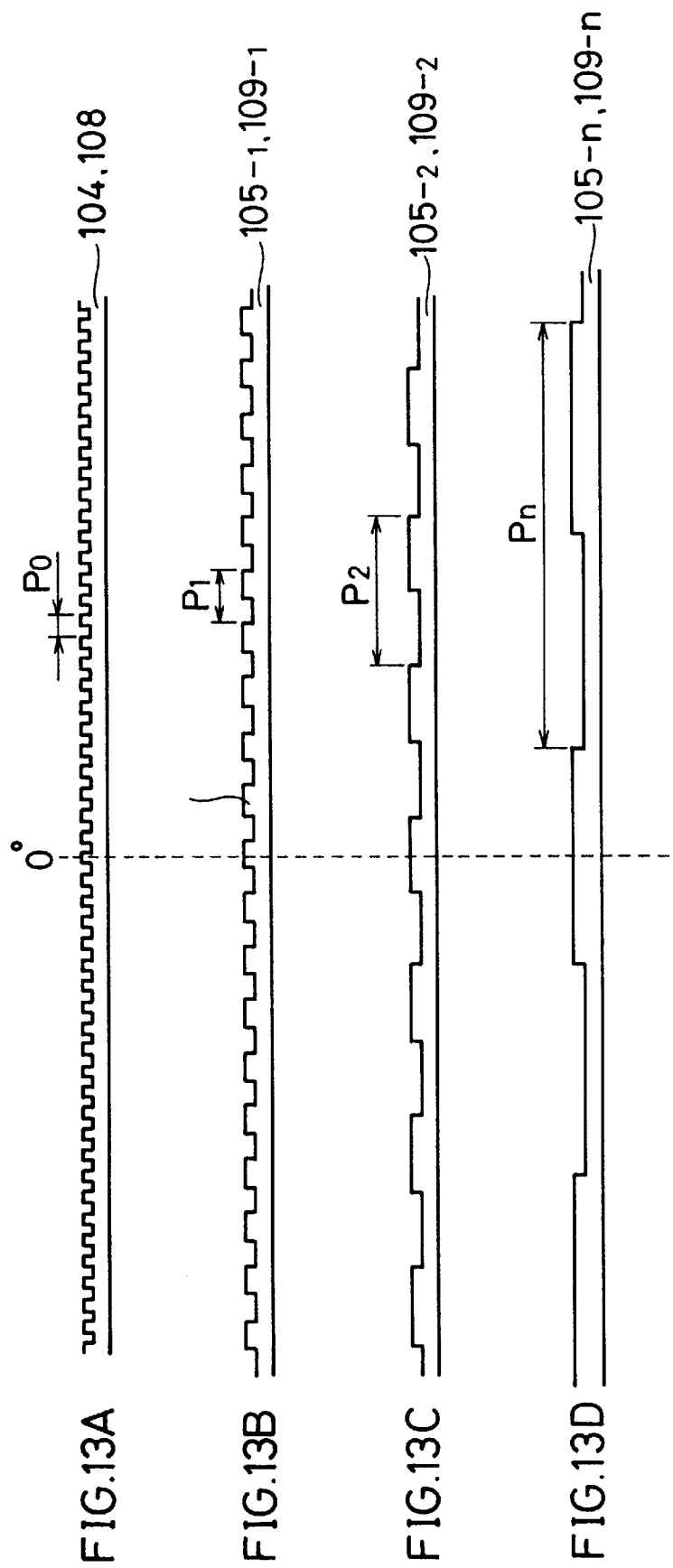
FIGS. 13A–13D show a cross section of each track of a phase optical element in Embodiment 6.

FIG. 13 shows cross sections of these phase type diffraction gratings. In FIG. 13, FIG. 13A shows a cross section of the phase type diffraction gratings 104 and 108 with a grating pitch $P_0$. FIG. 13B shows a cross section of the phase type diffraction gratings 105-1 and 109-1 with a grating pitch $P_1$. FIG. 13C shows a cross section of the phase type diffraction gratings 105-2 and 109-2 with a grating pitch $P_2$. Likewise, FIG. 13D shows a cross section of the phase type diffraction gratings 105-n and 109-n with a grating pitch $P_n$. The grating pitches $P_0, P_1, \ldots, P_n$ have sequentially larger values in this order.

Figure 52:
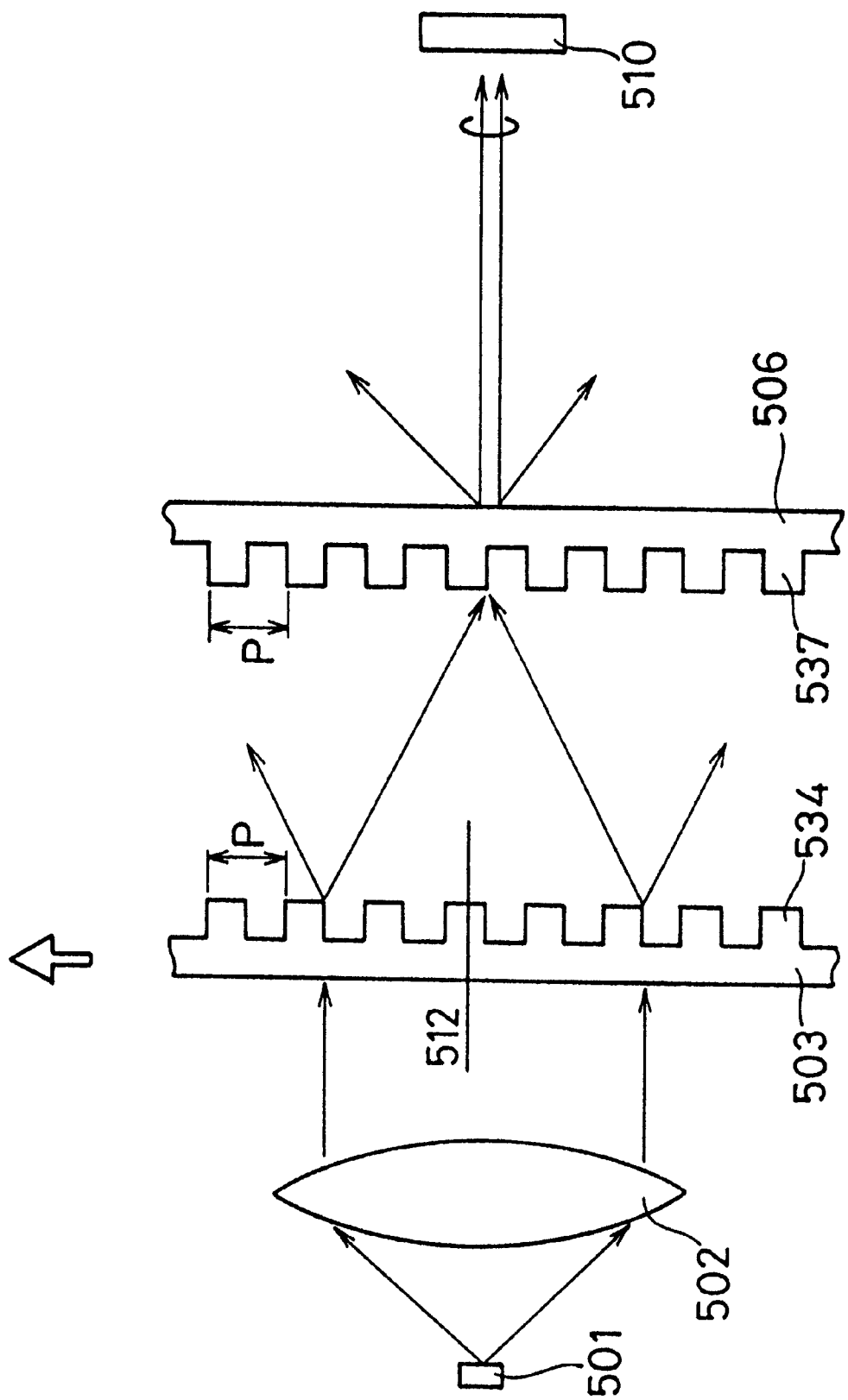
FIG. 52 shows another configuration of the optical encoder according to the first conventional example and optical paths therein.
Figure 53:
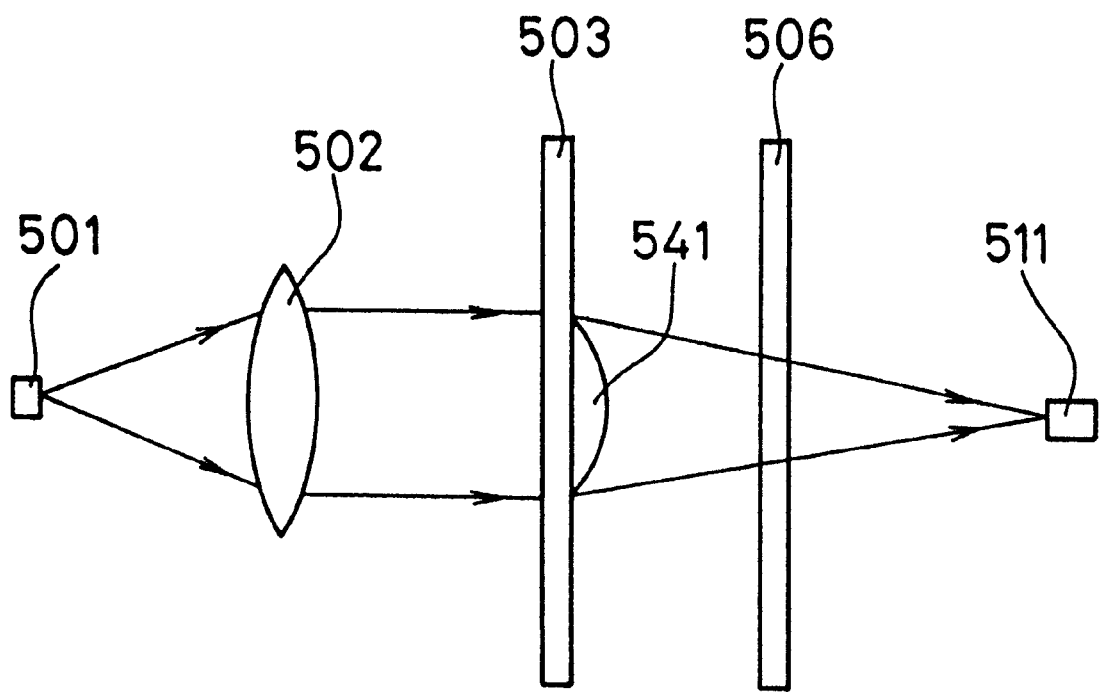
FIG. 53 shows yet another configuration of the optical encoder according to the first conventional example and optical paths therein.
Figure 54:
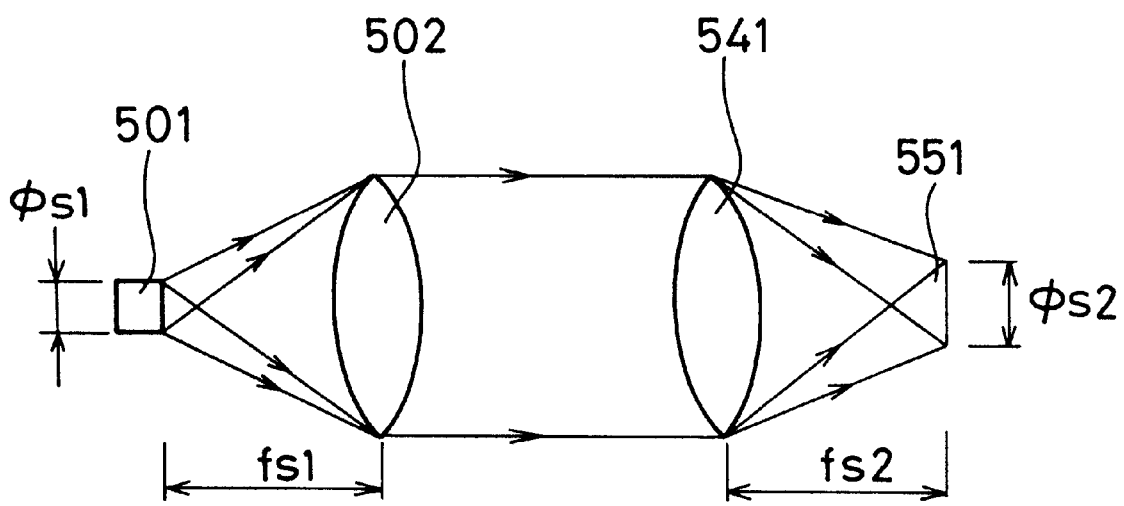
FIG. 54 shows optical paths to describe the relationship between the size of a light source and a lens constant and a light spot.
Figure 55:
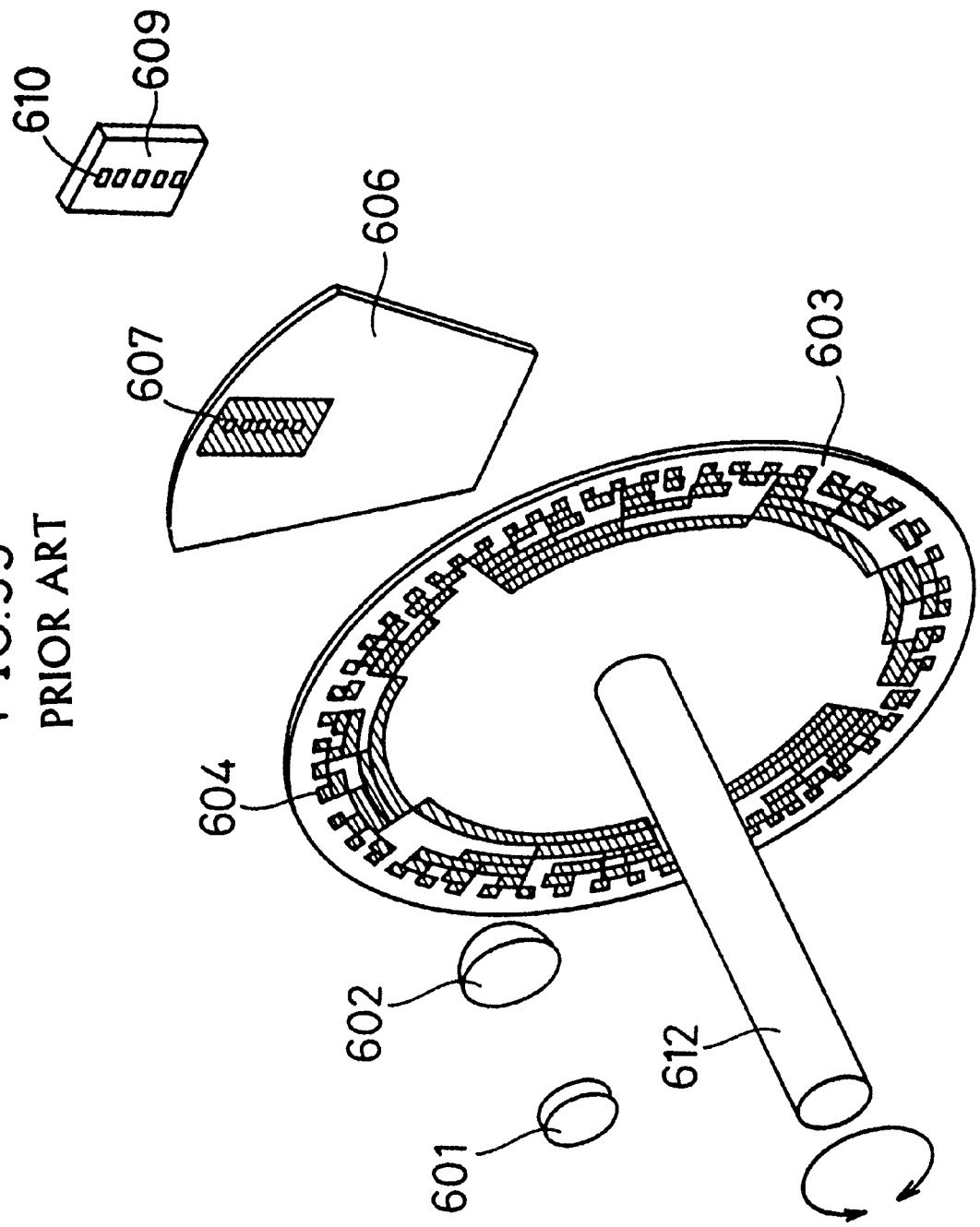
FIG. 55 is a perspective view showing a configuration of an optical encoder according to a second conventional example.
Figure 56:
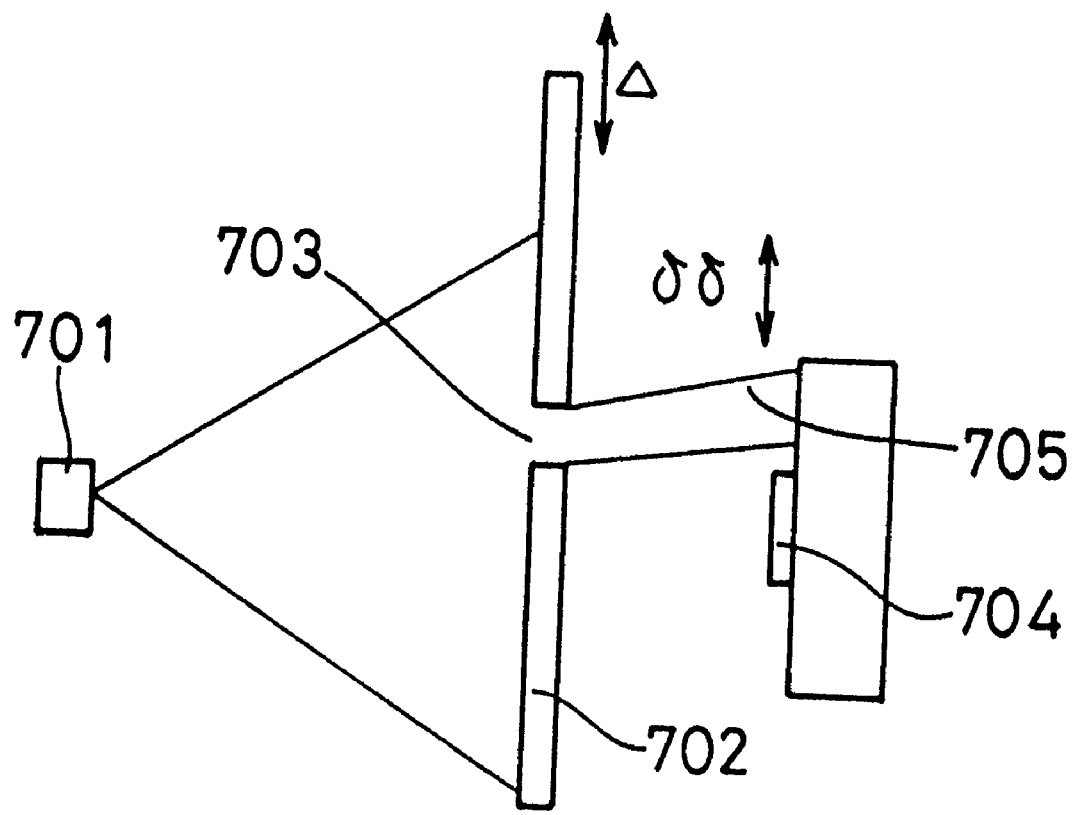
FIG. 56 is a schematic representation showing a configuration of a position detection apparatus according to a third conventional example.

The phase type diffraction gratings 104 and 108 are used for signals used to detect the movement of the movable plate 103 (A/B phase), and the phase type diffraction grating 104 is formed on the entire circumference of a circle around the rotating shaft 114 on the movable plate 103. As in the conventional example shown in FIG. 52, the phase type diffraction grating 104 on the movable plate 103 and the corresponding phase type diffraction grating 108 on the fixed plate 107 vary the intensity of light. Light incident on the movable plate 103 is diffracted into a +1 order diffracted beam and a −1 order diffracted beam by the phase type diffraction grating 104 on the movable plate 103. These diffracted beams are incident on the phase type diffraction grating 108 on the fixed plate 107 and are each diffracted into a +1 order diffracted beam and a −1 order diffracted beam. The phase type diffraction grating 104 on the movable plate 103 and the corresponding phase type diffraction grating 108 on the fixed plate 107 both have a grating pitch of $P_0$ and an equal diffraction angle. Thus, the light diffracted to the −1 order by the phase type diffraction grating 104 on the movable plate 103 and then to the +1 order by the phase type diffraction grating 108 on the fixed plate 107 ((−1, +1) order diffracted light) and the light diffracted to the +1 order by the phase type diffraction grating 104 on the movable plate 103 and then to the −1 order by the phase type diffraction grating 108 on the fixed plate 107 ((+1, −1) order diffracted light) have an equal optical path and interfere with each other, varying the intensity of the light. Since the interference condition depends on the movement δ of the movable plate 103, the amount of light received by the light receiving part 112 varies depending on the movement δ of the movable plate 103, thereby enabling the movement of the movable plate 103 to be detected. This can be expressed by the following equations.

$$U_{-1+1}(\delta)=\exp(-2\pi\cdot\delta/P_0) \quad (27)$$

$$U_{+1-1}(\delta)=\exp(-2\pi\cdot\delta/P_0) \quad (28)$$

$$I(\delta)=|U_{-1+1}(\delta)+U_{+1-1}(\delta)|^2=2(1+\cos(4\pi\cdot\delta/P_0)) \quad (29)$$

where, $U_{-1+1}(\delta)$: amplitude of the (−1, +1) order diffracted light,
$U_{+1-1}(\delta)$: amplitude of the (+1, −1) order diffracted light,
$I(\delta)$: intensity of interference light,
$P_0$: grating pitch
δ: movement of the movable plate.

The intensity of interference light $I(\delta)$ repeatedly becomes large and small like a sine wave with a period depending on the grating pitch $P_0$ of the phase type diffraction gratings 104 and 108. The period of the intensity is half the grating pitch $P_0$, based on the above equations. Thus, the period of the change in the interference light signal from the phase type diffraction gratings 104 and 108 with the grating pitch $P_0$ shown in FIG. 13A is $P_0/2$, and the period of the change in the interference light signal from the phase type diffraction gratings 105-1 and 109-1 with a grating pitch $P_1$ is $P_1/2$. Generally speaking, the period of the change in the interference light signal from the phase type diffraction gratings 105-i and 109-i is $P_i/2$ (i=1 to n). By setting the grating pitch $P_i$ (i=1 to n) of the phase type diffraction gratings 104, 105-i (i=1 to n) at different values, the period of the change in the intensity of the interference light can be varied.

The 0° lines in FIGS. 12 and 13 show the position at which the Z phase signal should be generated, and are imaginarily drawn on both moving and fixed plates 103 and 107. As shown in FIG. 13, the 0° line is formed so as to pass through a convex on each of the phase type diffraction gratings 104, 105-i (i=1 to n), 108, and 109-i (i=1 to n). FIG. 14A shows an enlarged view of the phase type diffraction gratings 104 and 108 near the 0° line. FIG. 14B shows an enlarged view of the phase type diffraction gratings 105-1 and 109-1 near the 0° line. In FIGS. 14A and 14B, the right of the sheets of drawings is the positive direction, while the left of the sheets of drawings is the negative direction.

In the phase type diffraction gratings 104 and 108 shown in FIG. 14A, "a" represents the distance (the angle) between the 0° line and the positive-side end 141a of a grating convex 141 through which the 0° line passes. In addition, the distance (the angle) between the 0° line and the end 142a of a grating convex 142 located adjacent to the grating convex 141 in the positive direction is expressed as "$a+P_0/2$". Furthermore, the distance (the angle) between the 0° line and the negative-side end 141b of the grating convex 141 is expressed as "$P_0/2-a$", and the distance (the angle) between the 0° line and the end 143a of a grating convex 143 located adjacent to the grating convex 141 in the negative direction is expressed as "$P_0-a$".

In FIG. 14B, "b" represents the distance (the angle) between the 0° line and the positive-side end 151a of a grating convex 151 of the phase type diffraction gratings 105-1 and 109-1. In the phase type diffraction gratings 105-1 and 109-1, the distance (the angle) between the 0° line and the negative-side end 151b of the grating convex 151 is expressed as "$P_1/2-b$". The locational relationship between the phase type diffraction gratings 104 and 108 and the phase type diffraction gratings 105-1 and 109-1 is that the grating convex 151 through which the 0° line of the phase type diffraction gratings 105-1 and 109-1 passes includes only the grating convex 141 through which the 0° line of the phase type diffraction gratings 104 and 108 passes, and can be expressed by the following Equations (30) and (31):

$$|a| \leq |b| \leq |a+P_0/2| \tag{30}$$

$$|P_0/2-a| \leq |P_1/2-b| \leq |P-a| \tag{31}$$

Likewise, the locational relationship between the phase type diffraction gratings 105-1 and 109-1 and the phase type diffraction gratings 105-2 and 109-2 is that the grating convex through which the 0° line of the phase type diffraction gratings 105-2 and 109-2 passes includes only the grating convex through which the 0° line of the phase type diffraction gratings 105-1 and 109-1 passes. That is, if the distance (the angle) between the 0° line and the positive-side end of that grating convex of the gratings 105-2 and 109-2 through which the 0° line passes is referred to as "c" (not shown), the distance (the angle) between the 0° line and the negative-side end of the grating convex through which the 0° line passes is "$P_2/2-c$", the distance (the angle) between the 0° line of the phase type diffraction gratings 105-1 and 109-1 and the end of the grating convex located adjacent in the positive direction to the grating convex through which the 0° line passes is referred to as "$b+P_1/2$", and the distance (the angle) between the 0° line and the negative-side end of the grating convex through which the 0° line passes is "$P_1-b$", the following Equations (32) and (33) can be given.

$$|b| \leq |c| \leq |b+P_1/2| \tag{32}$$

$$|P_1/2-b| \leq |P_2/2-c| \leq |P_1-b| \tag{33}$$

The same relationship is applicable between the phase type diffraction gratings 105-2 and 109-2 and the phase type diffraction gratings 105-3 and 109-3, . . . , between the phase type diffraction gratings 105-(n−1) and 109-(n−1) and the phase type diffraction gratings 105-n and 109-n.

Figure 15:
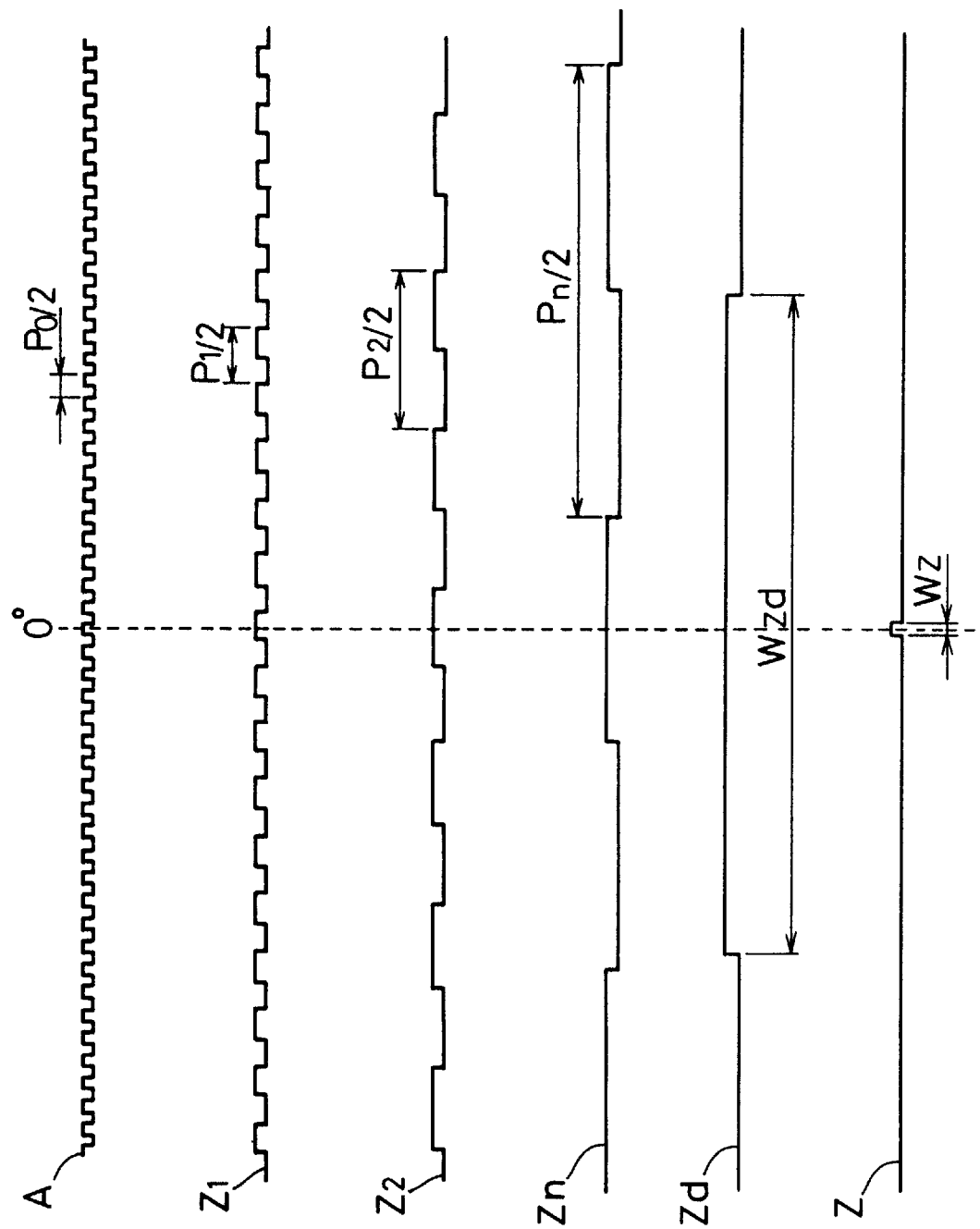
FIG. 15 shows output signals from a light receiving part in Embodiment 6.

Light from the Fresnel zone plate 106 of the movable plate 103 shown in FIG. 12 focuses on the light receiving device 110 to form a light spot. As the movable plate 103 rotates, the light spot on the light receiving device 110 moves. Since the light spot is received by the light receiving part 111, a single rotation causes a single pulse signal to be generated. FIG. 15 shows binarized output signals from the light receiving parts 111, 112, 113-i (i=1 to n) which are generated by the phase type diffraction gratings 104, 105-i (i=1 to n) and the Fresnel zone plate 106 as the movable plate 103 rotates. In this figure, A is a binarized light receiving signal from the light receiving part 112, and its period is $P_0/2$. $Z_1, Z_2, \ldots, Z_n$ are binarized light receiving signals from the light receiving parts 113-1, 113-2, . . . , 113-n and their periods are $P_1/2, P_2/2, \ldots, P_n/2$.

Figure 14:
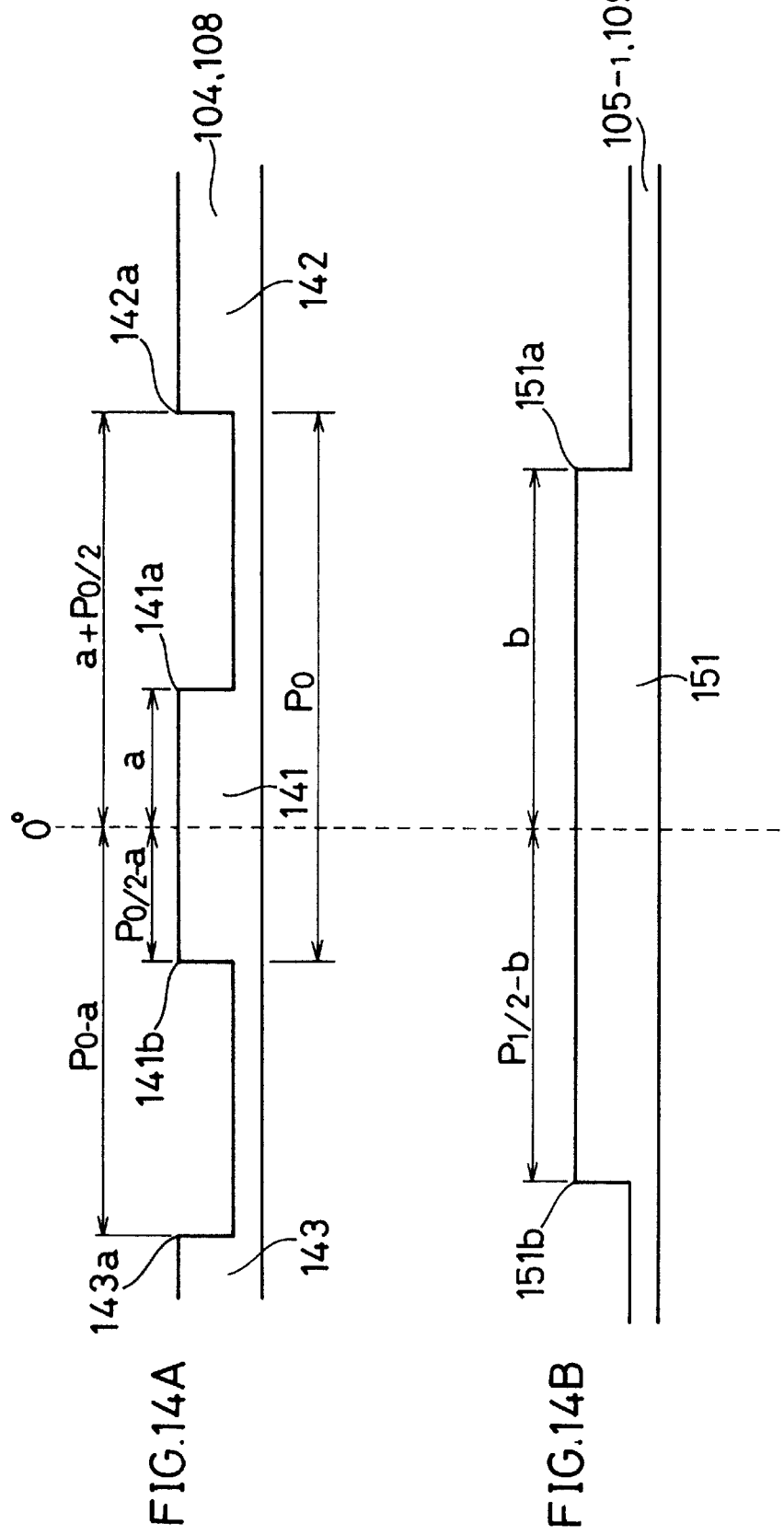
FIGS. 14A and 14B are partly enlarged views of the cross section of the phase optical element shown in FIG. 13.

As shown in FIGS. 13 and 14, the phase type diffraction gratings are disposed in the locational relations that the grating convex through which the 0° line of the phase type diffraction gratings 105-1 and 109-1 passes includes only the grating convex through which the 0° line of the phase type diffraction gratings 104 and 108 passes, that the grating convex through which the 0° line of the phase type diffraction gratings 105-2 and 109-2 passes includes only the grating convex through which the 0° line of the phase type diffraction gratings 105-1 and 109-1 passes, . . . , etc. Consequently, output signals have relations that the pulse through which the 0° line of $Z_1$ passes includes only the pulse through which the 0° line of A passes, that the pulse through which the 0° line of $Z_2$ passes includes only the pulse through which the 0° line of $Z_1$ passes, . . . , that the pulse through which the 0° line of $Z_n$ passes includes only the pulse through which the 0° line of $Z_{n-1}$ passes. In addition, $Z_d$ is a binarized light receiving signal from the light receiving part 111, has a width $W_{zd}$, and includes only the pulse through which 0° line of $Z_n$ passes.

Figure 16:
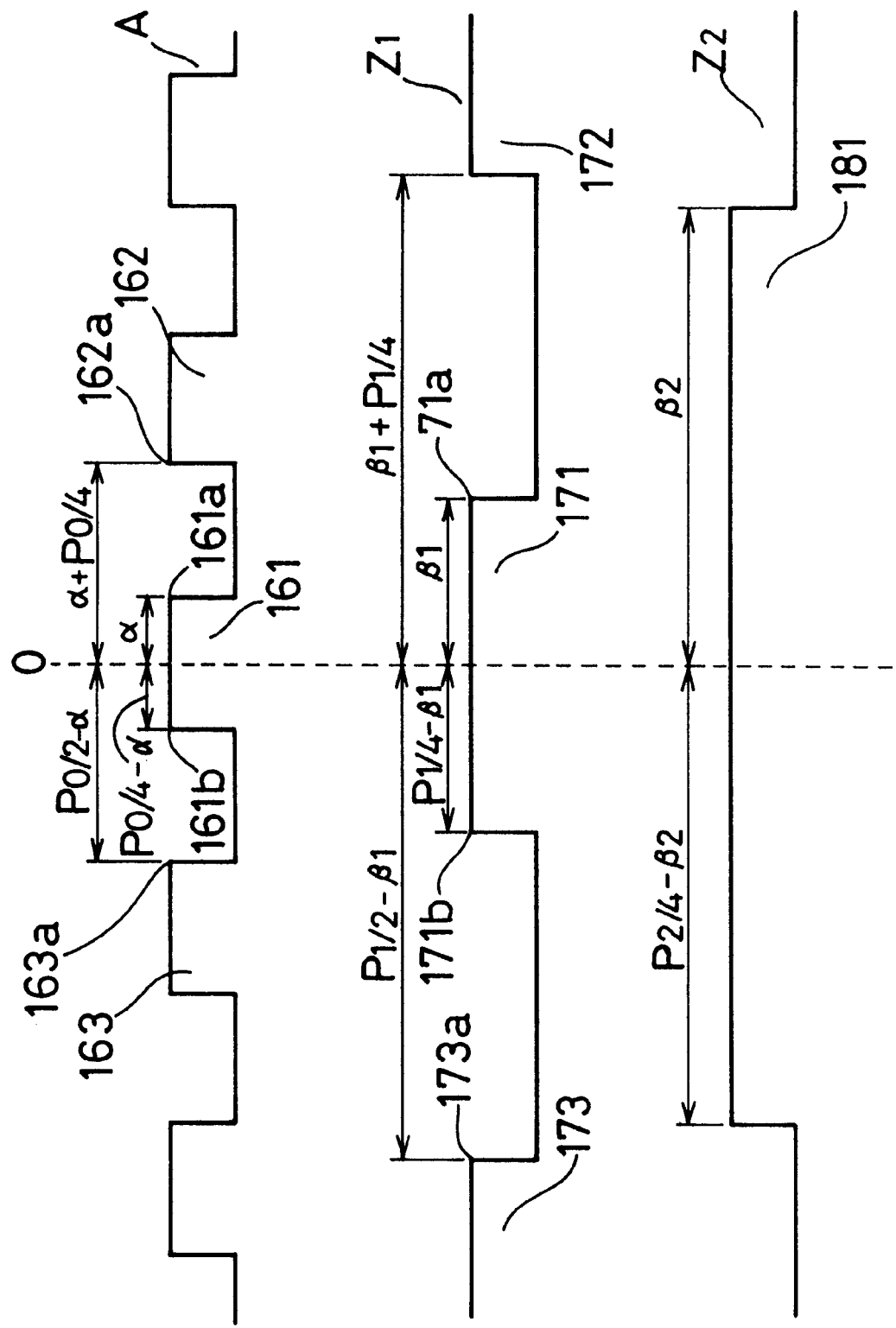
FIG. 16 is a partly enlarged view of the output signals shown in FIG. 15.

FIG. 16 is an enlarged view of each of the signals shown in FIG. 15, near a 0 point, and shows the relationship among the signals. The 0 point means the moment at which the 0° line of the movable plate 103 reaches the 0° line of the fixed plate 107. In the drawing, the right of the sheet is the positive direction, and the left of the sheet is the negative direction. "α" represents the distance (the angle) between the 0 point in a signal A and the positive-side terminal 161a of a pulse 161 including the 0 point. "$\beta_1$" represents the distance (the angle) between the 0 point in a signal $Z_1$ and the positive-side terminal 171a of a pulse 171 including the 0 point. In this case, in the signal A, the distance (the angle) between the 0 point and that terminal 162a of a pulse 162 positively adjacent to the pulse 161 at which the pulse 162 starts is expressed as "$\alpha+P_0/4$", the distance (the angle) between the 0 point and the negative-side terminal 161b of the pulse 161 is expressed as "$P_0/4-\alpha$", and the distance (the angle) between the 0 point and that terminal 163a of a pulse 163 negatively adjacent to the pulse 161 at which the pulse 163 starts is expressed as "$P_0/2-\alpha$". In the signal $Z_1$, the distance (the angle) between the 0 point and the negative-side terminal 171b of a pulse 171 is expressed as "$P_1/4-\beta_1$".

The relationship between the signals A and $Z_1$ is that the pulse 171 of $Z_1$ including the 0 point includes only one pulse 161 of A including the 0 point, and can be expressed by the following Equations (34) and (35).

$$|\alpha| \leq |\beta_1| \leq |\alpha + P_0/4| \tag{34}$$

$$|P_0/4 - \alpha| \leq |P_1/4 - \beta_1| \leq |P_0 - \alpha| \tag{35}$$

Likewise, the relationship between the signals $Z_1$ and $Z_2$ is that a pulse 181 of the signal $\beta_2$ including the 0 point includes only one pulse 171 of the signal $Z_1$ including the 0 point. That is, in the signal $Z_2$, the distance (the angle) between the 0 point and the positive-side terminal 181a of the pulse 181 is expressed as "$\beta_2$", and the distance (the angle) between the 0 point and the negative-side terminal 181b of the pulse 181 is expressed as "$P_2/4 - \beta_2$". In the signal $Z_1$, the distance (the angle) between the 0 point and that terminal 172a of the pulse 172 positively adjacent to the pulse 171 at which the pulse 172 starts is expressed as "$\beta_1 + P_1/4$", and the distance (the angle) between the 0 point and that terminal 173a of a pulse 173 negatively adjacent to the pulse 171 at which the pulse 173 starts is expressed as "$P_1/2 - \beta_1$". The following Equations (36) and (37) can thus be given.

$$|\beta_1| \leq |\beta_2| \leq |\beta + P_1/4| \tag{36}$$

$$|P_1/4 - \beta_1| \leq |P_2/4 - \beta_2| \leq |P_1 - 2 - \beta_1|s \tag{37}$$

Likewise, the relationship between signals $Z_2$ and $Z_3$, . . ., between signals $Z_{n-1}$ and $Z_n$ is that the pulse of the signal $Z_n$ including the 0 point includes only one pulse of the signal $Z_{n-1}$ including the 0 point. That is, the distance (the angle) between the 0 point of the signal $Z_n$ and the positive-side terminal of the pulse including the 0 point is expressed as "$\beta_n$", and the distance (the angle) between the 0 point and the negative-side terminal of the pulse including the 0 point is expressed as "$P_n/4 - \beta_n$". The distance (the angle) between the 0 point of the signal $Z_{n-1}$ and that terminal of the pulse positively adjacent to the pulse including the 0 at which the pulse starts is expressed as "$\beta_{n-1} + P_{n-1}/4$", and the distance (the angle) between the 0 point and the negative-side terminal of the pulse including the 0 point is expressed as "$P_{n-1}/2 - \beta_{n-1}$". The following Equations (38) and (39) can thus be given.

$$|\beta_{n-1}| \leq |\beta_n| \leq |\beta_{n-1} + P_{n-1}/4| \tag{38}$$

$$|P_{n-1}/4 - \beta_{n-1}| \leq |P_n/4 - \beta_n| \leq |P_{n-1}/2 - \beta_{n-1}| \tag{39}$$

A Z phase signal in synchronism with one A/B phase pulse can be generated by determining the conjunction of these signals A, $Z_1$, $Z_2$, . . . , $Z_n$ and $Z_d$ as the Z phase signal.

As discussed in the description of the conventional examples, it is possible to reduce the period of generated signals A, $Z_1$, . . . by relatively varying the phase type diffraction gratings with equal pitches. It is impossible, however, to reduce the width of a signal such as $Z_d$ generated when a spot light formed by the condensing element such as the Fresnel zone plate 106 formed on the movable plate 103 is detected. A Z phase signal in synchronism with one A/B phase pulse cannot be generated simply by generating a signal A that is an A/B phase signal and a signal $Z_d$ used to generate a Z phase signal to determine the disjunction of these signals. A Z phase signal in synchronism with one A/B phase pulse, however, can be generated by determining the conjunction of A, $Z_1$, $Z_2$, . . . , $Z_n$ and $Z_d$ as the Z phase signal, as in this invention.

It is also possible to simply generate a signal A that is an A/B phase signal and a signal $Z_d$ used to generate a Z phase signal, and to use an electric circuit to extract a single pulse of A/B phase signal as the Z phase signal from the moment that a pulse of $Z_d$ is generated. The pulse of $Z_d$, however, is not always generated with a constant timing due to various factors such as electric noises and mechanical vibrations. The allowable value of errors in the $Z_d$ generation timing is equal to a single recess of the signal A, that is, $P_0/4$. If the conjunction of A, $Z_1$, $Z_2$, . . . , $Z_n$ and $Z_d$ is determined as the Z phase signal, the allowable value of errors in the $Z_d$ generation timing is equal to a single recess of the signal $Z_n$, that is, $P_n/4$. $P_n/4 \leq P_0/4$ under the conditions shown in Equations (30) to (33). That is, this invention can increase the allowable value of errors in the $Z_d$ generation timing to realize an optical encoder that can resist electric noises and mechanical vibrations. In addition, since the phase type diffraction gratings 104, 105-i (i=1 to n), 108, and 109-i (i=1 to n) and the Fresnel zone plate 106 can be implemented using the recesses and convexes of the surface of the substrate, they can be produced using transparent resin and a stamping process.

Although the 0° line passes through a grating convex in all the phase type diffraction gratings 104, 105-i (i=1 to n), 108, 109-i (i=1 to n), similar effects can be obtained by allowing the 0° line to pass through a grating recess. Alternatively, the 0° line need not pass through a grating convex or recess in all the phase type diffraction gratings 104, 105-i (i=1 to n), 108, 109-i (i=1 to n), and a mixture of convexes and recesses on the 0° line may produce similar results so that the 0° line may pass through a grating convex in some of the phase type diffraction gratings, while it may pass through a grating recess in the other phase type diffraction gratings.

In addition, the 0° lines in both moving and fixed plates 103 and 107 need not pass through a convex or recess of each phase type diffraction gratings. For example, in the movable plate 103, the 0° line may pass through a convex of each of the phase diffraction gratings 104, 105-1, . . . , 105-n, whereas in the fixed plate 107, the 0° line may pass through a recess of each of the phase diffraction gratings 108, 109-1, . . . , 109-n, or vice versa. The same effects can be obtained using a grating arrangement different from those shown above as long as the arrangement of the phase type diffraction gratings can provide output signals wherein the pulse 171 of the signal $Z_1$ through which 0° line passes includes only one pulse 161 of the signal A through which the 0° line passes, wherein the pulse 181 of the signal $Z_2$ through which 0° line passes includes only one pulse 171 of the signal $Z_1$, . . . , and wherein the pulse of the signal $Z_n$ through which 0° line passes includes only one pulse of the signal $Z_{n-1}$ through which the 0° line passes, that is, output signals meeting the conditions shown in Equations (34) to (39). In addition, the Fresnel zone plate 106 is used as the condensing element installed on the movable plate 103, but the same effects can be obtained by using a lens.

(Embodiment 7)

Figure 17:
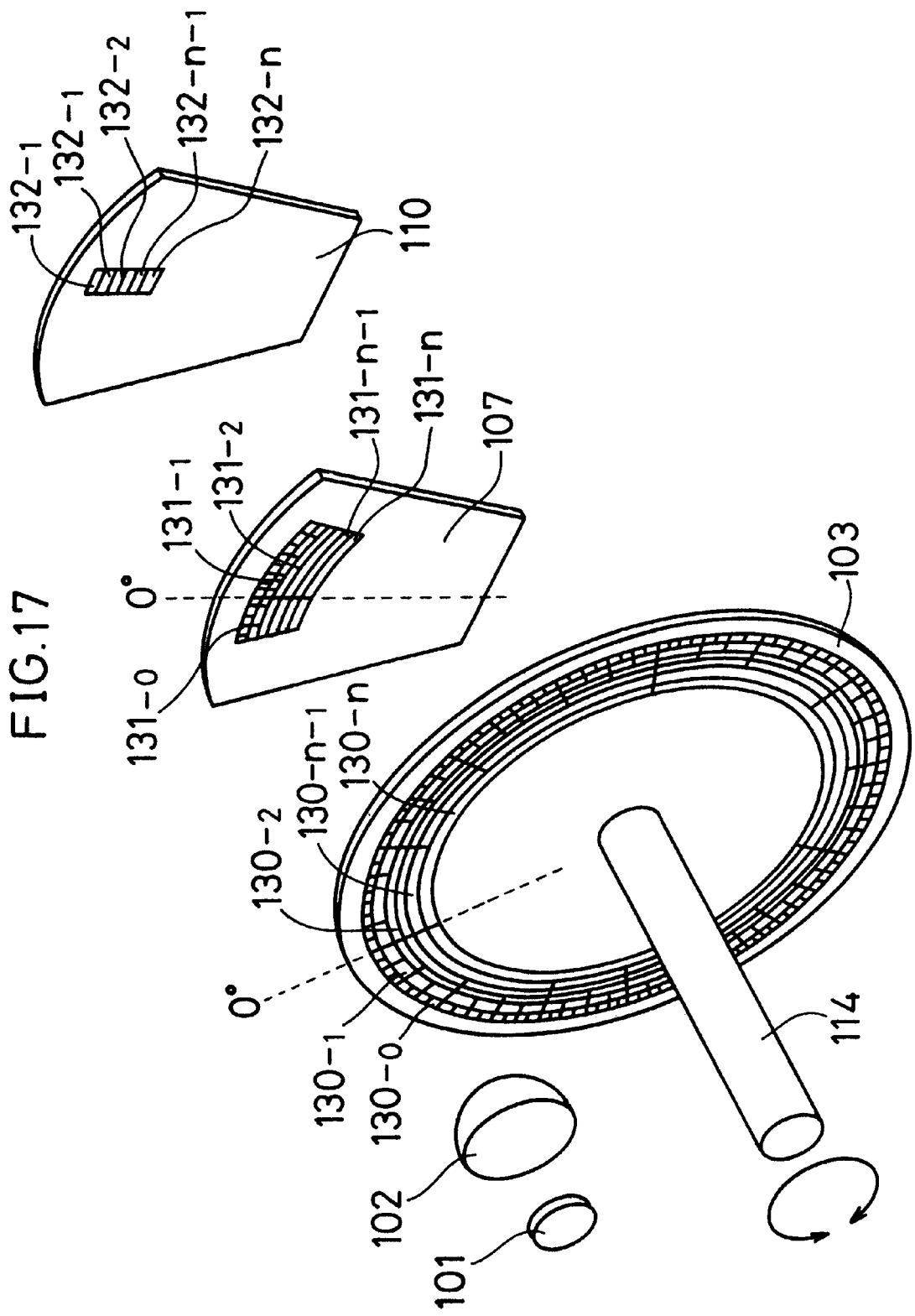
FIG. 17 is a perspective view showing a configuration of an optical encoder according to Embodiment 7 of this invention.

Next, Embodiment 7 directed to an optical encoder and position detection method according to this invention is described with reference to FIGS. 17 to 19. FIG. 17 is a perspective view showing a basic configuration of an optical encoder according to Embodiment 7. The optical encoder shown in FIG. 17 comprises a light source 101 such as a semiconductor laser or a relatively coherent light emitting diode; a collimator lens 102 for making beams from the light source 101 parallel; a movable plate 103 disposed approximately perpendicularly to the optical axis of the parallel beams and that can be rotated around a rotating shaft 114 parallel to the optical axis; a fixed plate 107 disposed approximately perpendicularly to the optical axis; and a light receiving device 110 with a plurality of light receiving parts.

The disc-like movable plate 103 is formed on a plurality of tracks annularly defined over the entire circumference, and has a plurality of phase type diffraction gratings 130-0, 130-1, 130-2, . . . , 130-(n–1), 130-n (n is an integer equal to or larger than 2) that mainly generate ±1 order diffracted light. The phase type diffraction gratings 130-i (i=0 to n) on the respective tracks have different grating pitches, but the grating pitch is fixed on a single track. The fan-like fixed plate 107 ha s a phase type diffraction gratings 131-i (i=0 to n) corresponding to the phase type diffraction gratings 130-i (i=0 to n) on the movable plate 103 and having a grating pitch equal to each grating pitch of the phase type diffraction gratings 130-i. Each light receiving part 132-i (i=0 to n) of the light receiving device 110 receives light formed based on the relative locational relationship between the phase type diffraction gratings 130-i (i is 0 to n) of the movable plate 103 and the phase type diffraction gratings 131-i (i is 0 to n).

As in Embodiment 6, light incident on the movable plate 103 is diffracted by the phase type diffraction gratings 130-i (i is 0 to n) on the movable plate 103 into a +1 order diffracted beam and a –1 order diffracted beam, which are then incident on the phase type diffraction gratings 131-i (i is 0 to n) on the fixed plate 107 and are diffracted into a +1 order diffracted beam and a –1 order diffracted beam. Due to the equal grating pitch, the phase type diffraction gratings 130-i (i is 0 to n) on the movable plate 103 and the corresponding phase type diffraction gratings 131-i (i=0 to n) on the fixed plate 107 have an equal diffraction angle. Thus, the light diffracted into a –1 order by the phase type diffraction gratings 130-i (i=0 to n) on the movable plate 103 and then into a +1 order by the phase type diffraction gratings 131-i (i=0 to n) on the fixed plate 107 ((–1, +1) order diffracted light) and the light diffracted into a +1 order by the phase type diffraction gratings 130-i (i is 0 to n) on the movable plate 103 and then into a –1 order by the phase type diffraction gratings 131-i (i is 0 to n) on the fixed plate 107 ((+1, –1) order diffracted light) have an equal optical path and interfere with each other, thereby varying the intensity of the light. Since the interference condition depends on the movement δ of the movable plate 103, the movement δ of the movable plate 103 varies the amount of light received by the light receiving part 132-i (i=0 to n), thereby enabling the movement of the movable plate 103 to be detected.

In this case, a detection signal from the light receiving part 132-i (i=0 to n) is a sine wave signal with a period half the grating pitch of the phase type diffraction gratings. As shown in FIG. 17, the phase type diffraction gratings 130-i (i=0 to n) on the movable plate 103 and the phase type diffraction gratings 131-i (i=0 to n) on the fixed plate 107 have different grating pitches in different tracks, so the period of changes in the intensity of interference light formed by these phase type diffraction gratings varies depending on the track. That is, the period of a light receiving signal from each light receiving part 132-i (i=0 to n) varies.

Figure 18:
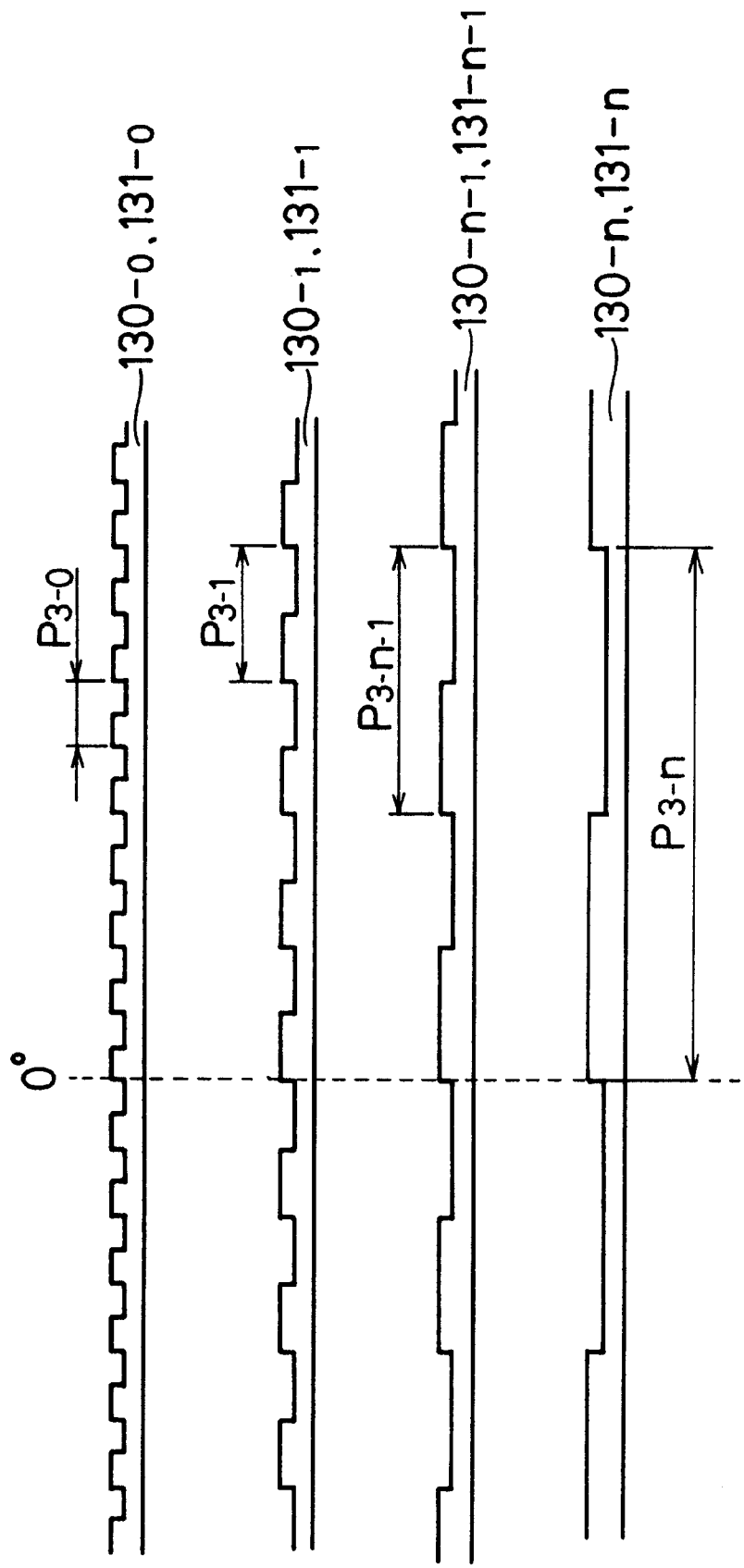
FIG. 18 shows a cross section of a phase optical element in Embodiment 7.
Figure 19:
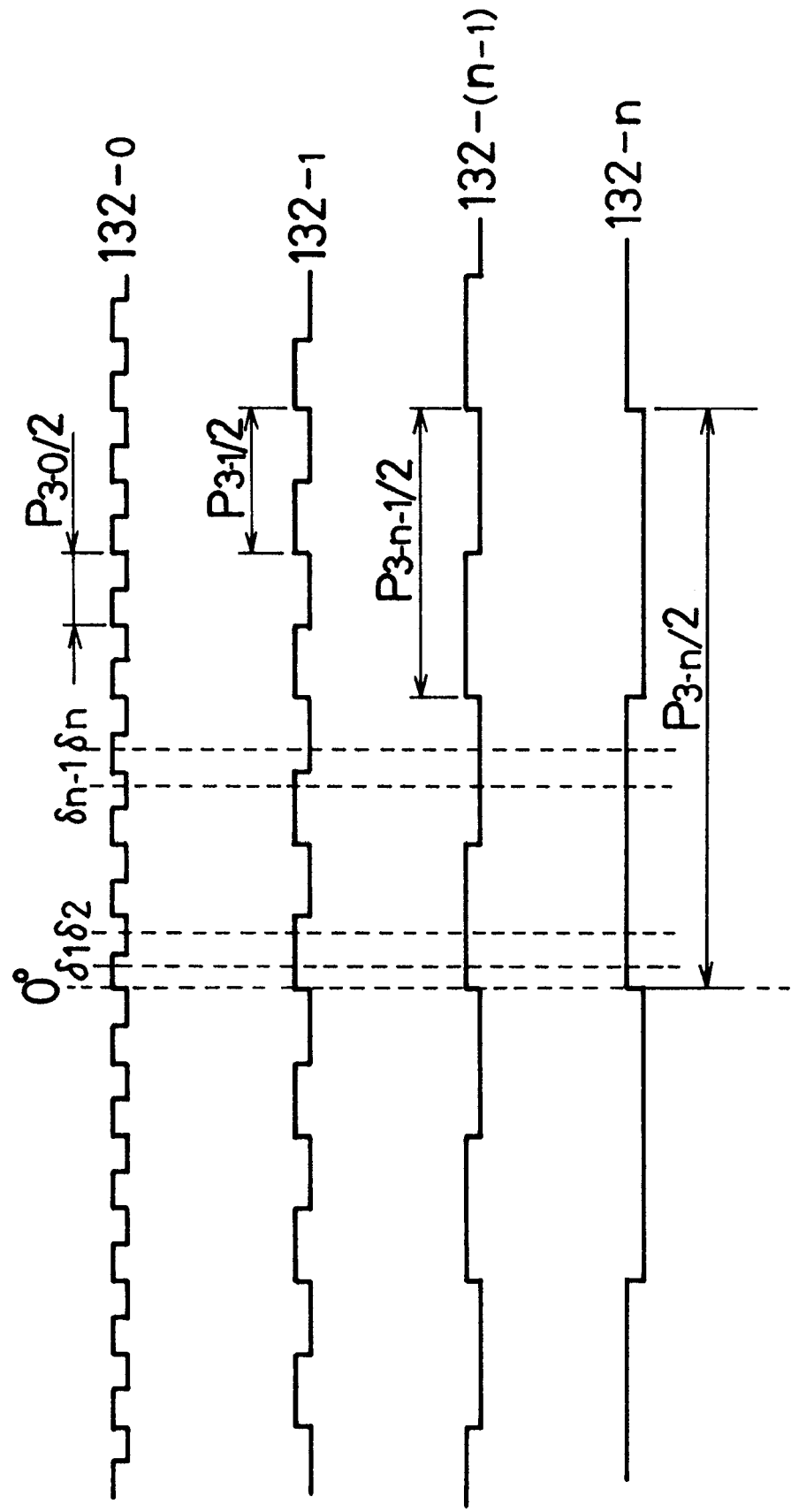
FIG. 19 shows output signals from a light receiving part in Embodiment 7.

FIG. 18 shows cross sections of the phase type diffraction gratings 130-i (i=0 to n) and 131-i (i=0 to n) on the moving and fixed plates 103 and 107 near the 0° line. The phase type diffraction gratings 130-i (i=0 to n) and 131-i (i=0 to n) on the respective tracks have a grating pitch $P_{3-0}, P_{3-1}, \ldots, P_{3-(n-1)}, P_{3-n}$, respectively, and the end of a grating convex lies on the 0° line shown on both moving and fixed plates 103 and 107 in FIG. 17. The relationship among the grating pitches $P_{3-0}, P_{3-1}, \ldots, P_{3-(n-1)}, P_{3-n}$ is as shown in Equations (40) and (41).

$$P_{3-0} < P_{3-1} < \ldots P_{3-(n-1)} < P_{3-n} \qquad (40)$$

$$P_{3-0} \times 2 = P_{3-1}$$

$$P_{3-1} \times 2 = P_{3-2}$$

.

.

.

.

$$P_{3-(n-1)} \times 2 = P_{3-n} \qquad (41)$$

In this case, a light receiving signal from the light receiving part 132-i (i=0 to n) is a sine wave with a period half each grating pitch. Examples of binarized light receiving signals are shown in FIG. 19. In this figure, the 0 point means the moment that 0° line of the movable plate 103 has reached the 0° line of the fixed plate 107. $δ_1, δ_2, \ldots, δ_{n-1}, δ_n$ each represent the moment that the movable plate 103 has reached a certain position after movement. For example, if H and L are used to describe binarized signals, light receiving signals from the light receiving parts 132-0, 132-1, . . . , 132-(n–1), 132-n can be described as H, H, . . . , H, H at $δ_1$, L, H, . . . , H, H at $δ_2$, L, H, . . . , L, H at $δ_{n-1}$, and H, L, . . . , L, H at $δ_n$.

The combination of H and L signals from each light receiving part 132-i (i=0 to n) depends on the position of the movable plate 103. By setting the binarized signal pattern of each track when the movable plate 103 is at one position different from the binarized signal pattern when the movable plate is at any other position, the absolute rotating position of the movable plate can be detected from the light receiving signal pattern. This enables a signal pattern unique to the position of the movable plate 103 to be obtained, thereby providing an absolute type optical encoder capable of detecting the rotating position of the movable plate 103 wherever it is.

The phase type diffraction gratings can be implemented using the recesses and convexes of the surface of the substrate and produced inexpensively using transparent resin such as polycarbonate or acryl and a stamping process. Although in Embodiment 7, the convexes of the phase type diffraction gratings 130-i and 131-i (i=0 to n) on the moving and fixed plates 103 and 107 are located in the right of the 0° line in the sheet of the drawing, as shown in FIG. 18, similar effects can be obtained by locating the recesses in the right of the sheet of the drawing. In addition, although a convex lies on the 0° line in all the phase type diffraction gratings 130-i and 131-i (i=0 to n), a mixture of convexes and recesses may produce similar results. Furthermore, although the arrangement of recesses and convexes is the same in the phase type diffraction gratings 130-i (i=0 to n) on the movable plate 103 and the phase type diffraction gratings 131-i (i=0 to n) on the fixed plate 107, similar effects can be obtained if different arrangements of recesses and convexes are used. Furthermore, although both phase type diffraction gratings 130-i and 131-i (i=0 to n) are arranged around the 0° line, similar effects can be obtained as long as the gratings are arranged in such a way that binarized light receiving signals are generated as periodic signals with a period that is an integral multiple of the period of a signal obtained from one of the plurality of phase type diffraction gratings which has the smallest grating pitch, as shown in FIG. 19.

(Embodiment 8)

Figure 20:
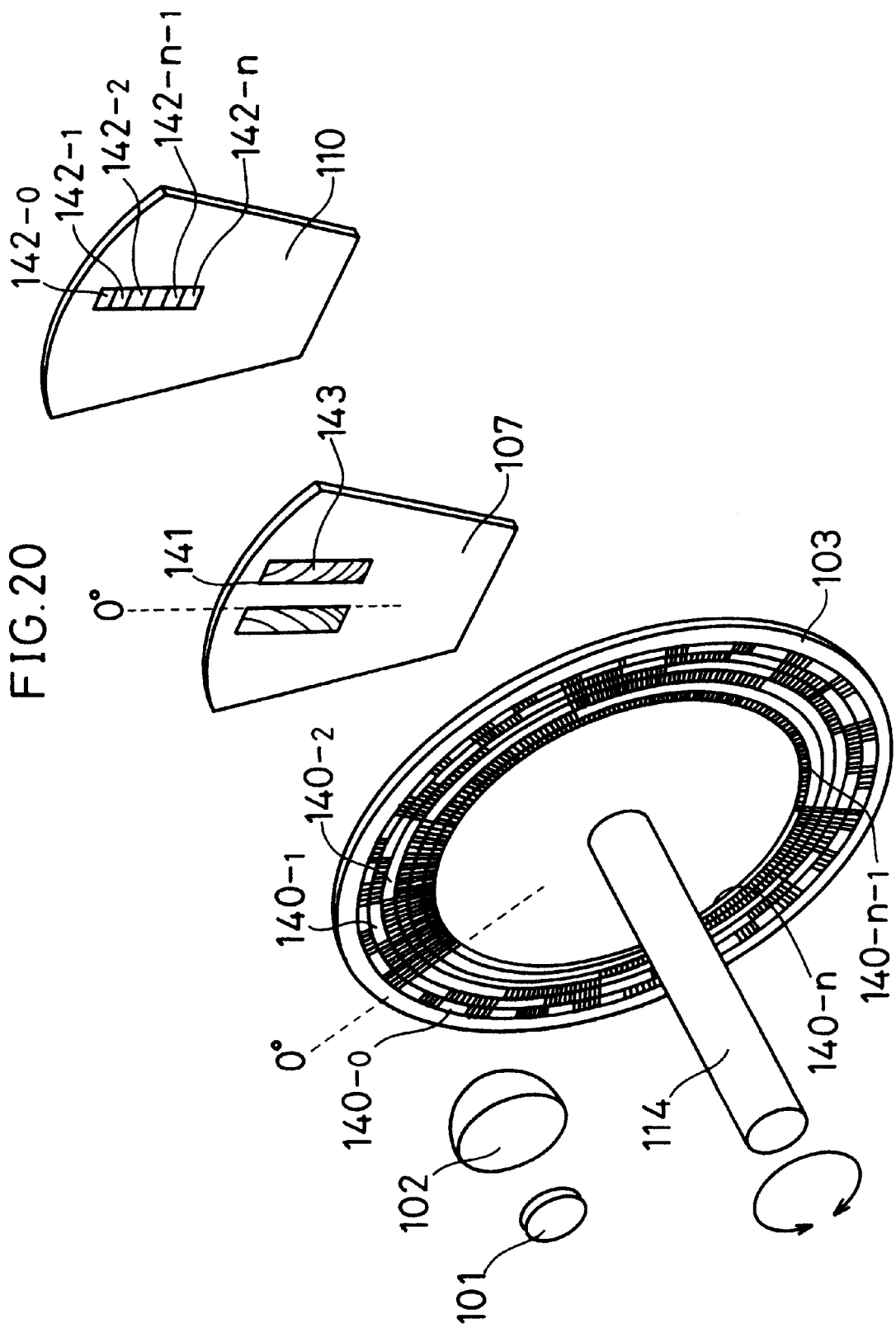
FIG. 20 is a perspective view showing a configuration of an optical encoder according to Embodiment 8 of this invention.

Next, Embodiment 8 directed to an optical encoder and position detection method according to this invention is described with reference to FIGS. 20 to 23. FIG. 20 is a perspective view showing a basic configuration of an optical encoder according to Embodiment 8. The optical encoder shown in FIG. 20 comprises a light source 101 such as a semiconductor laser or a relatively coherent light emitting diode; a collimator lens 102 for making beams from the light source 101 parallel; a movable plate 103 disposed approximately perpendicularly to the optical axis of the parallel beams and that can be rotated around a rotating shaft 114 parallel to the optical axis; a fixed plate 107 disposed approximately perpendicularly to the optical axis; and a light receiving device 110 with a plurality of light receiving parts.

The disc-like movable plate 103 is formed on a plurality of tracks annularly defined over the entire circumference, and has a plurality of phase type diffraction gratings 140-0, 140-1, 140-2, . . . , 140-(n−1), 140-n (n is an integer equal to or larger than 2) that mainly generate ±1 order diffracted light. The phase type diffraction gratings 140-i (i=0 to n) on the respective tracks have different patterns of regions in which a grating is formed and regions in which a grating is not formed, and also have different grating pitches. The approximately fan-like fixed plate 107 has a light transmissible part 141 for selectively transmitting light modulated by each track on the movable plate 103; and Fresnel zone plates 143 formed on both sides of the light transmissible part 141. Each light receiving part 142-i (i=0 to n) of the light receiving device 110 receives light that has passed through the phase type diffraction gratings 140-i of the movable plate 3 and the light transmissible part 141 of the fixed plate 107.

FIG. 21 shows optical paths in Embodiment 8 of the optical encoder according to this invention. In this figure, the position of the movable plate 103 is different in A and B. Beams emitted from the light source 101 are made parallel by the collimator lens 102 and are then incident on the movable plate 103. If the movable plate 103 is in the position shown in FIG. 21A, light is not modulated by the movable plate 103 but directly transmitted therethrough. The light is further transmitted through the light transmissible part 141 of the fixed plate 107 and is then incident on the light receiving part 142-i (i=0 to n). When the movable plate 103 moves to the position shown in FIG. 21B, light is separated by the phase type diffraction gratings 140-i (i=0 to n) on the movable plate 103 into a +1 order diffracted beam and a −1 order diffracted beam, and the intensity of the 0 order diffracted beam, that is, the straightly advancing beam is almost zero. The light diffracted into ±1 orders by the phase type diffraction gratings 140-i (i=0 to n) on the movable plate 103 has its path bent by the Fresnel zone plate 143 on the fixed plate 107 and is thus prevented from being incident on the light receiving part 142-i (i=0 to n). Otherwise, only a small amount of light is incident on the light receiving part 142-i. That is, the position of the movable plate 103 varies the amount of light received by the light receiving part 142-i (i=0 to n).

FIG. 22 shows cross sections of the phase type diffraction gratings 140-0, 140-1, . . . , 140-(n−1), 140-n on the movable plate 103 near the 0° line. The phase type diffraction gratings 140-i (i=0 to n) has a grating pitch $P_{4-0}$, $P_{4-1}$, . . . , $P_{4-(n-1)}$, $P_{4-n}$. The period of the phase type diffraction gratings 140-i (i=0 to n) with regions in which a grating is formed and regions in which a grating is not formed are arranged is referred to as $L_{4-0}$, $L_{4-1}$, . . . , $L_{4-(n-1)}$, $L_{4-n}$. The end of a region of the phase type diffraction gratings 140-i (i=0 to n) in which a grating is formed lies on the 0° line shown on the movable plate 103 in FIG. 20. The relationship among the periods $L_{4-0}$, $L_{4-1}$, . . . , $L_{4-1(n-1)}$, $L_{4-n}$, with which the regions of the phase type diffraction gratings 140-i ((i)=0 to (n)) in which a grating is formed and the regions in which a grating is not formed are arranged, can be expressed by the following Equations (42) and (43).

$$L_{4-0} < L_{4-1} < \ldots L_{4-(n-1)} < L_{4-n} \tag{42}$$

$$L_{4-0} \times 2 = L_{4-1}$$

$$L_{4-1} \times 2 = L_{4-2}$$

.

.

.

$$L_{4-(n-1)} \times 2 = L_{4-n} \tag{43}$$

In this case, a light receiving signal from the light receiving part 142-i (i=0 to n) has the period $L_{4-1}$ (i=0 to n), with which the regions in which a grating is formed and the regions in which a grating is not formed are arranged. Examples of binarized light receiving signals are shown in FIG. 23. In this figure, the 0 point means the moment that 0° line of the movable plate 103 has reached the 0° line of the fixed plate 107. $\delta_1$, $\delta_2$, . . . , $\delta_{n-1}$, $\delta_n$ each represent the moment that the movable plate 103 has reached a certain position after movement. For example, if H and L are used to describe binarized signals, light receiving signals from the 142-0, 142-1, . . . , 142-(n−1), 142-n can be described as H, H, . . . , H, H at $\delta_1$, L, H, . . . , H, H at $\delta_2$, L, H, . . . , L, H at $\delta_{n-1}$, and H, L, . . . , L, H at $\delta_n$.

The combination of H and L signals from each light receiving part 142-i (i=0 to n) depends on the position of the movable plate 103, as in Embodiment 7. By setting the binarized signal pattern of each track when the movable plate 103 is at one position different from the binarized signal pattern when the movable plate is at any other position, the absolute rotating position of the movable plate can be detected from the light receiving signal pattern. This enables a signal pattern unique to the position of the movable plate 103 to be obtained, thereby providing an absolute type optical encoder capable of detecting the rotating position of the movable plate 103 wherever it is.

The phase type diffraction gratings can be implemented by using the recesses and convexes of the surface of the substrate and produced inexpensively by using transparent resin such as polycarbonate or acryl and a stamping process. Although in Embodiment 8, the regions of the phase type diffraction gratings 140-i (i=0 to n) on the movable plate 103 in which a grating is formed are located to the right of the 0° line in the sheet of the drawing, as shown in FIG. 22, similar effects can be obtained by locating the regions in which a grating is not formed in the right of the sheet of the drawing. In addition, although regions in which a grating is formed are arranged around the 0° line in all the phase type diffraction gratings 140-i (i=0 to n), a mixture of regions in which a grating is formed and regions in which a grating is not formed may produce similar results. Furthermore, although the regions of the phase type diffraction gratings 140-i (i=0 to n) in which a grating is formed are disposed around the 0° line, similar effects can be obtained as long as the gratings are arranged in such a way that binarized light receiving signals are generated as periodic signals with a period that is an integral multiple of the period of a signal obtained from one of the plurality of tracks which has the smallest period, with which the regions in which a largest number of grantings are formed and the regions in which no gratings are formed are arranged, as shown in FIG. 23.
(Embodiment 9)

Figure 24:
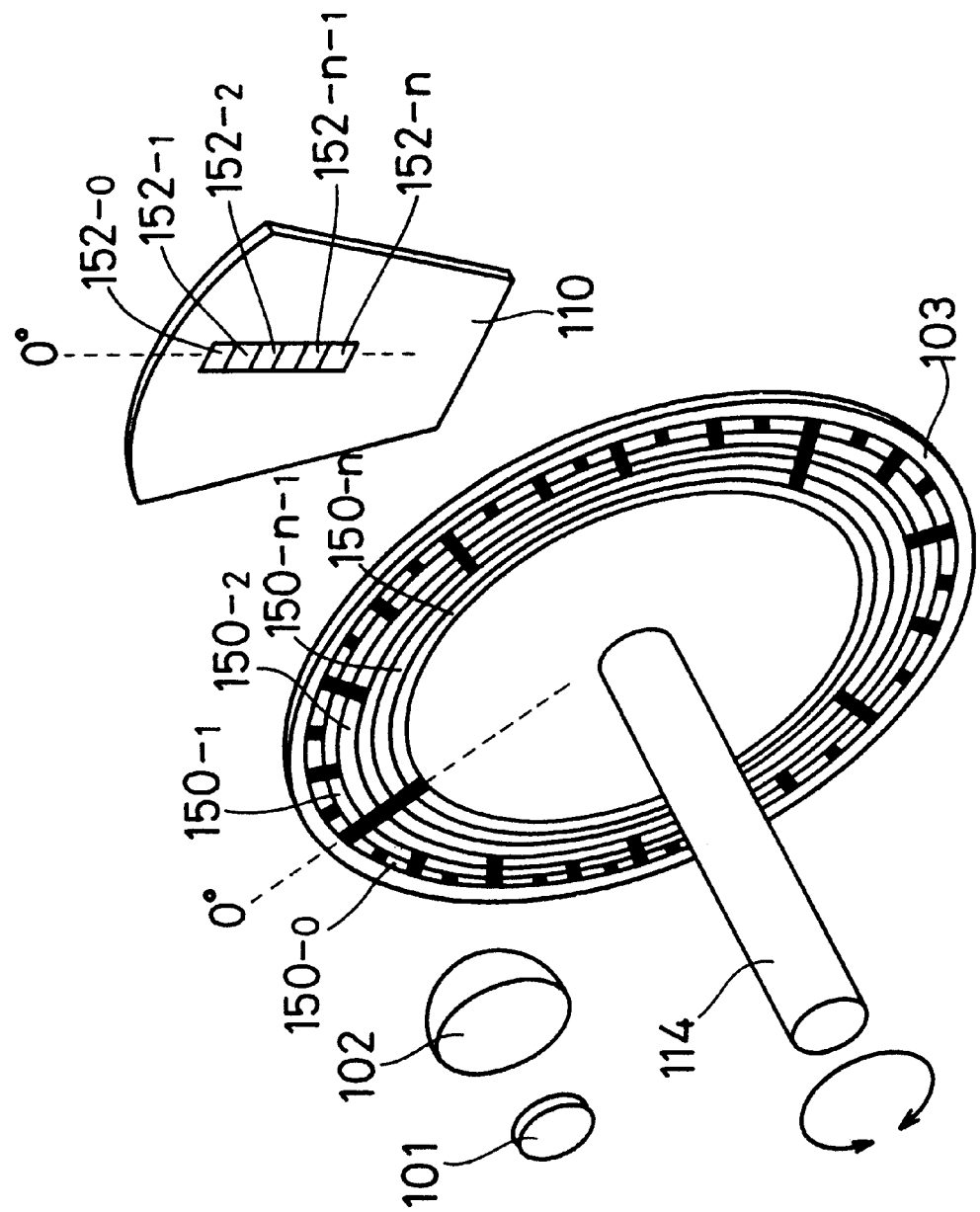
FIG. 24 is a perspective view showing a configuration of an optical encoder according to Embodiment 9 of this invention.

Next, Embodiment 9 directed to an optical encoder and position detection method according to this invention is described with reference to FIGS. 24 to 27. FIG. 24 is a perspective view showing a basic configuration of an optical encoder according to Embodiment 9. The optical encoder shown in FIG. 24 comprises a light source 101 such as a semiconductor laser or a relatively coherent light emitting diode; a collimator lens 102 for making beams from the light source 101 parallel; a movable plate 103 disposed approximately perpendicularly to the optical axis of the parallel beams and that can be rotated around a rotating shaft 114 parallel to the optical axis; and a light receiving device 110 with a plurality of light receiving parts.

The disc-like movable plate 103 has condensing elements, for example, Fresnel zone plates 150-0, 150-1, 150-2, ..., 150-(n−1), 150-n disposed at different fixed intervals (angles) on a plurality of tracks concentrically defined around the rotating center of the rotating shaft 114. Each light receiving part 152-i (i=0 to n) of the light receiving device 110 condenses spot light formed by the condensing elements 150-i (i=0 to n).

FIG. 25 shows optical paths in Embodiment 9 of the optical encoder according to this invention. In this figure, the position of the movable plate 103 is different in FIGS. 25A and 25B. Beams emitted from the light source 101 are made parallel by the collimator lens 102 and are then incident on the movable plate 103. If the movable plate 103 is in the position as shown in FIG. 25A, the incident light is condensed by the condensing element 150-i (i=0 to n) on the movable plate 103 and is then incident on the light receiving part 152-i (i=0 to n). When the movable plate 103 moves to the position shown in FIG. 25B, the incident light is transmitted through the movable plate 103 and is also incident on the light receiving part 152-i (i=0 to n). Clearly, however, the intensity of light incident on the light receiving part 152-i (i=0 to n) is larger when the beams are condensed by the condensing element 150-i ((i)=0 to (n)) as shown in 25A than when the parallel beams are directly transmitted through the movable plate 103, as shown in FIG. 25B. Thus, the position of the movable plate 103 varies the amount of light received by the light receiving part 152-i (i=0 to n).

FIG. 26 shows cross sections of the condensing element 150-i (i=0 to n) on the movable plate 103 near the 0° line. The interval among the condensing elements 150-i (i=0 to n) in each track is referred to as $L_{5-0}, L_{5-1}, \ldots, L_{5-(n-1)}, L_{5-n}$. The relationship among these intervals can be expressed by the following Equations (44) and (45).

$$L_{5-0} < L_{5-1} < \ldots L_{5-(n-1)} < L_{5-n} \quad (44)$$

$$L_{5-0} \times 2 = L_{5-1}$$

$$L_{5-1} \times 2 = L_{5-2}$$

.

.

.

$$L_{5-(n-1)} \times 2 = L_{5-n} \quad (45)$$

In this case, a light receiving signal from the light receiving part 152-i (i=0 to n) has the period $L_{5-i}$ (i=0 to n) of the condensing element 150-i (i=0 to n), respectively.

Examples of binarized light receiving signals are shown in FIG. 27. In this figure, the 0 point means the moment that 0° line of the movable plate 103 has reached the 0° line of the light receiving device 110. $\delta_1, \delta_2, \ldots, \delta_{n-1}, \delta_n$ each represents the moment that the movable plate 103 has reached a certain position after movement. For example, if H and L are used to describe binarized signals, light receiving signals from the light receiving parts 152-0, 152-1, ..., 152-(n−1), 152-n can be described as H, H, ..., H, H at $\delta_1$, L, L, ..., L, L at $\delta_2$, L, L, ..., L, L at $\delta_{n-1}$, and H, L, ..., L, L at $\delta_n$.

The combination of H and L signals from each light receiving part 152-i (i=0 to n) depends on the position of the movable plate 103, as in Embodiment 8. By setting the binarized signal pattern of each track when the movable plate is at one position different from the binarized signal pattern when the movable plate is at any other position, the absolute rotating position of the movable plate can be detected from the light receiving signal pattern. This enables a signal pattern unique to the position of the movable plate 103 to be obtained, thereby providing an absolute type optical encoder capable of detecting the rotating position of the movable plate wherever it is.

The condensing element such as a Fresnel zone plate can be implemented by using the recesses and convexes of the surface of the substrate and produced inexpensively by using transparent resin such as polycarbonate or acryl and a stamping process. Although in Embodiment 9, the condensing elements are disposed around the 0° line of the movable plate 103, similar effects can be obtained as long as the condensing gratings are arranged in such a way that binarized light receiving signals are generated as periodic signals with a period that is a multiple of the period of one of the plurality of track signals which has the smallest period, as shown in FIG. 27. In addition, similar effects can be obtained by using condensing lenses instead of Fresnel zone plates, as the condensing elements on the movable plate.
(Embodiment 10)

Figure 28:
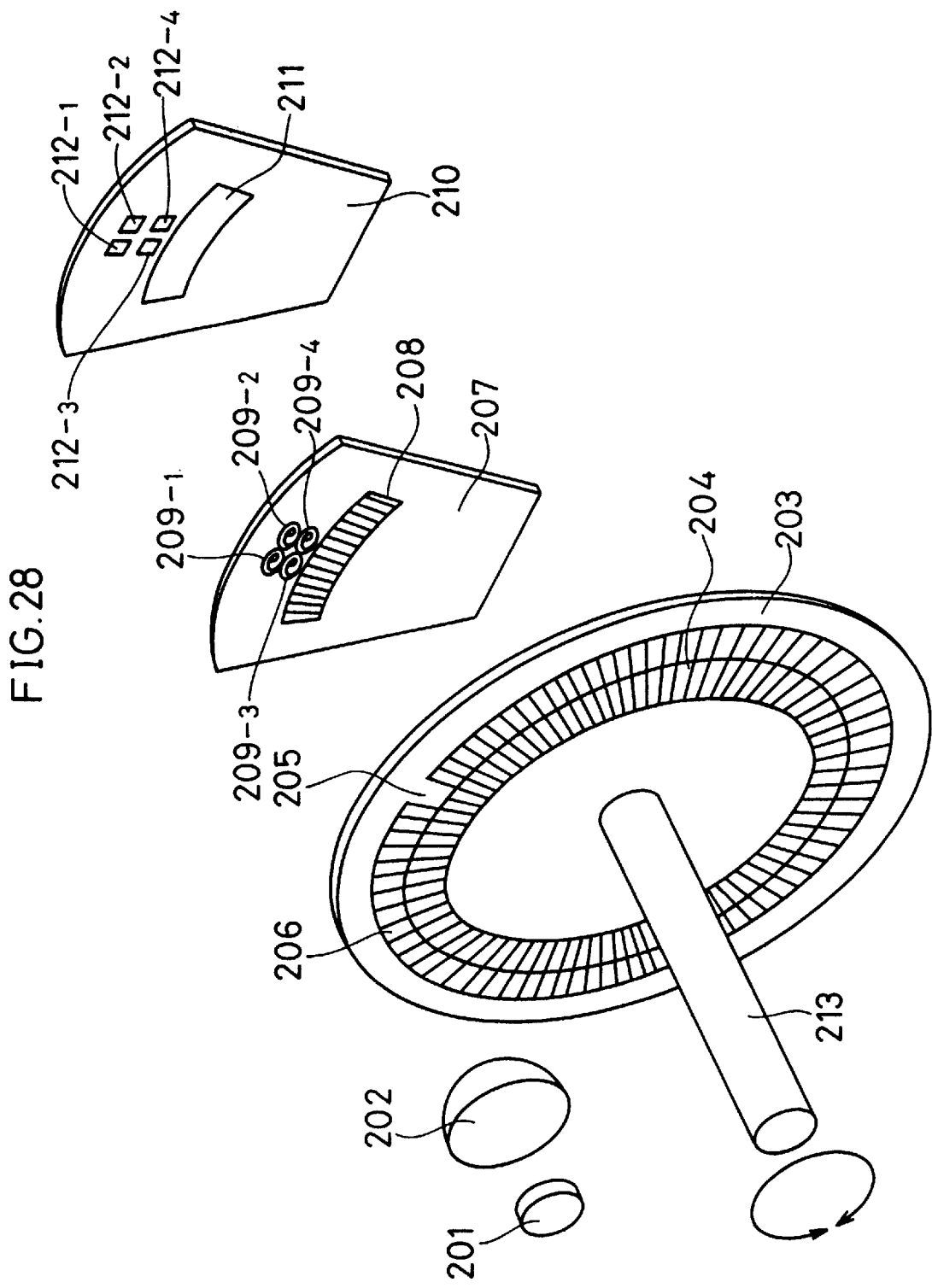
FIG. 28 is a perspective view showing a configuration of an optical encoder according to Embodiment 10 of this invention.
Figure 29B:
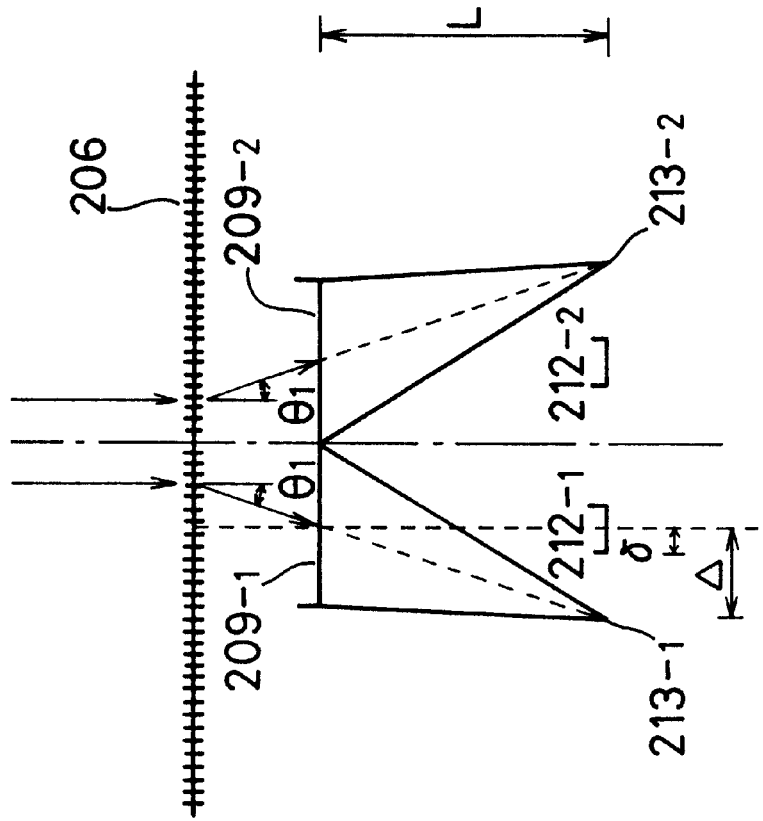
FIGS. 29A and 29B show optical paths and the modulation of light in Embodiment 10.
Figure 29A:
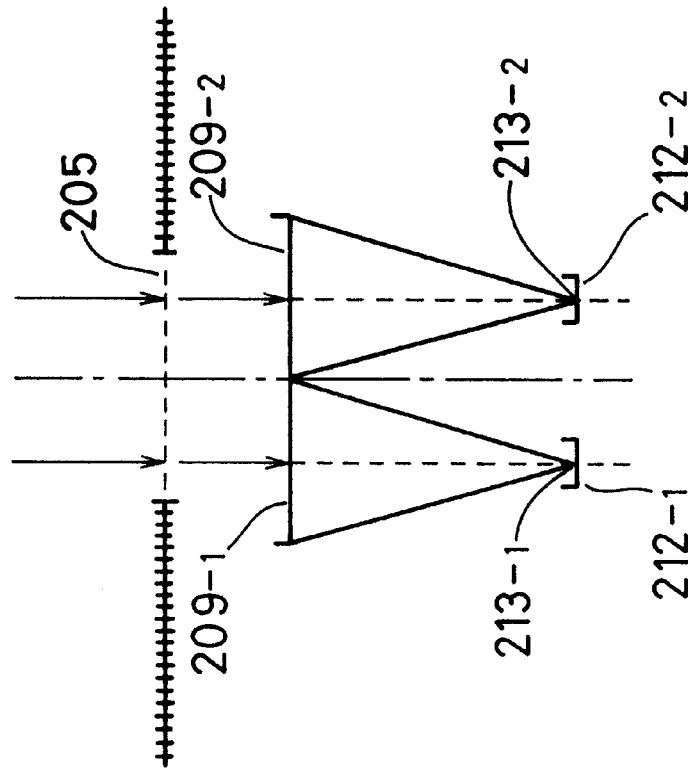

Next, Embodiment 10 directed to an optical encoder and position detection method according to this invention is described with reference to FIGS. 28 to 31. FIG. 28 is a perspective view showing a basic configuration of an optical encoder according to Embodiment 10. The optical encoder shown in FIG. 28 comprises a light source 201 such as a semiconductor laser or a relatively coherent light emitting diode; a collimator lens 202 for making beams from the light source 201 parallel; a movable plate 203 disposed approximately perpendicularly to the optical axis of the parallel beams and that can be rotated around a rotating shaft 213 parallel to the optical axis; a fixed plate 207 disposed approximately perpendicularly to the optical axis; and a light receiving device 210 with a plurality of light receiving parts.

The disc-like movable plate 203 has a phase type diffraction grating 204 disposed annularly over the entire circumference; and a light transmissible part 205 produced by removing part of the pattern of a phase type diffraction grating 206 disposed concentrically with the phase type diffraction grating 204. The fixed plate 207 corresponds to the phase type diffraction grating 204 of the movable plate 203, and has a phase type diffraction grating 208 of an equal pitch formed like a circular arc; and Fresnel zone plates 209-1 to 209-4. A light receiving part 211 of the light receiving device 210 receives light formed by the phase type diffraction grating 204 of the movable plate 203 and the phase type diffraction grating 208 of the fixed plate 207. Light receiving parts 212-1 to 212-4 receive light formed by the light transmissible part 205 of the movable plate 203 and the Fresnel zone plates 209-1 to 209-4 of the fixed plate 207.

In the configuration in FIG. 28, the amount of light received by the light receiving parts 212-1 to 212-4 of the light receiving device 210 can be varied by modulating light using the light transmissible part 205 and phase type diffraction grating 206 of the movable plate 203 and the Fresnel zone plates 209-1 to 209-4 of the fixed plate 207. Abovementioned is described in FIG. 29. The light receiving parts 212-1 to 212-4 are disposed so as to correspond to the centers of the patterns of the Fresnel zone plates 209-1 to 209-4. The distance between the fixed plate 207 and the light receiving device 210 is referred to as L, the diffraction angle of the phase type diffraction angle 206 is referred to as θ1, the distance between the point of the light receiving part corresponding to the optical center of the Fresnel zone plate and the end of light receiving part is referred to as δ, and the distance between the point of the light receiving part corresponding to the optical center of the Fresnel zone plate and the position of the condensed spot is expressed as Δ (described in FIG. 29B).

The light transmissible part 205 or the phase type diffraction grating 206 is located at the position corresponding to the Fresnel zone plates 209-1 to 209-4 of the fixed plate depending on the rotating position of the movable plate 203. If the light transmissible part 5 is located at the position corresponding to the Fresnel zone plates 209-1 to 209-4 (as in FIG. 29A), approximately parallel beams incident on the movable plate are transmitted through the light transmissible area 5 and are incident on the Fresnel zone plates 209-1 to 209-4. Light spots 213-1 to 213-4 formed by the Fresnel zone plates 209-1 to 209-4 are received by the light receiving parts 212-1 to 212-4. If the phase type diffraction grating 206 is located at the position corresponding to the Fresnel zone plates 209-1 to 209-4 (as in FIG. 29B), approximately parallel beams incident on the movable plate are diffracted by the phase type diffraction grating 206. Thus, the positions of the light spots 213-1 to 213-4 formed by the Fresnel zone plates 209-1 to 209-4 are offset and not received by the light receiving parts 212-1 to 212-4. That is, by meeting the following relationship, $$\Delta = L \times \tan\theta 1 > \delta \qquad (46)$$

condensed spots formed by the Fresnel zone plates can be prevented from being received by the light receiving parts.

It is well known that the following relationship is established between the grating pitch P of the phase type diffraction grating 206 and the diffraction angle θ1 thereof depending on the wavelength of light λ used.

$$\sin\theta 1 = \lambda / P \qquad (47)$$

The grating pitch of the phase type diffraction grating 206 and the width of the light receiving part are defined to meet Equations (46) and (47).

Figure 30:
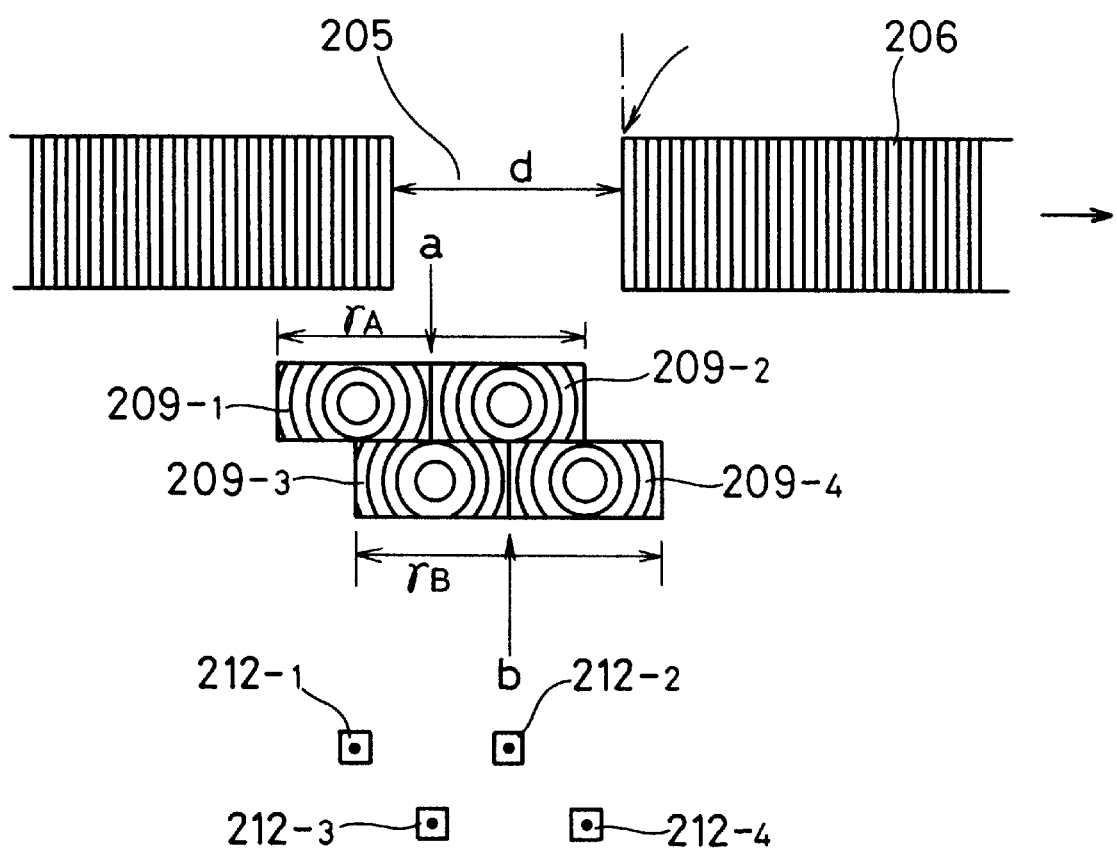
FIG. 30 shows the position of a modulation element in Embodiment 10.
Figure 31:
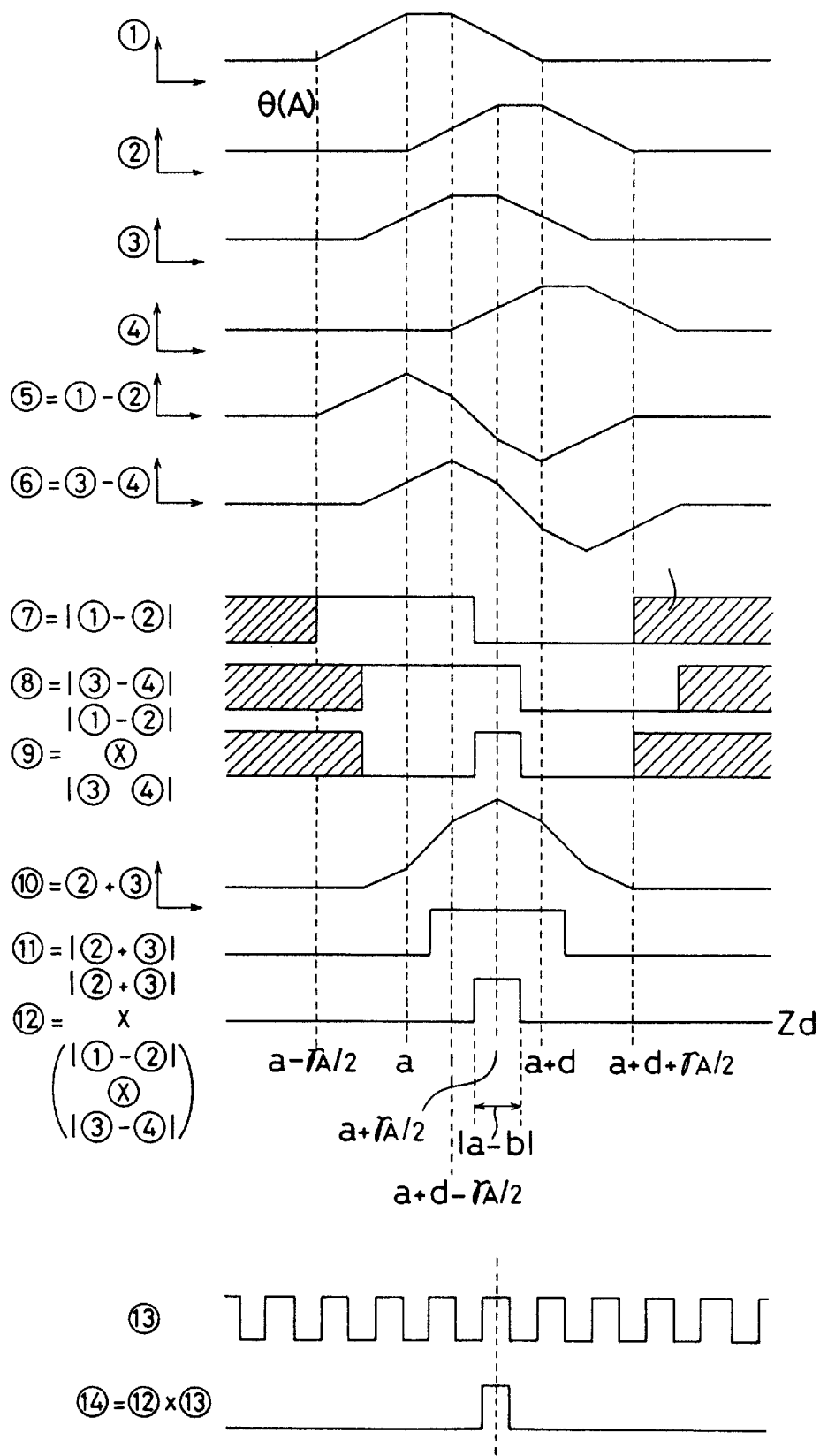
FIG. 31 shows a process for generating an output signal in Embodiment 10.

A method for forming a Z phase signal from light receiving signals from the light receiving devices 213-1 to 213-4 is described with reference to FIGS. 30 and 39. FIG. 30 shows the positions of the light transmissible part of the movable plate, the Fresnel zone plates of the fixed plate, and the light receiving parts. FIG. 31 shows the relationship of the amount of light received by the light receiving parts 212-1 to 212-4 with the position of the light transmissible part 205 in FIG. 30.

Signals (1), (2), (3), and (4) each indicate the amounts of light received by the light receiving parts 212-1, 212-2, 212-3, and 212-4. The width of the light transmissible part is referred to as d, the width of the Fresnel zone plates 209-1 and 209-2 is referred to as $r_A$, the width of the Fresnel zone plates 209-3 and 209-4 is referred to as $r_B$, the position of the boundary between the Fresnel zone plates 209-1 and 209-2 is referred to as a, and the position of the boundary between the Fresnel zone plates 209-3 and 209-4 is referred to as b. For simplicity, the width of the Fresnel zone plate 209-1 is equal to the width of the Fresnel zone plate 209-2 and is expressed as $r_A/2$. Similarly, the width of the Fresnel zone plate 209-3 is equal to the width of the Fresnel zone plate 209-4 and is expressed as $r_B/2$.

The position of portion A (described in FIG. 30) of the light transmissible part and the signals (1), (2), (3), and (4) are as shown in the figure. In the signal (1), when the position of the portion A, θ(A) is at a position $a - r_A/2$, that is, $$\theta(A) = a - r_A/2 \qquad (48),$$

the amount of received light starts to increase. When:

$$\theta(A) = a \qquad (49),$$

the amount of received light becomes fixed. When:

$$\theta(A) = a + d - r_A/2 \qquad (50),$$

the amount of received light starts to decrease. When:

$$\theta(A) = a + d \qquad (51),$$

the amount of received light becomes fixed.
Likewise, in the signal (2), when:

$$\theta(A) = a \qquad (52),$$

the amount of received light starts to increase. When:

$$\theta(A) = a + r_A/2 \qquad (53),$$

the amount of received light becomes fixed. When:

$$\theta(A) = a + d \qquad (54),$$

the amount of received light starts to decrease. When:

$$\theta(A) = a + d + r_A/2 \qquad (55),$$

the amount of received light becomes fixed. This is also true of the signals (3) and (4).

FIG. 31 shows a method for generating a Z phase signal from the signals (1) to (4). A signal (5) is obtained as a differential signal of the signals (1) and (2), and a signal (6) is obtained as a differential signal of the signals (3) and (4). The signals (5) and (6) are binarized on a zero level to generate signals (7) and (8), respectively. The exclusive conjunction of the signals (7) and (8) is determined to generate a signal (9).

In addition, the sum of the signals (2) and (3) is determined to generate a signal (10), which is then binarized using a threshold such that the signal (10) becomes a pulsed signal including one pulse of the signal (9). Thus, a signal (11) is generated.

The conjunction of the signals (9) and (11) is calculated to obtain a signal (12) (a Zd signal).

The conjunction of the Zd signal and an A/B phase signal (13) is calculated to obtain a Z phase signal (14) that is synchronized with one pulse of the A/B phase signal.

In this case, by setting the relationship between the pulse width $T_{zd}$ of the Zd signal and the pulse width $T_{AB}$ of the A/B phase signal as follows:

$$T_{AB} < T_{zd} < T_{AB} \times 2 \qquad (56)$$

to allow the Zd signal to include only one pulse of the A/B phase signal, the Z phase signal in synchronism with one pulse of the A/B phase signal can be obtained by determining their conjunction.

When the center of the light transmissible part 205 is located in the boundary between the Fresnel zone plates 209-1 and 209-2, the differential output of the light receiving parts 212-1 and 212-2 is zero and this point becomes the rising edge of the Zd signal. Likewise, when the light transmissible part 205 is located in the boundary between the Fresnel zone plates 209-3 and 209-4, the differential output of the light receiving parts 212-3 and 212-4 is zero and this point becomes the falling edge of the Zd signal. That is, the pulse width of the Zd signal is the distance (angle) between the position a in the boundary between the Fresnel zone plates 209-1 and 209-2 and the position b in the boundary between the Fresnel zone plates 209-3 and 209-4. The distance |a–b| is not limited and may have any value. That is, the pulse width of the Zd signal may be reduced without limitation. It is thus possible to generate a Z phase signal with a pulse width equal to that of the A/B phase signal with a period of about 10 μm, as shown in the above conventional example.

The width d of the light transmissible part is smaller than the width $r_A$, $r_B$ of the Fresnel zone plates. That is, the following relationship is established.

$$d < r_A \quad (57)$$

$$d < r_B \quad (58)$$

This is because if the width d of the light transmissible part is larger than the width $r_A$, $r_B$ of the Fresnel zone plates, no change in the differential output of the two light receiving parts can be obtained when the position of the light transmissible part is changed near the boundary between the two Fresnel zone plates. In this case, the intersection of the differential output and the zero level is not a point, so the rising edge of the Zd signal is unstable due to noises.

The phase type diffraction gratings and the Fresnel zone plates can be implemented using the recesses and convexes of the surface of the substrate and produced inexpensively by using transparent resin such as polycarbonate or acryl by a stamping process.

Figure 35:
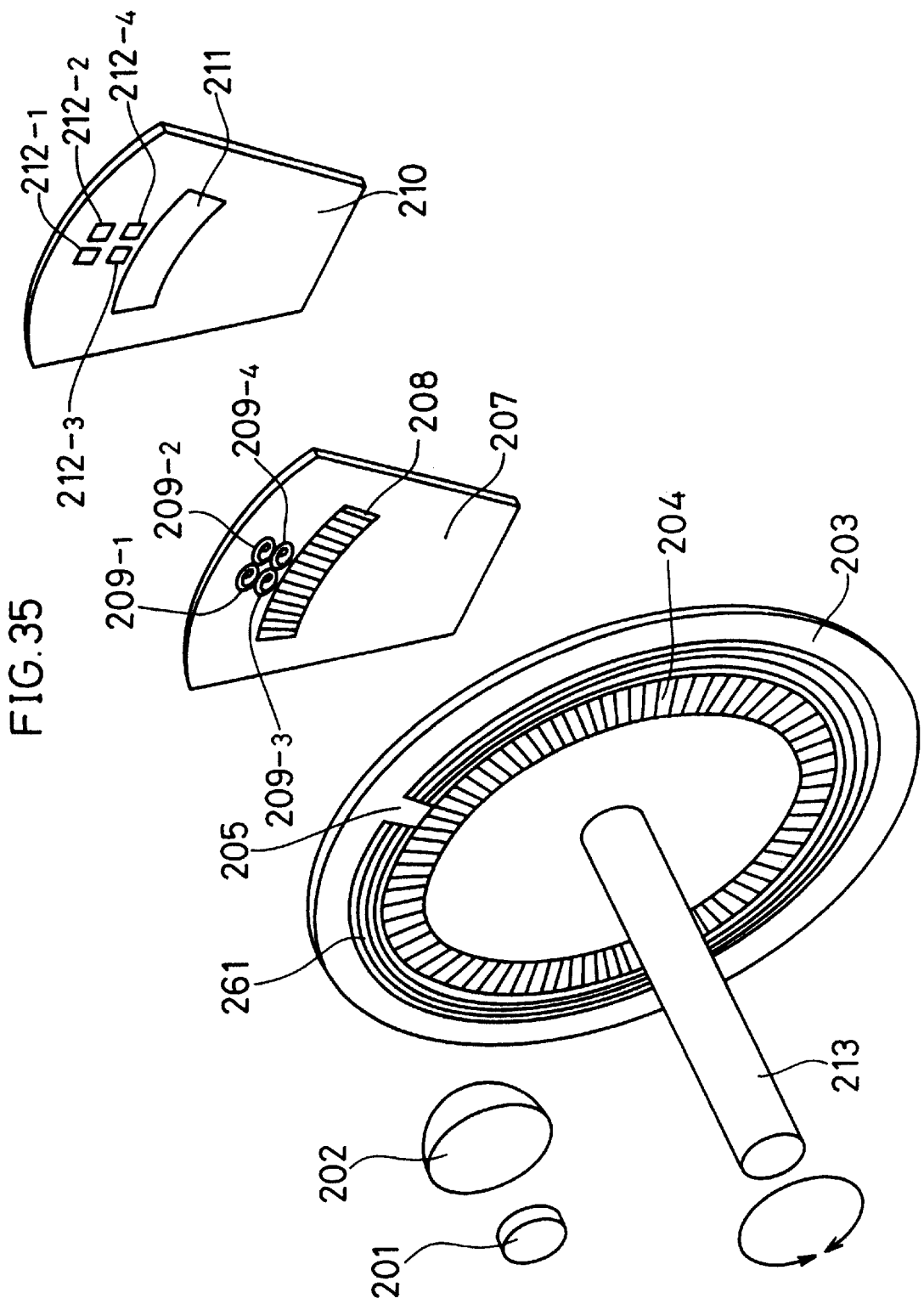
FIG. 35 is a perspective view showing another configuration of the optical encoder in Embodiment 10.
Figure 36:
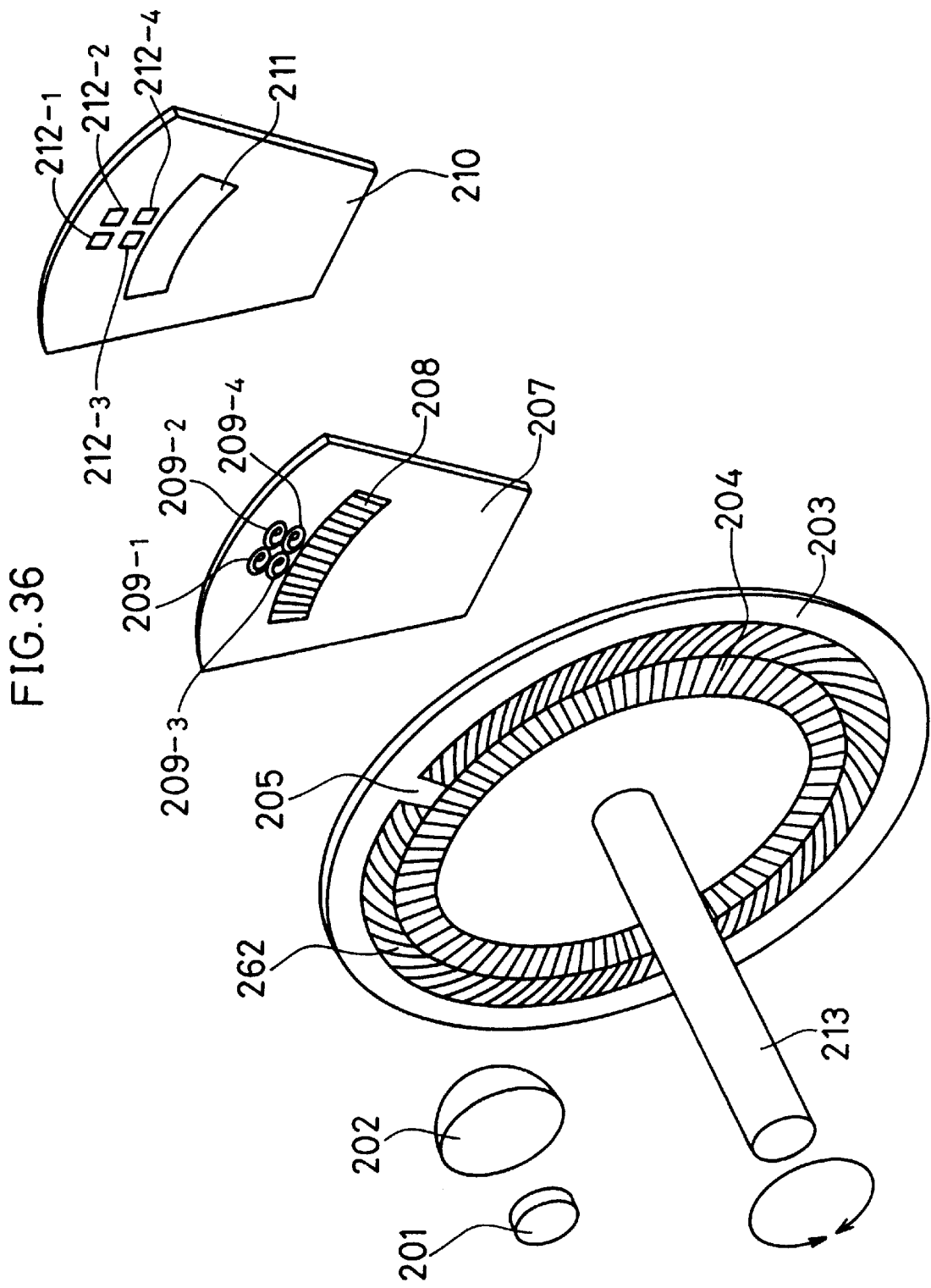
FIG. 36 is a perspective view showing another configuration of the optical encoder in Embodiment 10.
Figure 37:
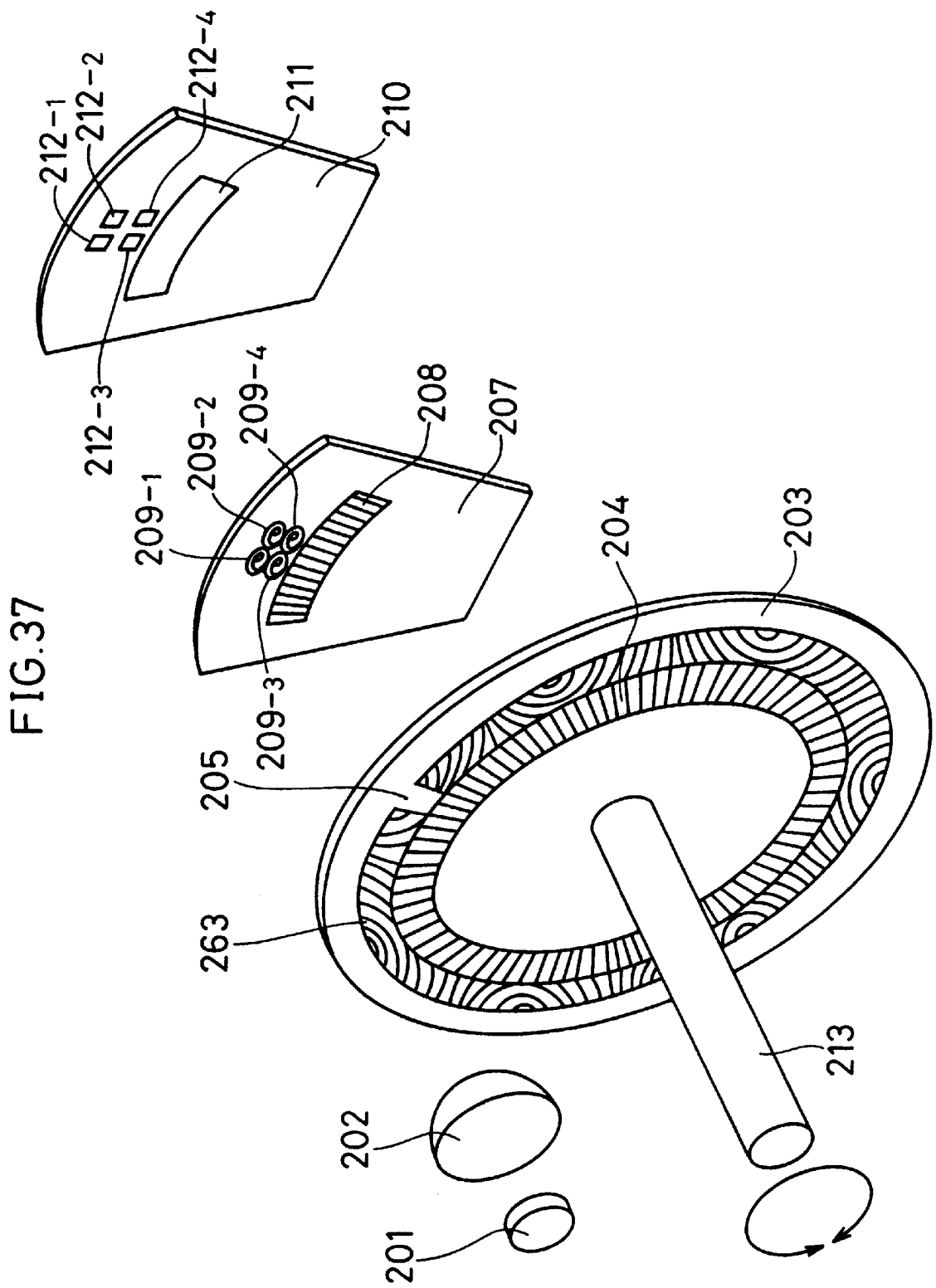
FIG. 37 is a perspective view showing another configuration of the optical encoder in Embodiment 10.
Figure 38:
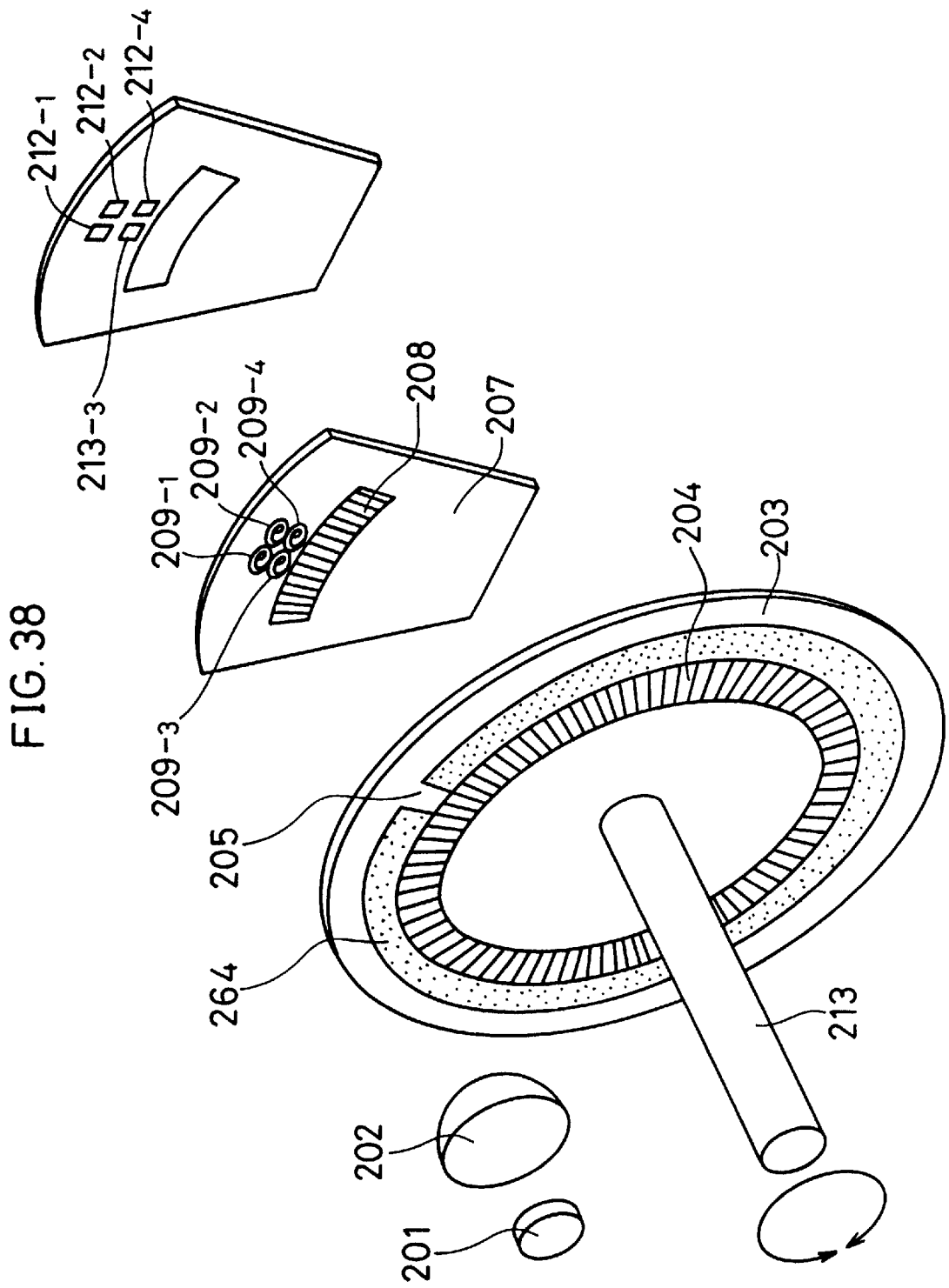
FIG. 38 is a perspective view showing another configuration of the optical encoder in Embodiment 10.
Figure 39:
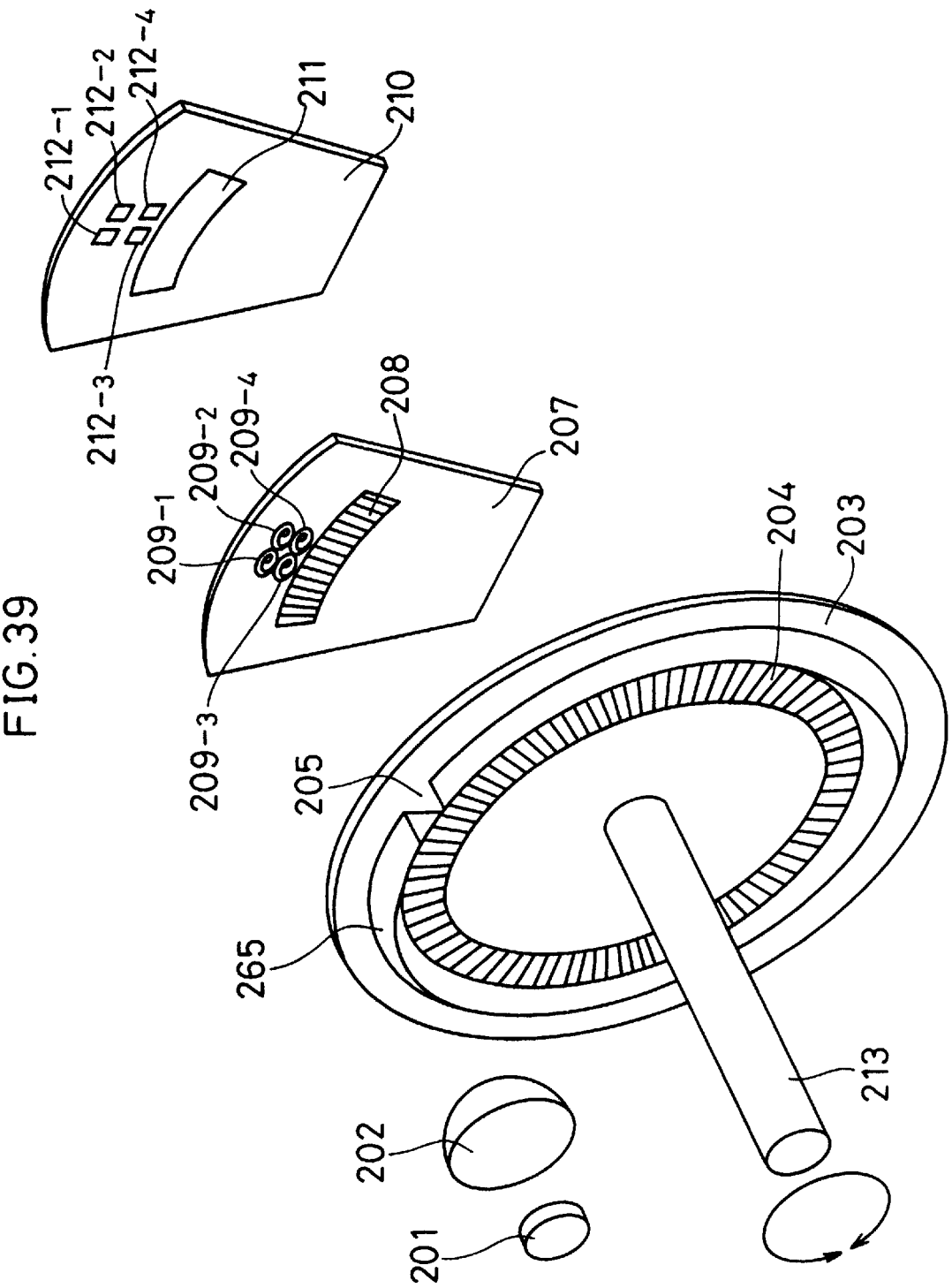
FIG. 39 is a perspective view showing another configuration of the optical encoder in Embodiment 10.
Figure 40:
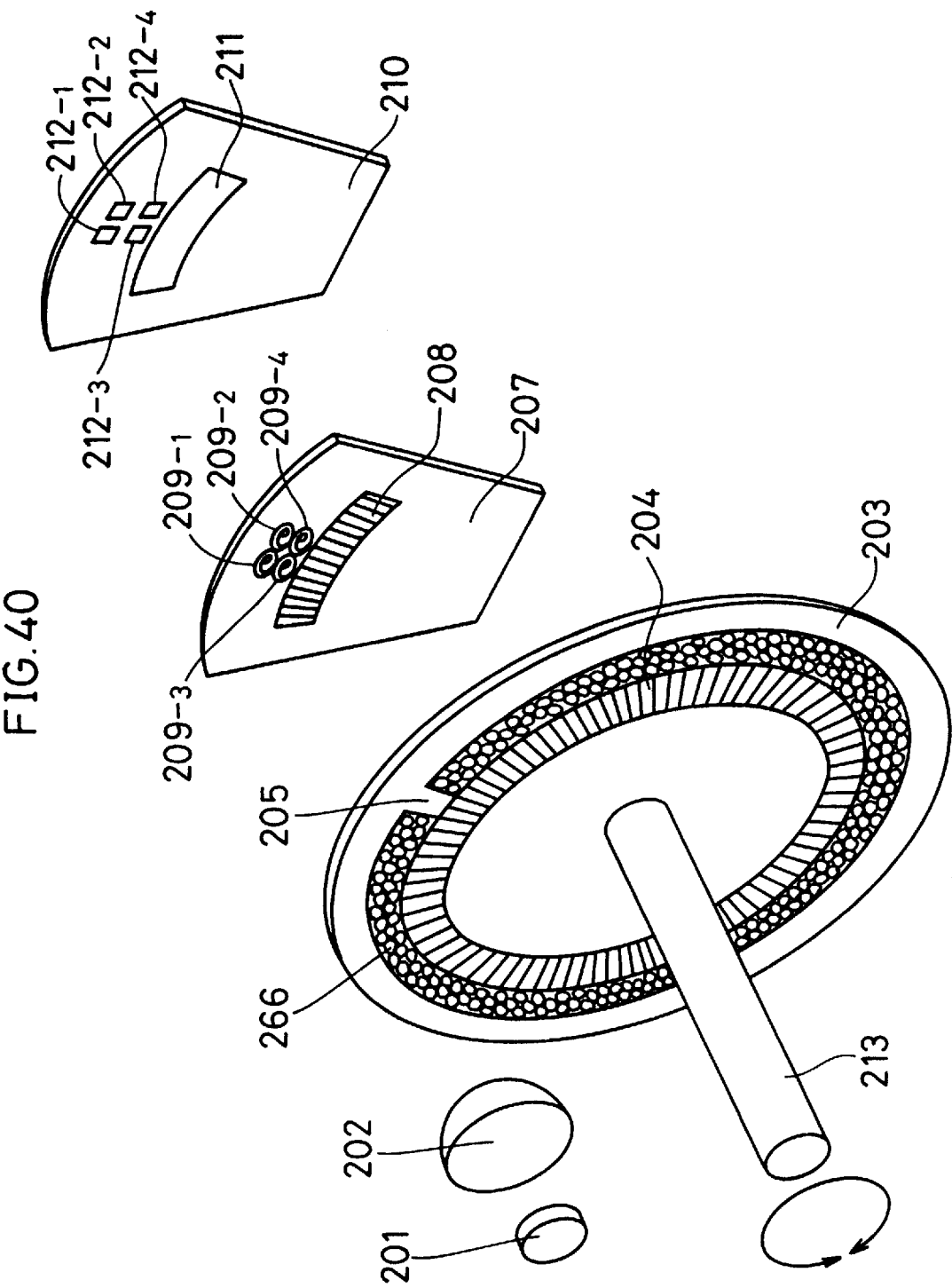
FIG. 40 is a perspective view showing another configuration of the optical encoder in Embodiment 10.
Figure 41:
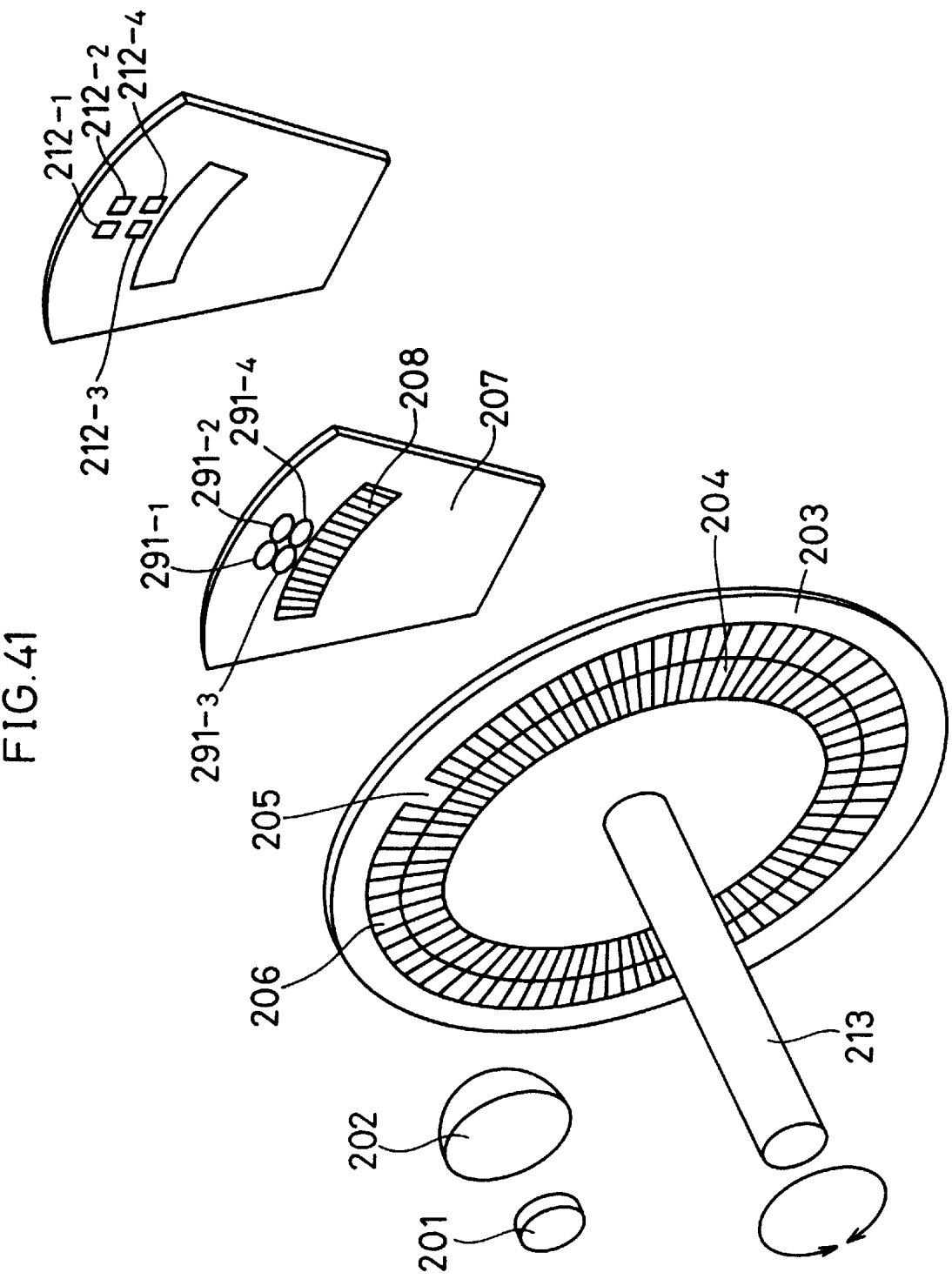
FIG. 41 is a perspective view showing another configuration of the optical encoder in Embodiment 10.

Although the phase type diffraction grating 206 comprises a radial grating the center of which is the moving center of the movable plate 203, similar effects can be obtained by using a device that prevents a light spot formed by the phase type diffraction grating 206 and the Fresnel zone plates 209-1 to 209-4 from being received by the light receiving parts 212-1 to 212-4, for example, a concentric grating 261 shown in FIG. 35, a grating 262 that is neither radial nor concentric as shown in FIG. 36, a Fresnel zone plate 263 shown in FIG. 37, a light scattering surface 264 shown in FIG. 38, a prism 265 shown in FIG. 39, or a lens 266 shown in FIG. 40. In addition, although the condensing phase modulating element on the fixed plate 207 comprises a Fresnel zone plate, similar effects can be obtained by using normal dioptric lenses 291-1 to 291-4 as shown in FIG. 41.

Figure 34:
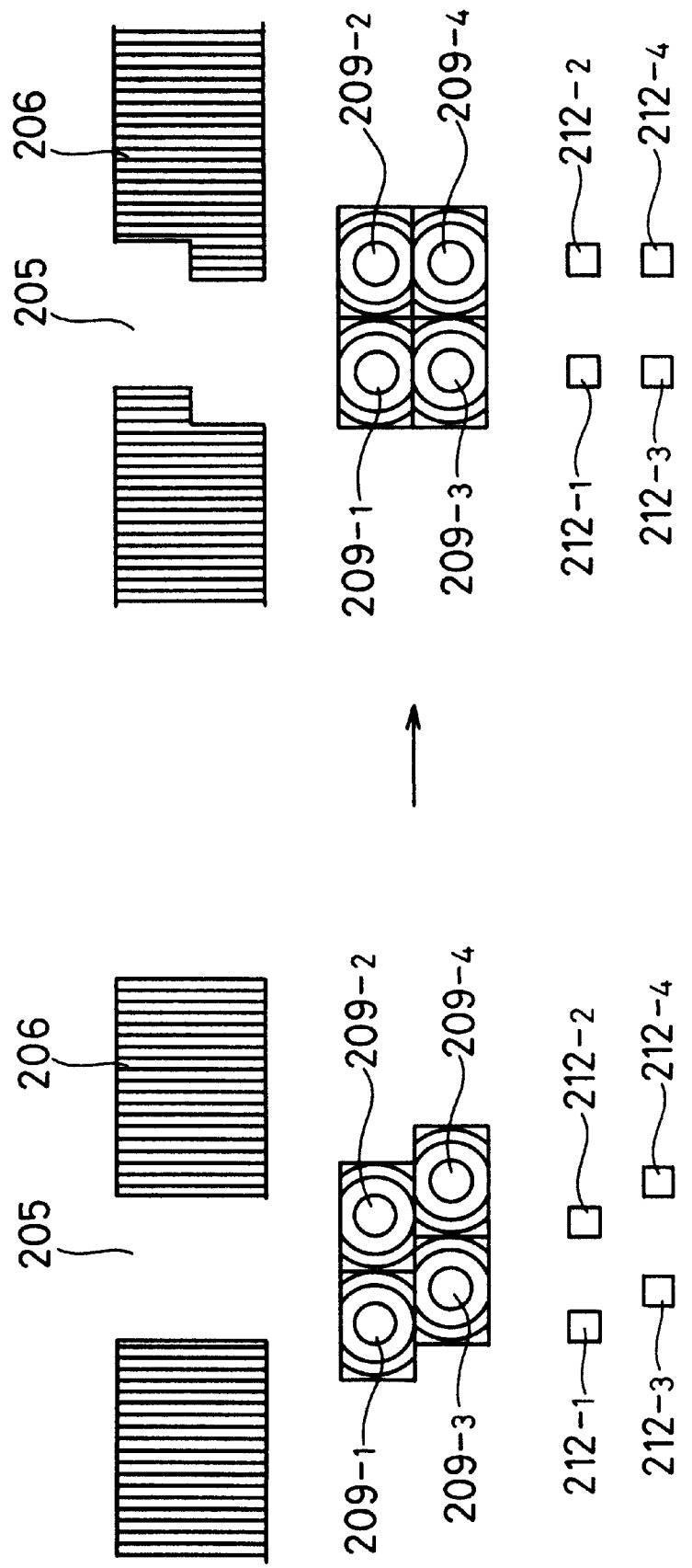
FIG. 34 shows the position of another modulation element in Embodiment 10.

In this embodiment, the two sets of two parallel condensing elements on the fixed plate are installed at different positions relative to the moving direction of the movable plate to make the zero cross timings of two differential outputs offset from each other in order to generate an rising and a falling edges of a binarized signal. If, however, the two sets of two parallel condensing elements on the fixed plate are installed at the same positions relative to the moving direction of the movable plate and the corresponding light transmissible parts on the movable plate are installed in different positions, as shown in FIG. 34, the zero cross timings of two differential output signals are also offset from each other, resulting in similar effects.

In addition, although the widths of the tresnel zone plates 209-1 and 209-2 are equal and the widths of the Fresnel zone plates 209-3 and 209-4 are equal, similar effects can be obtained if these widths are not equal.

(Embodiment 11)

Figure 32:
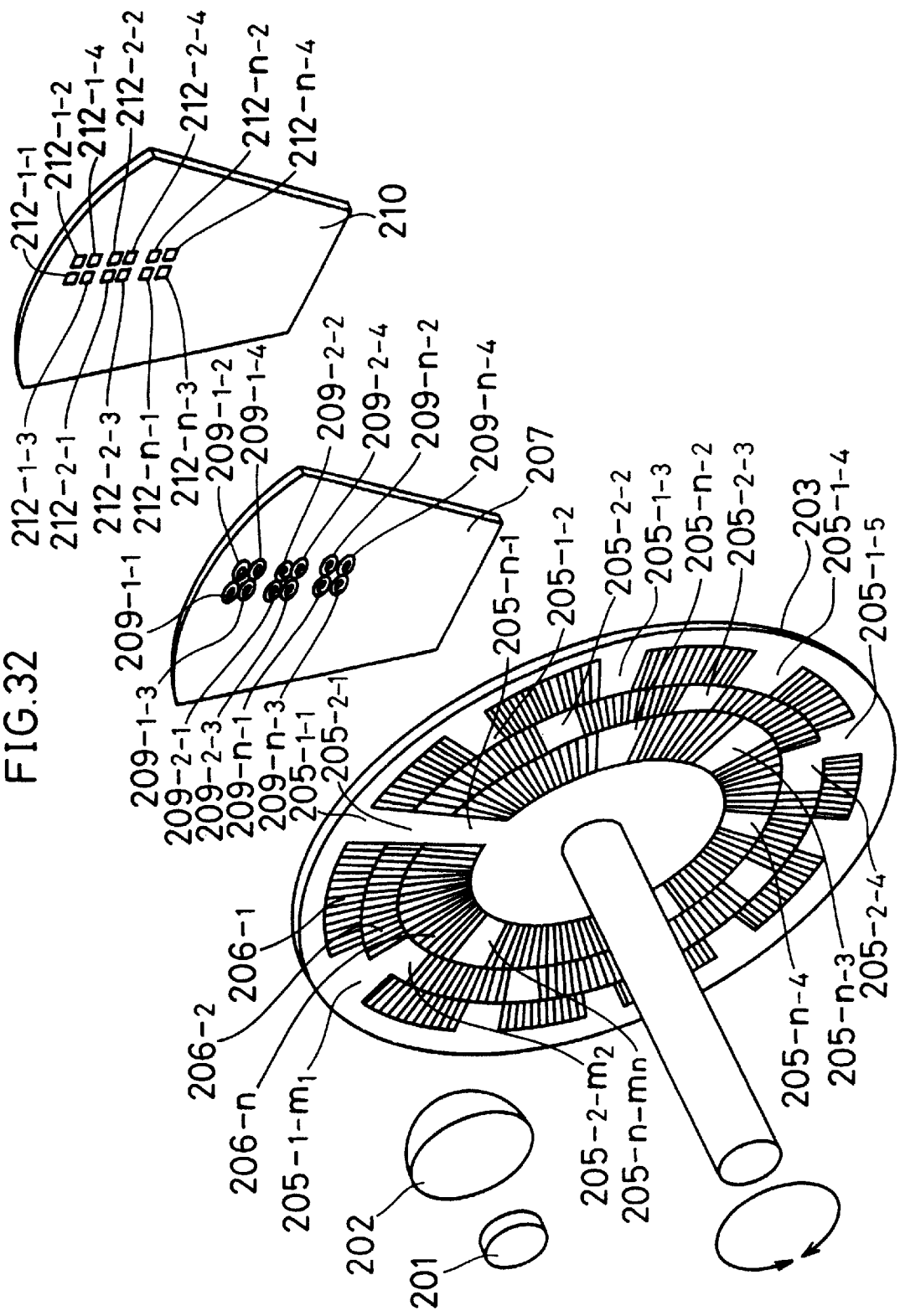
FIG. 32 is a perspective view showing a configuration of an optical encoder in Embodiment 11 according to this invention.
Figure 33:
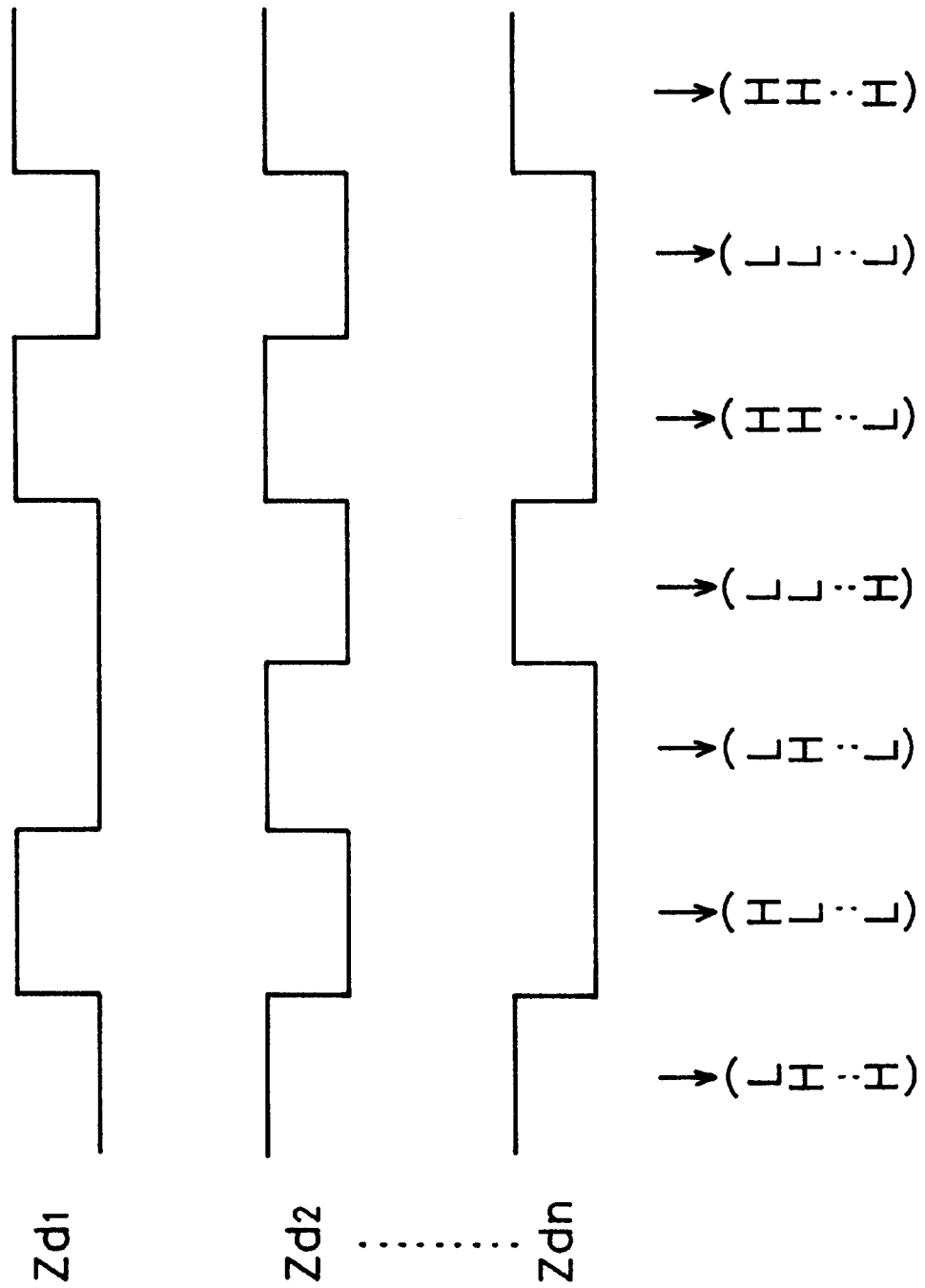
FIG. 33 shows an example of an output signal in Embodiment 11.

Next, Embodiment 11 directed to an optical encoder and position detection method according to this invention is described with reference to FIGS. 32 to 33. FIG. 32 is a perspective view showing a basic configuration of an optical encoder according to Embodiment 11. The optical encoder shown in FIG. 32 comprises a light source 201 such as a semiconductor laser or a relatively coherent light emitting diode; a collimator lens 202 for making beams from the light source 201 parallel; a movable plate 203 disposed approximately perpendicularly to the optical axis of the parallel beams and that can be rotated around a rotating shaft 213 parallel to the optical axis; a fixed plate 207 disposed approximately perpendicularly to the optical axis; and a light receiving device 210 with a plurality of light receiving parts.

The disc-like movable plate 203 has light transmissible parts 205-i-1, ..., 205-i-$m_n$ ($m_n$ is an integer equal to or larger than 1) (hereafter generalized as 205-i-j (j=1 to $m_n$)) produced by removing part of the patterns of concentrically disposed phase type diffraction gratings 206-1, 206-2, ..., 206-n (n is an integer equal to or larger than 2) (hereinafter generalized as 206-i (i=1 to n), which is applicable to the other cases).

The fixed plate 207 has Fresnel zone plates 209-i-1 to 209-i-4 at the positions corresponding to the phase type diffraction grating 206-i of the movable plate. Light receiving parts 212-i-1 to 212-i-4 of the light receiving device 210 receive light formed by the light transmissible part 205-i-j of the movable plate 203 and the Fresnel zone plates 209-i-1 to 209-i-4 of the fixed plate 207.

In the configuration in FIG. 28, the amount of light received by the light receiving parts 212-i-1 to 212-i-4 of the light receiving device 210 can be varied by modulating light using the light transmissible part 205-i-j and the phase type diffraction gratings 206-i of the movable plate 203 and the Fresnel zone plates 209-i-1 to 209-i-4 of the fixed plate 207, as described in FIG. 29 in Embodiment 10. The method described in FIGS. 30 and 39 is used to generate a binarized signal from each track Zd1, Zd2, , , , Zdn (n is an integer equal to or larger than 2). The timing with which the binarized signal Zdi generated by each track is determined by the relative position of the light transmissible part 205-i-j.

If H and L are used to describe binarized signals, the combination of H and L binarized signals from each track during a single rotation of the movable plate depends on the position of the movable plate 203. By setting the pulse width (that is, the distance (the angle) between the boundary between the Fresnel zones 209-i-1 and 209-i-2 and the boundary between the Fresnel zones 209-i-3 and 209-i-4) and generation timing (that is, the position of the light transmissible part 205-i-j) of each of the plurality of track signals in such a way that the binarized signal pattern of each track when the movable plate 203 is at one position is different from the binarized signal pattern when the movable plate is at any other position, the absolute rotating position of the movable plate can be detected from the light receiving signal pattern. This enables a signal pattern unique to the position of the movable plate 203 to be obtained, thereby providing an absolute type optical encoder capable of detecting the rotating position of the movable plate 203 wherever it is.

The phase type diffraction gratings and the Fresnel zone plates can be implemented using the recesses and convexes of the surface of the substrate and produced inexpensively by using transparent resin such as polycarbonate or acryl by stamping process.

Figure 42:
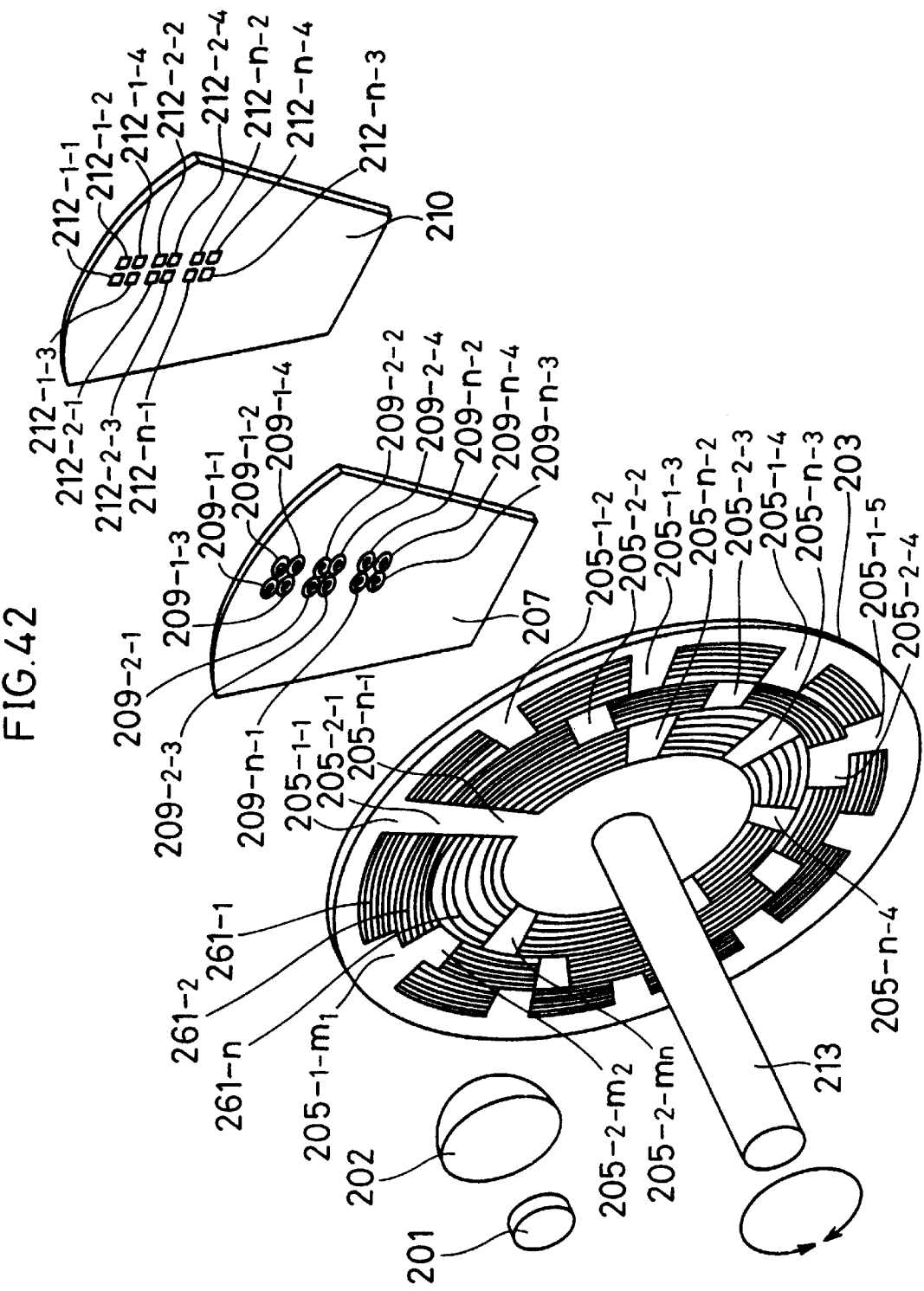
FIG. 42 is a perspective view showing another configuration of the optical encoder in Embodiment 11.
Figure 43:
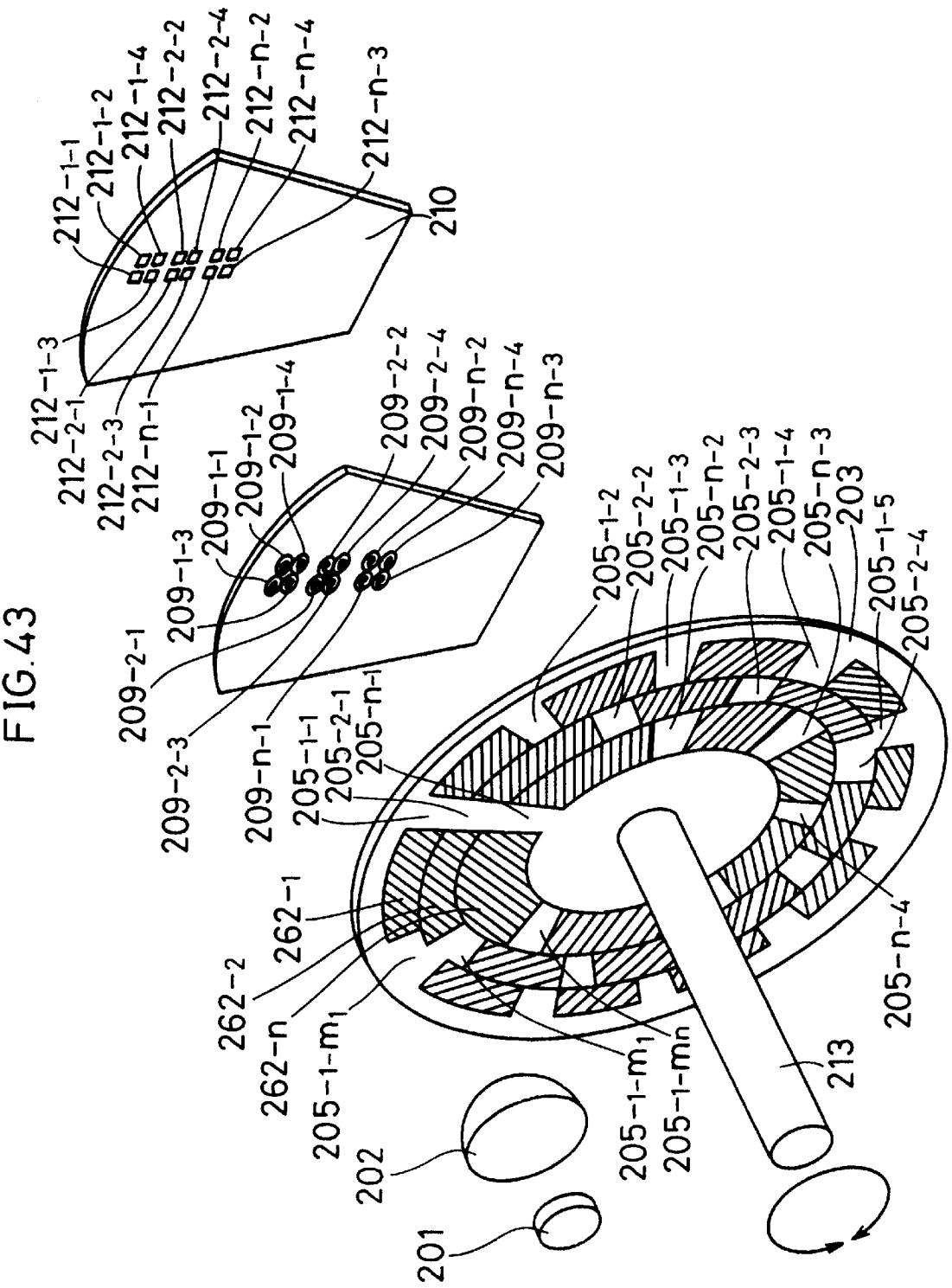
FIG. 43 is a perspective view showing another configuration of the optical encoder in Embodiment 11.
Figure 44:
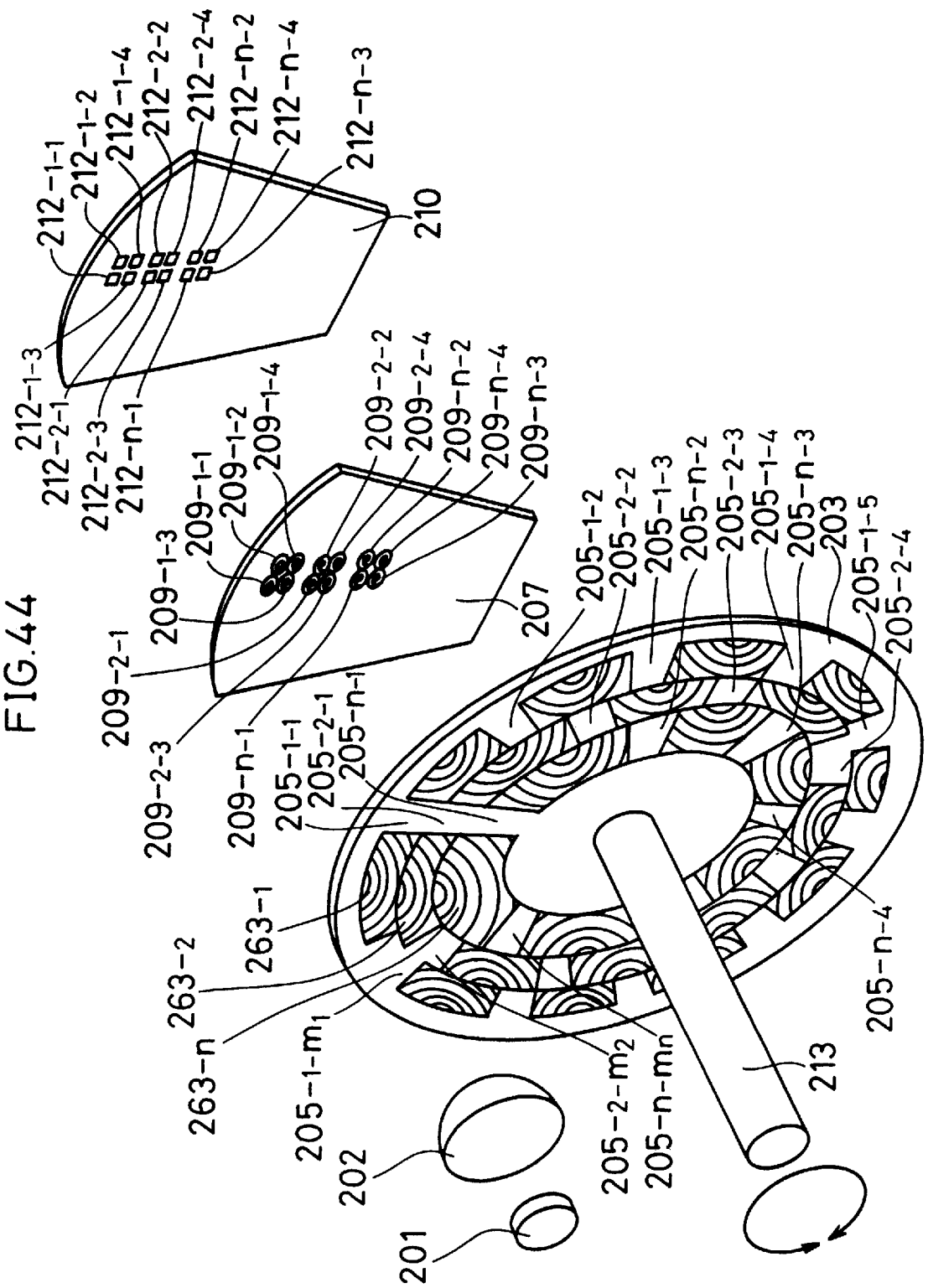
FIG. 44 is a perspective view showing another configuration of the optical encoder in Embodiment 11.
Figure 45:
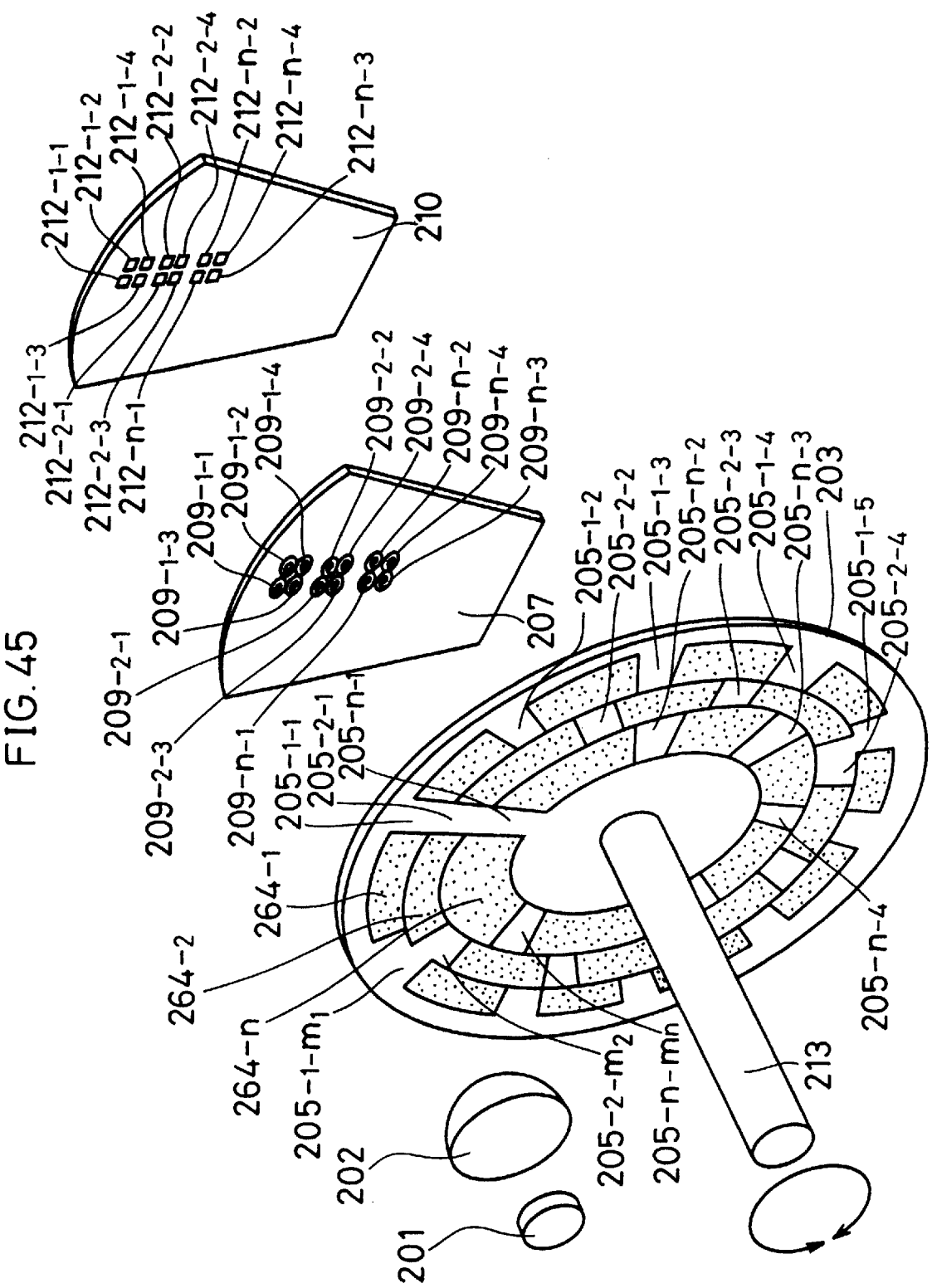
FIG. 45 is a perspective view showing another configuration of the optical encoder in Embodiment 11.
Figure 46:
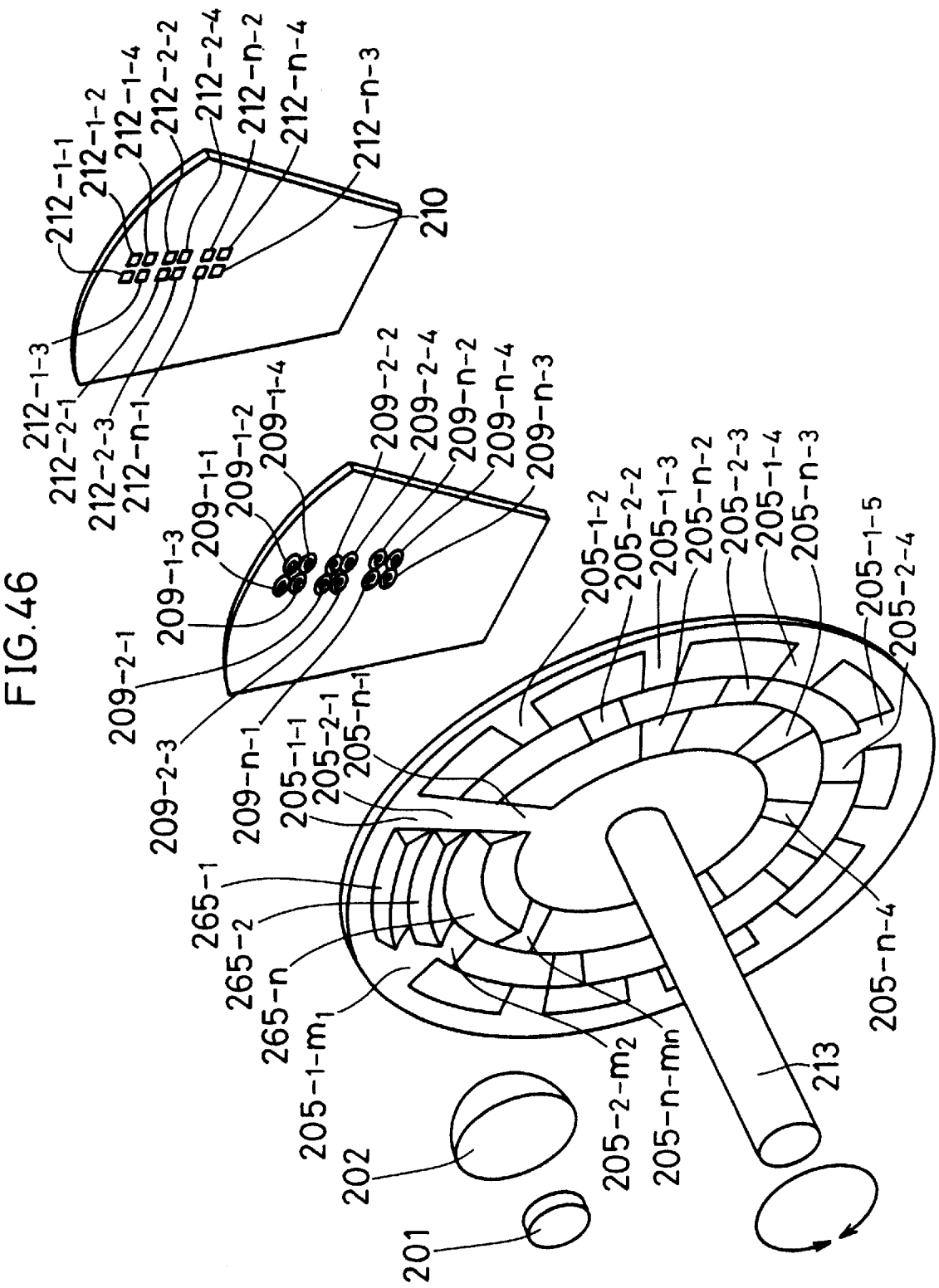
FIG. 46 is a perspective view showing another configuration of the optical encoder in Embodiment 10.
Figure 47:
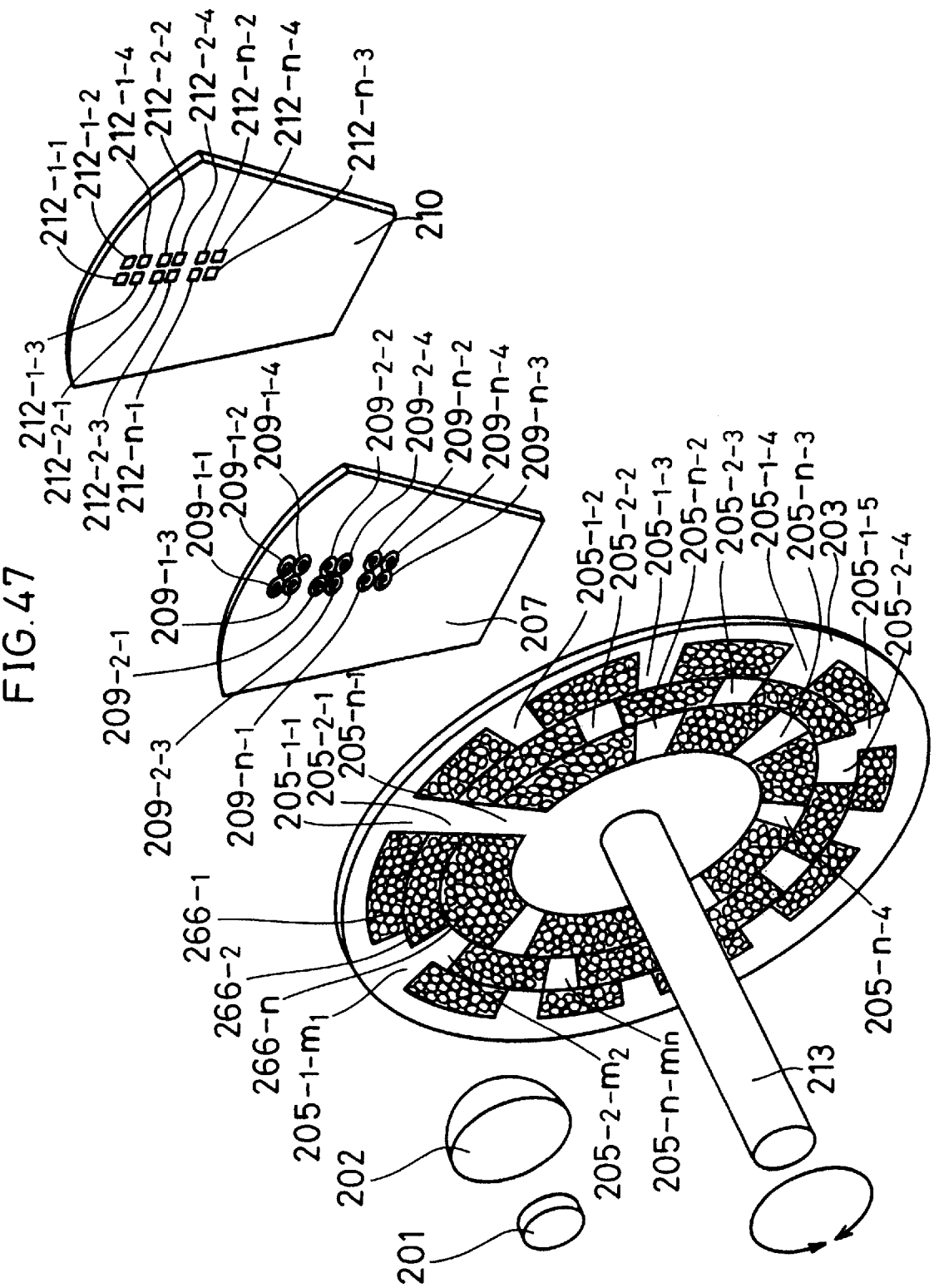
FIG. 47 is a perspective view showing another configuration of the optical encoder in Embodiment 11.
Figure 48:
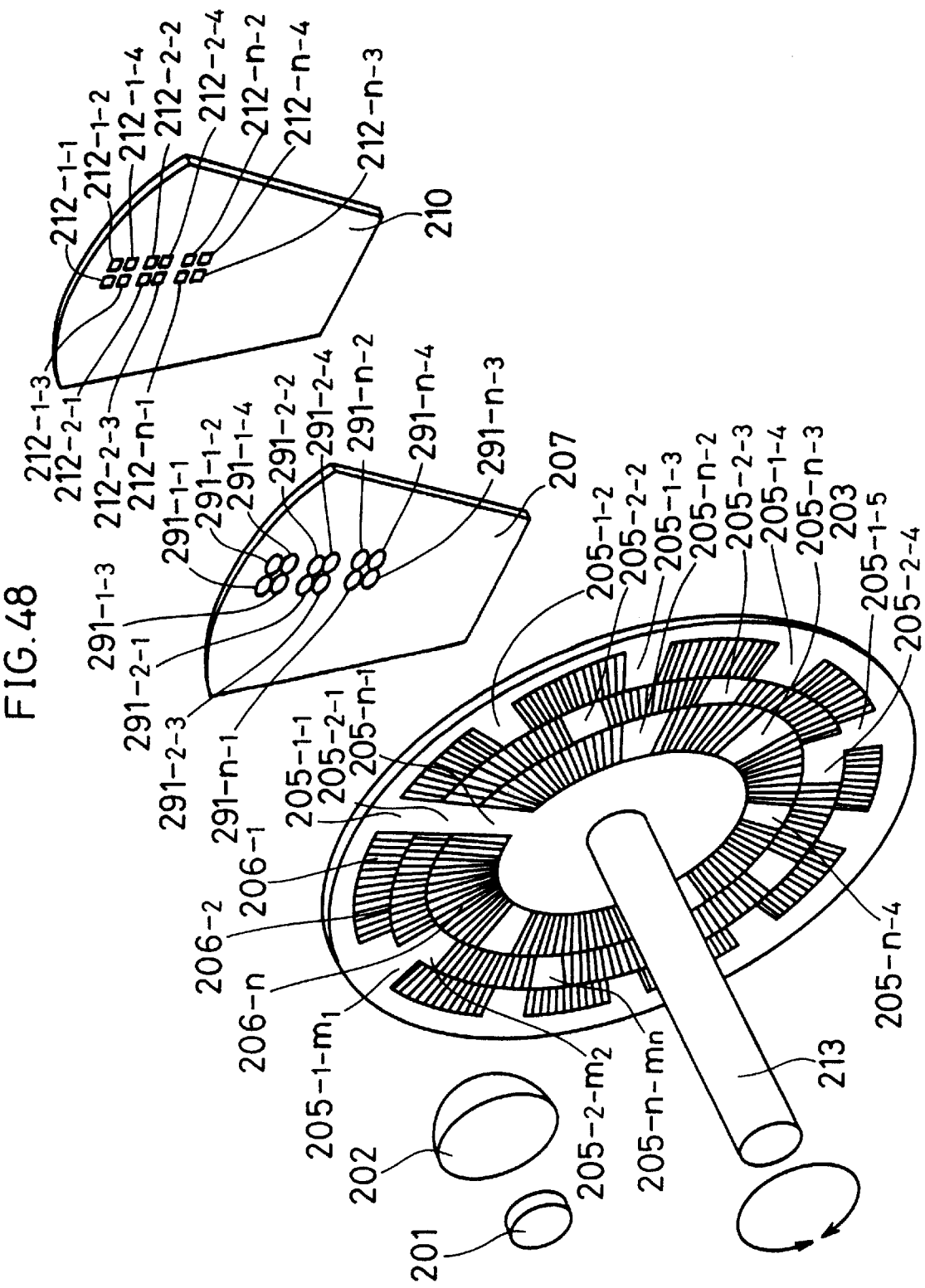
FIG. 48 is a perspective view showing another configuration of the optical encoder in Embodiment 11.
Figure 49:
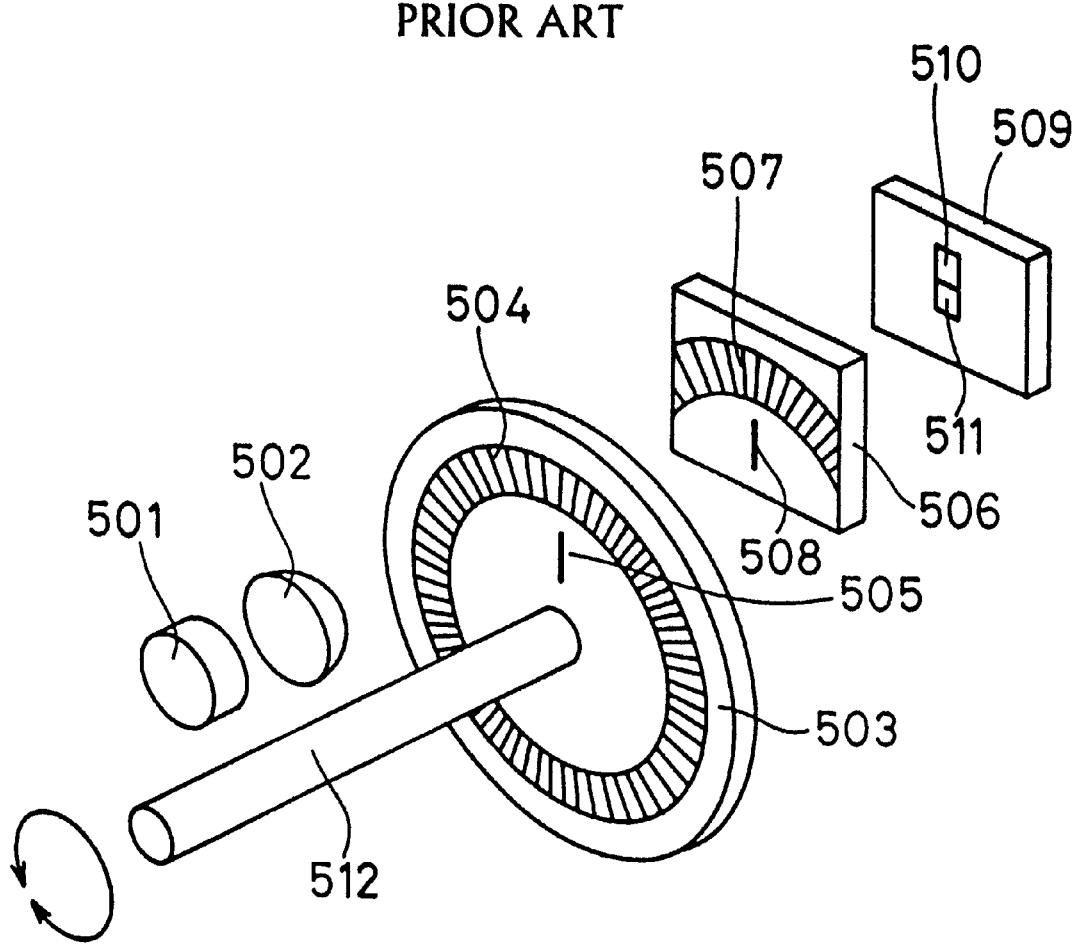
FIG. 49 is a perspective view showing a configuration of an optical encoder according to a first conventional example.
Figure 50A:
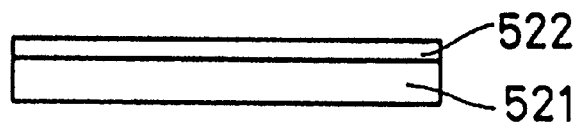
FIGS. 50A–50E show a conventional process for producing a light shielding pattern.
Figure 50B:
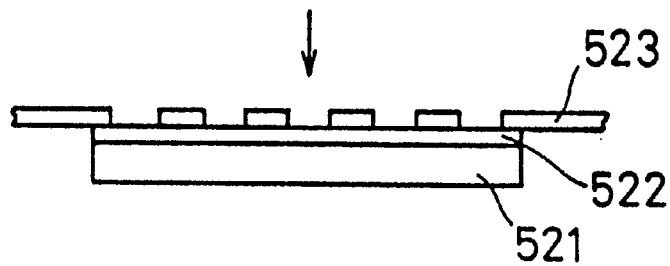
Figure 50C:
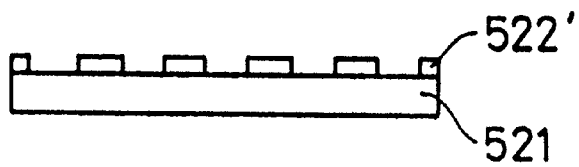
Figure 50D:
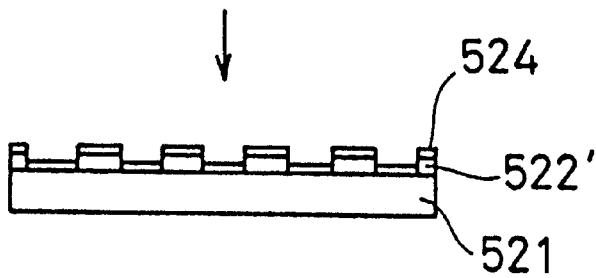
Figure 50E:
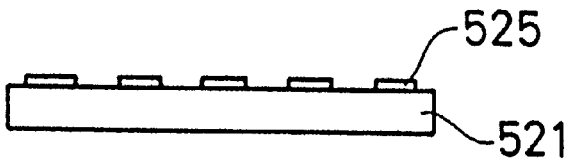
Figure 51:
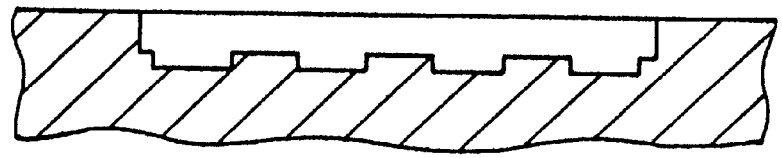
FIG. 51 shows a conventional process for producing phase type diffraction gratings using a stamping process.

Although the phase type diffraction grating 206 includes a radial grating the center of which is the moving center of the movable plate 203, similar effects can be obtained by using a device that prevents a light spot formed by the phase type diffraction grating 206 and the Fresnel zone plates 209-1 to 209-4 from being received by the light receiving parts 212-1 to 212-4, for example, concentric gratings 261-1 to 261-n shown in FIG. 42, gratings 262-1 to 262-n that are neither radial nor concentric as shown in FIG. 43, Fresnel zone plates 263-1 to 263-n shown in FIG. 44, light scattering surfaces 264-1 to 264-n shown in FIG. 45, prisms 265-1 to 265-n shown in FIG. 46, or lenses 266-1 to 266-n shown in FIG. 47. In addition, although the condensing phase modulating element on the fixed plate 207 comprises a Fresnel zone plate, similar effects can be obtained by using normal dioptric lenses 291-1-1 to 291-n-4 as shown in FIG. 48.

In this embodiment, the two sets of two parallel condensing elements on the fixed plate are installed at different positions relative to the moving direction of the movable plate to make the zero cross timings of two differential outputs offset from each other in order to generate an rising and a falling edges of a binarized signal. If, however, the two sets of two parallel condensing elements on the fixed plate are installed at the same positions relative to the moving direction of the movable plate and the corresponding light transmissible parts on the movable plate are installed in different positions, as shown in FIG. 34, the zero cross timings of two differential output signals are also offset from each other, resulting in similar effects.

We claim:

1. An optical encoder comprising:
    a light source; a lens for making beams from said light source approximately parallel; a movable plate with a first optical element for concentrating light and a fixed plate with a second optical element for concentrating light, the movable and fixed plates being disposed approximately perpendicularly to an optical axis of the beams from the light source and in parallel to each other; and
    a photodetector that receives a spot of light generated by said first and second optical elements, wherein a detection signal from the photodetector is used to detect the moving reference point of said movable plate.

2. An optical encoder as set forth in claim 1 wherein the second optical element on the fixed plate further comprises a reflecting optical element and wherein the encoder passes light through the first optical element on the movable plate, modulates the light using the second optical element on said fixed plate, and reflects the light to pass through the first optical element on said movable plate again.

3. A position detection method comprising making beams from a light source approximately parallel, generating a light spot using a first optical element disposed on a moving object to concentrate light and a second optical element disposed on a fixed object to concentrate light, the objects being disposed approximately perpendicularly to the optical axis of light from the light source and in parallel to each other, and receiving the light spot to position said moving object.

4. A position detection method as set forth in claim 3 wherein a rotating shaft is attached to the moving object to detect the rotating angle of the moving object.

5. An optical encoder comprising a light source; a lens for making beams from said light source approximately parallel; a movable plate with a light scattering source and a fixed plate with an optical element for concentrating light, the plates being disposed approximately perpendicularly to the optical axis of the beams from the light source and in parallel to each other; and a photodetector that receives a spot of light generated by the optical element on the fixed plate by collecting light scattered from said light scattering source, wherein a detection signal from the photodetector enables the moving reference point of said movable plate to be detected.

6. An optical encoder comprising a light source; a lens for making beams from said light source approximately parallel; a movable plate with a reflecting surface and a fixed plate with an optical element for concentrating light, the plates being disposed approximately perpendicularly to the optical axis of the beams from the light source and in parallel to each other; and a photodetector that receives a spot of light generated by the optical element on the fixed plate by collecting light reflected from the reflecting surface of said movable plate, wherein a detection signal from the photodetector enables the moving reference point of said movable plate to be detected.

7. A position detection method comprising moving a movable object relative to a fixed object to generate a plurality of periodic signals having different time periods and a reference position signal indicating that the movable object is near a moving reference point, and determining a conjunction of said reference position signal and said plurality of periodic signals to detect the moving reference point of said movable object.

8. A position detection method as set forth in claim 7 wherein said plurality of periodic signals are generated based on light modulated by installing a first phase type diffraction gratings on said movable object and a second phase type diffraction gratings on said fixed object, respectively.

9. A position detection method as set forth in claim 7 wherein said plurality of periodic signals generated by moving a movable object and said reference position signal are binarized pulsed signals.

10. A position detection method as set forth in claim 9 wherein if said plurality of periodic signals are referred to as $S_0$ and $S_i$ (i=1 to n, n is an integer equal to or larger than 2), periods $VS_0$ and $VS_i$ meet the following equation $$VS_0 \leq \ldots \leq VS_{i-1} \leq VS_i$$

and the pulse of $S_i$ includes only one pulse of $S_{i-1}$ near said moving reference point.

11. A position detection method as set forth in claim 10 wherein when moving said movable object near said moving reference point, only one pulse of $S_n$ is generated.

12. A position detection method comprising providing on a moving object a first phase type diffraction grating comprising a plurality of annular tracks having different grating pitches, providing on a fixed object a second phase type diffraction grating corresponding to each track of the phase type diffraction grating on said moving object and having a grating pitch equal to that of each track, moving said moving object relative to said fixed object to cause said first and second phase type diffraction gratings to modulate light in order to generate a plurality of periodic signals with different periods, and detecting the absolute position of said moving object based on the patterns of said plurality of periodic signals.

13. A pattern detection method as set forth in claim 12 wherein said first and second phase type diffraction gratings mainly provide ±1 order diffracted light.

14. A pattern detection method as set forth in claim 12 wherein said plurality of periodic signals are binarized pulsed signals.

15. A pattern detection method as set forth in claim 14 wherein if said plurality of periodic signals are referred to as $S_0$ and $S_i$ (i=1 to n, n is an integer equal to or larger than 2), periods $VS_0$ and $VS_i$ meet the following equation, $$VS_0 \times 2 = VS_1$$
$$\vdots$$
$$VS_{n-1} \times 2 = VS_n.$$

16. A position detection method comprising repeatedly forming a part in which a phase type diffraction grating is formed and a part in which no phase type diffraction grating is formed, in each of a plurality of annular tracks on a moving object at a different period for each track, providing on a fixed object a light transmissible part and a light shielding part corresponding to each track on said moving object, generating a plurality of periodic signals of different periods from the different tracks when the part of said moving object in which no phase type diffraction grating is formed passes over the light transmissible part of said fixed object, and detecting the absolute position of said moving object based on the patterns of said plurality of periodic signals.

17. A position detection method as set forth in claim 16 wherein said phase type diffraction grating mainly provides ±1 order diffracted light.

18. A position detection method as set forth in claim 16 wherein said plurality of periodic signals are binarized pulsed signals.

19. A position detection method as set forth in claim 18 wherein if said plurality of periodic signals are referred to as $S_0$ and $S_i$ (i=1 to n, n is an integer equal to or larger than 2), periods $VS_0$ and $VS_i$ meet the following equation:

$$VS_0 \times 2 = VS_1$$
$$\vdots$$
$$VS_{n-1} \times 2 = VS_n.$$

20. A position detection method comprising providing a plurality of condensing elements on a plurality of annular tracks on a moving object at different specified intervals, detecting a light spot generated by each of said condensing elements, and detecting the position of said moving object based on the signal pattern of said light spot.

21. A position detection method as set forth in claim 20 wherein said plurality of periodic signals are binarized pulsed signals.

22. A position detection method as set forth in claim 21 wherein if said plurality of periodic signals are referred to as $S_0$ and $S_i$ (i=1 to n, n is an integer equal to or larger than 2), periods $VS_0$ and $VS_i$ meet the following equation:

$$VS_0 \times 2 = VS_1$$
$$\vdots$$
$$VS_{n-1} \times 2 = VS_n.$$

23. An optical encoder comprising a light source; a lens for making beams from said light source approximately parallel; a movable plate comprising a plurality of tracks and having condensing elements and first phase type diffraction gratings with a different grating pitch on each track; a fixed plate comprising a plurality of tracks corresponding to said first phase type diffraction grating and having second phase type diffraction grating with a grating pitch equal to that of said corresponding first phase type diffraction grating on each track; and a photodetector for detecting a light pattern generated by said first phase type diffraction grating of said movable plate and said second phase type diffraction grating of said fixed plate and a light pattern generated by said condensing elements of said movable plate, wherein a detection signal from the photodetector is used to detect the moving reference point of said movable plate.

24. An optical encoder as set forth in claim 23 wherein said first and second phase type diffraction gratings mainly provide ±1 order diffracted light.

25. An optical encoder as set forth in claim 23 wherein the detection signal from said photodetector is a binarized pulsed signal.

26. An optical encoder as set forth in claim 25 wherein if the periodic signals of said first and second phase type diffraction gratings are referred to as $S_0$ and $S_1$ (i=1 to n, n is an integer equal to or larger than 2), periods $VS_0$ and $VS_1$ meet the following equation:

$$VS_0 \leq \ldots \leq VS_{i-1} \leq VS_i;$$

and the pulse of $S_i$ includes only one pulse of $S_{i-1}$ near said moving reference point.

27. An optical encoder as set forth in claim 26 wherein the pulse of a signal generated by receiving condensed light spots formed by said condensing elements on said movable plate near said moving reference point preferably includes only one pulse of $S_n$.

28. An optical encoder comprising a light source; a lens for making beams from said light source approximately parallel; a movable plate comprising a plurality of tracks and having first phase type diffraction gratings with a different grating pitch on each track; a fixed plate comprising a plurality of tracks corresponding to said first phase type diffraction gratings of said movable plate and having second phase type diffraction gratings with a grating pitch equal to that of said corresponding first phase type diffraction gratings; and a photodetector for detecting light patterns generated by said first phase type diffraction gratings of said movable plate and said second phase type diffraction gratings of said fixed plate, wherein a detection signal from the photodetector is used to detect the absolute position of said movable plate.

29. An optical encoder as set forth in claim 28 wherein said first and second phase type diffraction gratings mainly provide ±1 order diffracted light.

30. An optical encoder as set forth in claim 28 wherein the detection signal from said photodetector is a binarized pulsed signal.

31. An optical encoder as set forth in claim 30 wherein if said plurality of periodic signals are referred to as $S_0$ and $S_i$ (i=1 to n, n is an integer equal to or larger than 2), periods $VS_0$ and $VS_i$ meet the following equation:

$$VS_0 \times 2 = VS_1$$
$$\vdots$$
$$VS_{n-1} \times 2 = VS_n.$$

32. An optical encoder comprising a light source; a lens for making beams from said light source approximately parallel; a movable plate comprising a plurality of tracks and having phase type diffraction gratings with different periods for grating-pattern-formed-areas and non-grating-pattern formed-areas used on the respective tracks; a fixed plate having a light transmissible part corresponding to each track on said movable plate; and a photodetector for detecting the pattern of light transmitted through said moving and fixed plates, wherein a detection signal from said photodetector is used to detect the absolute position of said movable plate.

33. An optical encoder as set forth in claim 32 wherein said moving diffraction grating mainly provides ±1 order diffracted light.

34. An optical encoder as set forth in claim 32 wherein the detection signal from said photodetector is a binarized pulsed signal.

35. An optical encoder as set forth in claim 34 wherein if said plurality of periodic signals from said photodetector are referred to as $S_0$ and $S_i$ (i=1 to n, n is an integer equal to or larger than 2), periods $VS_0$ and $VS_i$ meet the following equation:

$$VS_0 \times 2 = VS_1$$
$$\vdots$$
$$VS_{n-1} \times 2 = VS_n.$$

36. An optical encoder comprising a light source; a lens for making beams from said light source approximately parallel; a movable plate disposed approximately perpendicularly to the optical axis of light from the light source and having condensing elements disposed on a plurality of tracks at different fixed intervals; and a photodetector for detecting a pattern of light generated by said condensing elements of said movable plate, wherein a detection signal from said photodetector is used to detect the absolute position of said movable plate.

37. An optical encoder as set forth in claim 36 wherein the detection signal from said photodetector is a binarized pulsed signal.

38. An optical encoder as set forth in claim 37 wherein if said plurality of periodic signals from said photodetector are referred to as $S_0$ and $S_i$ (i=1 to n, n is an integer equal to or larger than 2), periods $VS_0$ and $VS_i$ meet the following equation:

$$VS_0 \times 2 = VS_1$$
$$\vdots$$
$$VS_{n-1} \times 2 = VS_n.$$

39. A position detection method comprising moving a moving object and a fixed object relative to each other; using the position of a light transmissible part installed on the moving object in order to control the intensity of spot light generated by at least two condensing elements located adjacent to each other along the direction in which said moving object moves, wherein at least two sets of condensing elements are installed on the fixed object; and detecting the moving reference point of said moving object.

40. A position detection method as set forth in claim 39 wherein the following relationship is established between the distance $r_{A1}$, $r_{B1}$ between the ends of two adjacent elements of each of two sets of condensing elements on said fixed object and the width $d_1$ of the light transmissible part on said moving object:

$$d_1 \leq r_{A1}$$
$$d_1 \leq r_{B1}$$

41. A position detection method as set forth in claim 40 wherein based on two differential signals indicating the intensities of spot lights formed by the two adjacent elements of each of the two sets of condensing elements on said fixed object, two pulse signals each having a point where the threshold level of each differential output crosses the zero line respectively as a starting point and an end point.

42. A position detection method as set forth in claim 41 including determining the conjunction of a pulsed periodic signal generated based on the relative position of said moving and said fixed objects and a pulse signal based on the two differential signals from said condensing elements on said moving object.

43. A position detection method as set forth in claim 42 wherein said periodic signal is generated based on light modulated by the first phase type diffraction grating installed on said moving object and the second phase type diffraction grating installed on said fixed object.

44. A position detection method as set forth in claim 43 wherein said first and second phase type diffraction gratings mainly provide ±1 order diffracted light.

45. A position detection method comprising moving a moving object and a fixed object relative to each other; using the position of a light transmissible part installed for each track on the moving object in order to control the intensity of a spot light generated by at least two condensing elements located adjacent to each other along the direction in which the moving object moves, wherein at least two sets of condensing elements are provided for each of a plurality of tracks on said fixed object; and detecting the absolute position of said moving object from the intensity pattern of a light spot generated based on the location of the light transmissible part on each track of said moving object.

46. A position detection method as set forth in claim 45 wherein the following relationship is established between the distance $r_{A1}$, $r_{B1}$, ..., $r_{An}$, $r_{Bn}$ (n is an integer equal to or larger than 2) between the ends of two adjacent elements of each of the plurality of tracks on said fixed object and the width $d_1, \ldots d_n$ (n is an integer equal to or larger than 2) of said corresponding light transmissible parts on said moving object:

$$d_1 \leq r_{A1}$$
$$d_1 \leq r_{B1}$$
$$\vdots$$
$$d_n \leq r_{An}$$
$$d_n \leq r_{Bn}.$$

47. A position detection method as set forth in claim 46 wherein based on two differential signals indicating the intensities of spot lights formed by the two adjacent elements of each of the two sets of condensing elements for each track on said fixed object, two pulse signals each having a point where the threshold level of each differential output crosses the zero line respectively as a starting point and an end point.

48. A position detection method as set forth in claim 47 wherein the binarized signal pattern obtained from each track when the movable plate is in one position is different from the binarized signal patterns obtained when the movable plate is in any other positions.

49. An optical encoder comprising a light source; a lens for making beams from said light source approximately parallel; a movable plate with a light transmissible part; a fixed plate with at least two condensing elements located adjacent to each other along the direction in which said movable plate moves, wherein at least two sets of condensing elements are installed on said fixed plate; and a photodetector for detecting an optical pattern generated by said light transmissible part of said movable plate and said condensing elements of said fixed plate, wherein a detection signal from said photodetector is used to detect a moving reference point of said movable plate.

50. An optical encoder as set forth in claim 49 wherein the following relationship is established between the distance $r_{A1}$, $r_{B1}$ between the ends of two adjacent elements of each of the two sets of condensing elements on said fixed plate and the width $d_1$ of said light transmissible part on said movable plate:

$$d_1 \leq r_{A1}$$

$$d_1 \leq r_{B1}$$

51. An optical encoder as set forth in claim 50 wherein based on two differential signals indicating the intensities of spot lights formed by the two adjacent elements of each of the two sets of condensing elements on the fixed plate, two pulse signals each having a point where the threshold level of each differential output crosses the zero line respectively as a starting point and an end point.

52. An optical encoder as set forth in claim 51 wherein the conjunction of a pulsed periodic signal generated based on the relative positions of said moving and said fixed objects and a pulse signal based on the two differential signals from said condensing elements on said fixed plate is determined.

53. An optical encoder as set forth in claim 52 wherein the periodic signal is generated based on light modulated by the first phase type diffraction grating installed on said movable plate and the second phase type diffraction grating installed on said fixed plate.

54. An optical encoder as set forth in claim 53 wherein said first and second phase type diffraction gratings mainly provide ±1 order diffracted light.

55. An optical encoder comprising a light source; a lens for making beams from said light source approximately parallel; a movable plate with light transmissible parts disposed on a plurality of tracks; a fixed plate with at least two condensing elements located adjacent to each other along the direction in which said moving object moves, wherein at least two sets of condensing elements are provided for each of the plurality of track of said movable plate; and a photodetector for detecting an optical pattern formed by said light transmissible part on said movable plate and said condensing elements on said fixed plate, wherein a detection signal from said photodetector is used to detect the absolute position of said movable plate.

56. An optical encoder as set forth in claim 55 wherein the following relationship is established between the distance $r_{A1}, r_{B1}, r_{A2}, r_{B2}, \ldots r_{An}, r_{Bn}$ (n is an integer equal to or larger than 2) between the ends of two adjacent elements of each of two sets of condensing elements for each of the plurality of tracks on said fixed plate and the width $d_1, d_2, \ldots d_n$ of the corresponding light transmissible parts on said movable plate:

$$d_1 \leq r_{A1}$$
$$d_1 \leq r_{B1}$$
$$d_2 \leq r_{A2}$$
$$d_2 \leq r_{B2}$$
$$\vdots$$
$$d_n \leq r_{An}$$
$$d_n \leq r_{Bn}.$$

57. An optical encoder as set forth in claim 56 wherein based on two differential signals indicating the intensities of spot lights formed by the two adjacent elements of each of the two sets of condensing elements for each track on said fixed plate, two pulse signals each having a point where the threshold level of each differential output crosses the zero line respectively as a starting point and an end point.

58. An optical encoder as set forth in claim 57 wherein the binarized signal pattern obtained from each track when the movable plate is in one position during a single rotation is different from the binarized signal patterns obtained when the movable plate is in any other positions.

* * * * *